US012711464B2

(12) United States Patent
Erez et al.

(10) Patent No.: US 12,711,464 B2
(45) Date of Patent: Aug. 18, 2026

(54) DIGITAL PROCESSING SYSTEMS AND METHODS FOR ENHANCED DATA REPRESENTATION

(71) Applicant: Monday.com LTD., Tel Aviv (IL)

(72) Inventors: Ran Erez, Tel Aviv (IL); Moran Fridel Cohen, Tel Aviv (IL); Dmitry Kogan, Tel Aviv (IL); Ronit Cyjon, Tel Aviv (IL)

(73) Assignee: Monday.com LTD., Tel Aviv (IL)

( * ) Notice: Subject to any disclaimer, the term of this patent is extended or adjusted under 35 U.S.C. 154(b) by 0 days.

(21) Appl. No.: 18/945,511

(22) Filed: Nov. 12, 2024

(65) Prior Publication Data

US 2025/0156813 A1 May 15, 2025

Related U.S. Application Data

(60) Provisional application No. 63/548,339, filed on Nov. 13, 2023.

(51) Int. Cl.
*G06Q 10/06* (2023.01)
*G06F 3/0484* (2022.01)
(Continued)

(52) U.S. Cl.
CPC ......... *G06Q 10/103* (2013.01); *G06F 3/0484* (2013.01); *G06Q 10/063114* (2013.01); *G06Q 10/06313* (2013.01); *G06Q 10/06375* (2013.01)

(58) Field of Classification Search
CPC ............................ G06Q 10/103; G06F 3/0484
(Continued)

(56) References Cited

U.S. PATENT DOCUMENTS 4,972,314 A 11/1990 Getzinger et al.
5,220,657 A 6/1993 Bly et al.
(Continued)

FOREIGN PATENT DOCUMENTS

CA 2828011 A1 9/2012
CN 103064833 A 4/2013
(Continued)

OTHER PUBLICATIONS

E. Oey, S. S. S. Harno and C. Zain, "Developing Integrated Performance Dashboards with Power BI—a Case Study in a Medium-Size Manufacturer," 2021 International Conference on Information Management and Technology (ICIMTech), Jakarta, Indonesia, 2021, pp. 265-270. (Year: 2021).*
(Continued)

*Primary Examiner* — Jonathan P Ouellette
(74) *Attorney, Agent, or Firm* — Finnegan, Henderson, Farabow, Garrett & Dunner LLP

(57) ABSTRACT

Categorized display of discrete graphical elements associated with project-related data involving accessing a data structure including data on a plurality of differing projects, wherein each project has one of a plurality of project statuses; receiving a request for a status-level summarization of the plurality of projects; in response to the request for the status-level summarization, scanning the data structure; based on the scanning of the data structure, aggregating project status level categorization data associated with the plurality of projects, thereby defining a set of status groups; generating a plurality of interactive aggregate project graphics, each interactive aggregate project graphic including a plurality of interactive project elements, and each of the plurality of interactive aggregate project graphics being associated with a differing one of the status groups in the set;
(Continued)

and displaying each of the interactive aggregate project graphics on a common display.

20 Claims, 16 Drawing Sheets

(51) Int. Cl.
*G06F 8/20* (2018.01)
*G06Q 10/0631* (2023.01)
*G06Q 10/0637* (2023.01)
*G06Q 10/10* (2023.01)
*G06Q 10/101* (2023.01)

(58) Field of Classification Search
USPC .................................................. 705/1.1–912
See application file for complete search history.

(56) References Cited

U.S. PATENT DOCUMENTS 5,479,602 A 12/1995 Baecker et al.
5,517,663 A 5/1996 Kahn
5,632,009 A 5/1997 Rao et al.
5,657,437 A 8/1997 Bishop et al.
5,682,469 A 10/1997 Linnett et al.
5,696,702 A 12/1997 Skinner et al.
5,726,701 A 3/1998 Needham
5,734,837 A 3/1998 Flores et al.
5,787,411 A 7/1998 Groff et al.
5,880,742 A 3/1999 Rao et al.
5,933,145 A 8/1999 Meek
5,999,911 A 12/1999 Berg et al.
6,016,438 A 1/2000 Wakayama
6,016,553 A 1/2000 Schneider et al.
6,023,695 A 2/2000 Osborn et al.
6,034,681 A 3/2000 Miller et al.
6,049,622 A 4/2000 Robb et al.
6,088,707 A 7/2000 Bates et al.
6,108,573 A 8/2000 Debbins et al.
6,111,573 A 8/2000 McComb et al.
6,157,381 A 12/2000 Bates et al.
6,167,405 A 12/2000 Rosensteel et al.
6,169,534 B1 1/2001 Raffel et al.
6,182,127 B1 1/2001 Cronin, III et al.
6,185,582 B1 2/2001 Zellweger et al.
6,195,794 B1 2/2001 Buxton
6,222,541 B1 4/2001 Bates et al.
6,252,594 B1 6/2001 Xia et al.
6,266,067 B1 7/2001 Owen et al.
6,275,809 B1 8/2001 Tamaki et al.
6,330,022 B1 12/2001 Seligmann
6,377,965 B1 4/2002 Fries et al.
6,385,617 B1 5/2002 Malik
6,460,043 B1 10/2002 Tabbara et al.
6,496,832 B2 12/2002 Chi et al.
6,509,912 B1 1/2003 Moran et al.
6,510,459 B2 1/2003 Cronin et al.
6,522,347 B1 2/2003 Tsuji et al.
6,527,556 B1 3/2003 Koskinen
6,567,830 B1 5/2003 Madduri
6,606,740 B1 8/2003 Lynn et al.
6,626,959 B1 9/2003 Moise et al.
6,636,242 B2 10/2003 Bowman-Amuah
6,647,370 B1 11/2003 Fu et al.
6,661,431 B1 12/2003 Stuart et al.
6,874,010 B1 3/2005 Sargent
6,988,248 B1 1/2006 Tang et al.
7,027,997 B1 4/2006 Robinson et al.
7,034,860 B2 4/2006 Lia et al.
7,043,529 B1 5/2006 Simonoff
7,054,891 B2 5/2006 Cole
7,228,492 B1 6/2007 Graham
7,237,188 B1 6/2007 Leung
7,249,042 B1 7/2007 Doerr et al.
7,272,637 B1 9/2007 Himmelstein
7,274,375 B1 9/2007 David
7,379,934 B1 5/2008 Forman et al.
7,380,202 B1 5/2008 Lindhorst et al.
7,383,320 B1 6/2008 Silberstein et al.
7,389,473 B1 6/2008 Sawicki et al.
7,415,664 B2 8/2008 Aureglia et al.
7,417,644 B2 8/2008 Cooper et al.
7,461,077 B1 12/2008 Greenwood
7,464,366 B2 12/2008 Shukla et al.
7,489,976 B2 2/2009 Adra
7,565,270 B2 7/2009 Bramwell et al.
7,617,443 B2 11/2009 Mills et al.
7,685,152 B2 3/2010 Chivukula et al.
7,707,514 B2 4/2010 Forstall et al.
7,710,290 B2 5/2010 Johnson
7,747,782 B2 6/2010 Hunt et al.
7,770,100 B2 8/2010 Chamberlain et al.
7,827,476 B1 11/2010 Roberts et al.
7,827,615 B1 11/2010 Allababidi et al.
7,836,408 B1 11/2010 Ollmann et al.
7,916,157 B1 3/2011 Kelley et al.
7,921,360 B1 4/2011 Sundermeyer et al.
7,933,952 B2 4/2011 Parker et al.
7,945,622 B1 5/2011 Pegg
7,954,043 B2 5/2011 Bera
7,954,064 B2 5/2011 Forstall et al.
8,046,703 B2 10/2011 Busch et al.
8,060,518 B2 11/2011 Timmons
8,078,955 B1 12/2011 Gupta
8,082,274 B2 12/2011 Steinglass et al.
8,108,241 B2 1/2012 Shukoor
8,136,031 B2 3/2012 Massand
8,151,213 B2 4/2012 Weitzman et al.
8,223,172 B1 7/2012 Miller et al.
8,286,072 B2 10/2012 Chamberlain et al.
8,365,095 B2 1/2013 Bansal et al.
8,375,327 B2 2/2013 Lorch et al.
8,386,960 B1 2/2013 Eismann et al.
8,407,217 B1 3/2013 Zhang
8,413,261 B2 4/2013 Nemoy et al.
8,423,909 B2 4/2013 Zabielski
8,543,566 B2 9/2013 Weissman et al.
8,548,997 B1 10/2013 Wu
8,560,942 B2 10/2013 Fortes et al.
8,566,732 B2 10/2013 Louch et al.
8,572,173 B2 10/2013 Briere et al.
8,578,399 B2 11/2013 Khen et al.
8,601,383 B2 12/2013 Folting et al.
8,620,703 B1 12/2013 Kapoor et al.
8,621,652 B2 12/2013 Slater
8,635,520 B2 1/2014 Christiansen et al.
8,660,881 B2 2/2014 Wood et al.
8,677,448 B1 3/2014 Kauffman et al.
8,694,981 B2 4/2014 Federighi et al.
8,719,071 B2 5/2014 MacIntyre et al.
8,738,414 B1 5/2014 Nagar et al.
8,812,471 B2 8/2014 Akita
8,819,042 B2 8/2014 Samudrala et al.
8,825,758 B2 9/2014 Bailor et al.
8,838,533 B2 9/2014 Kwiatkowski et al.
8,862,979 B2 10/2014 Hawking
8,863,022 B2 10/2014 Rhodes et al.
8,869,027 B2 10/2014 Louch et al.
8,937,627 B1 1/2015 Otero et al.
8,938,465 B2 1/2015 Messer
8,954,871 B2 2/2015 Louch et al.
9,007,405 B1 4/2015 Eldar et al.
9,015,716 B2 4/2015 Fletcher et al.
9,021,118 B2 4/2015 John et al.
9,026,897 B2 5/2015 Zarras
9,043,362 B2 5/2015 Weissman et al.
9,063,958 B2 6/2015 Müller et al.
9,129,234 B2 9/2015 Campbell et al.
9,159,246 B2 10/2015 Rodriguez et al.
9,172,738 B1 10/2015 Dacosta
9,177,238 B2 11/2015 Windmueller et al.
9,183,303 B1 11/2015 Goel et al.
9,223,770 B1 12/2015 Ledet

(56) References Cited

U.S. PATENT DOCUMENTS 9,239,719 B1 1/2016 Feinstein et al.
9,244,917 B1 1/2016 Sharma et al.
9,253,130 B2 2/2016 Zaveri
9,268,604 B1 2/2016 Herzberg et al.
9,286,246 B2 3/2016 Saito et al.
9,286,475 B2 3/2016 Li et al.
9,292,587 B2 3/2016 Kann et al.
9,336,502 B2 5/2016 Mohammad et al.
9,342,579 B2 5/2016 Cao et al.
9,361,287 B1 6/2016 Simon et al.
9,390,059 B1 7/2016 Gur et al.
9,395,959 B2 7/2016 Hatfield et al.
9,424,287 B2 8/2016 Schroth
9,424,333 B1 8/2016 Bisignani et al.
9,424,545 B1 8/2016 Lee
9,430,458 B2 8/2016 Rhee et al.
9,449,031 B2 9/2016 Barrus et al.
9,495,386 B2 11/2016 Tapley et al.
9,519,699 B1 12/2016 Kulkarni et al.
9,558,172 B2 1/2017 Rampson et al.
9,569,511 B2 2/2017 Morin
9,613,086 B1 4/2017 Sherman
9,635,091 B1 4/2017 Laukkanen et al.
9,659,284 B1 5/2017 Wilson et al.
9,679,456 B2 6/2017 East
9,686,086 B1 6/2017 Nguyen et al.
9,720,602 B1 8/2017 Chen et al.
9,727,376 B1 8/2017 Bills et al.
9,760,271 B2 9/2017 Persaud
9,779,150 B1 10/2017 Sherman et al.
9,794,256 B2 10/2017 Kiang et al.
9,798,829 B1 10/2017 Baisley
9,811,676 B1 11/2017 Gauvin
9,866,561 B2 1/2018 Psenka et al.
9,870,136 B2 1/2018 Pourshahid
9,911,092 B2 3/2018 Goja
10,001,908 B2 6/2018 Grieve et al.
10,043,296 B2 8/2018 Li
10,057,246 B1 8/2018 Drozd et al.
10,067,928 B1 9/2018 Krappe
10,078,668 B1 9/2018 Woodrow et al.
10,169,306 B2 1/2019 O'Shaughnessy et al.
10,176,154 B2 1/2019 Ben-Aharon et al.
10,235,441 B1 3/2019 Makhlin et al.
10,255,609 B2 4/2019 Kinkead et al.
10,282,405 B1 5/2019 Silk et al.
10,282,406 B2 5/2019 Bissantz
10,311,080 B2 6/2019 Folting et al.
10,318,624 B1 6/2019 Rosner et al.
10,327,712 B2 6/2019 Beymer et al.
10,347,017 B2 7/2019 Ruble et al.
10,372,706 B2 8/2019 Chavan et al.
10,380,140 B2 8/2019 Sherman
10,419,469 B1 9/2019 Singh et al.
10,423,758 B2 9/2019 Kido et al.
10,445,702 B1 10/2019 Hunt
10,452,360 B1 10/2019 Burman et al.
10,453,118 B2 10/2019 Smith et al.
10,474,317 B2 11/2019 Ramanathan et al.
10,489,391 B1 11/2019 Tomlin
10,489,462 B1 11/2019 Rogynskyy et al.
10,496,737 B1 12/2019 Sayre et al.
10,505,825 B1 12/2019 Bettaiah et al.
10,528,599 B1 1/2020 Pandis et al.
10,534,507 B1 1/2020 Laukkanen et al.
10,540,152 B1 1/2020 Krishnaswamy et al.
10,540,434 B2 1/2020 Migeon et al.
10,546,001 B1 1/2020 Nguyen et al.
10,564,622 B1 2/2020 Dean et al.
10,573,407 B2 2/2020 Ginsburg
10,579,724 B2 3/2020 Campbell et al.
10,581,675 B1 3/2020 Iyer et al.
10,587,714 B1 3/2020 Kulkarni et al.
10,628,002 B1 4/2020 Kang et al.
10,698,594 B2 6/2020 Sanches et al.
10,706,061 B2 7/2020 Sherman et al.
10,719,220 B2 7/2020 Ouellet et al.
10,719,311 B2 7/2020 Foskett et al.
10,733,256 B2 8/2020 Fickenscher et al.
10,740,117 B2 8/2020 Ording et al.
10,747,764 B1 8/2020 Plenderleith
10,747,950 B2 8/2020 Dang et al.
10,748,312 B2 8/2020 Ruble et al.
10,754,688 B2 8/2020 Powell
10,761,691 B2 9/2020 Anzures et al.
10,762,471 B1 9/2020 Wang et al.
10,795,555 B2 10/2020 Burke et al.
10,809,696 B1 10/2020 Principato
10,817,660 B2 10/2020 Rampson et al.
D910,077 S 2/2021 Naroshevitch et al.
10,955,992 B2 3/2021 Hooton et al.
10,963,578 B2 3/2021 More et al.
11,010,371 B1 5/2021 Slomka et al.
11,030,259 B2 6/2021 Mullins et al.
11,042,363 B1 6/2021 Krishnaswamy et al.
11,042,699 B1 6/2021 Sayre et al.
11,044,257 B1 6/2021 Heuts et al.
11,048,499 B2 6/2021 Foskett et al.
11,048,714 B2 6/2021 Sherman et al.
11,080,636 B1 8/2021 Son
11,086,894 B1 8/2021 Srivastava et al.
11,128,464 B1 9/2021 Loladia
11,144,854 B1 10/2021 Mouawad
11,182,218 B2 11/2021 Sanchez et al.
11,190,516 B1 11/2021 Loladia
11,222,167 B2 1/2022 Gehrmann et al.
11,231,862 B1 1/2022 Vig et al.
11,240,278 B1 2/2022 Wang et al.
11,243,688 B1 2/2022 Remy et al.
11,341,705 B1 5/2022 Isaacs et al.
11,356,485 B2 6/2022 Hegde et al.
11,360,765 B2 6/2022 Miller et al.
11,405,504 B1 8/2022 Tripathy et al.
11,429,384 B1 8/2022 Navert et al.
11,443,390 B1 9/2022 Caligaris et al.
11,494,171 B1 11/2022 Acharya et al.
11,513,772 B1 11/2022 Gross
11,570,182 B1 1/2023 Tran et al.
11,593,096 B1 2/2023 Chaptini et al.
11,593,477 B1 2/2023 Thimmegowda et al.
11,620,615 B2 4/2023 Jiang et al.
11,681,445 B2 6/2023 Vohra et al.
11,682,091 B2 6/2023 Sukman et al.
11,720,410 B2 8/2023 Culp et al.
11,750,475 B1 9/2023 Gonzalez et al.
11,799,951 B1 10/2023 Maloo et al.
11,823,269 B2 11/2023 Aisen et al.
11,882,117 B1 1/2024 Kumar
11,922,222 B1 3/2024 Chawla et al.
11,977,858 B2 * 5/2024 Kulkarni .................. G06F 8/77
12,094,018 B1 * 9/2024 O'Malley ............ G06Q 50/184
2001/0008998 A1 7/2001 Tamaki et al.
2001/0032248 A1 10/2001 Krafchin
2001/0039551 A1 11/2001 Saito et al.
2002/0002459 A1 1/2002 Lewis et al.
2002/0065848 A1 5/2002 Walker et al.
2002/0065849 A1 5/2002 Ferguson et al.
2002/0065880 A1 5/2002 Hasegawa et al.
2002/0069207 A1 6/2002 Alexander et al.
2002/0075309 A1 6/2002 Michelman et al.
2002/0082892 A1 6/2002 Raffel et al.
2002/0099777 A1 7/2002 Gupta et al.
2002/0138528 A1 9/2002 Gong et al.
2003/0004771 A1 1/2003 Yaung
2003/0033196 A1 2/2003 Tomlin
2003/0041113 A1 2/2003 Larsen
2003/0051377 A1 3/2003 Chirafesi
2003/0052912 A1 3/2003 Bowman et al.
2003/0058277 A1 3/2003 Bowman-Amuah
2003/0065662 A1 4/2003 Cosic
2003/0093408 A1 5/2003 Brown et al.
2003/0101416 A1 5/2003 McInnes et al.
2003/0135558 A1 7/2003 Bellotti et al.
2003/0137536 A1 7/2003 Hugh

(56) References Cited

U.S. PATENT DOCUMENTS

2003/0187864 A1 10/2003 McGoveran
2003/0200215 A1 10/2003 Chen et al.
2003/0204490 A1 10/2003 Kasriel
2003/0233224 A1 12/2003 Marchisio et al.
2004/0010514 A1 1/2004 Agarwal et al.
2004/0032432 A1 2/2004 Baynger
2004/0078105 A1 4/2004 Moon et al.
2004/0078373 A1 4/2004 Ghoneimy et al.
2004/0098284 A1 5/2004 Petito et al.
2004/0119713 A1 6/2004 Meyringer
2004/0133441 A1 7/2004 Brady et al.
2004/0138939 A1 7/2004 Theiler
2004/0139400 A1 7/2004 Allam et al.
2004/0162833 A1 8/2004 Jones et al.
2004/0172592 A1 9/2004 Collie et al.
2004/0212615 A1 10/2004 Uthe
2004/0215443 A1 10/2004 Hatton
2004/0230940 A1 11/2004 Cooper et al.
2004/0268227 A1 12/2004 Brid
2005/0010454 A1 1/2005 Falk et al.
2005/0034058 A1 2/2005 Mills et al.
2005/0034064 A1 2/2005 Meyers et al.
2005/0039001 A1 2/2005 Hudis et al.
2005/0039033 A1 2/2005 Meyers et al.
2005/0044486 A1 2/2005 Kotler et al.
2005/0063615 A1 3/2005 Siegel et al.
2005/0066306 A1 3/2005 Diab
2005/0086360 A1 4/2005 Mamou et al.
2005/0091314 A1 4/2005 Blagsvedt et al.
2005/0091596 A1 4/2005 Anthony et al.
2005/0096973 A1 5/2005 Heyse et al.
2005/0114305 A1 5/2005 Haynes et al.
2005/0125395 A1 6/2005 Boettiger
2005/0149908 A1 7/2005 Klianev
2005/0165600 A1 7/2005 Kasravi et al.
2005/0171881 A1 8/2005 Ghassemieh et al.
2005/0210371 A1 9/2005 Pollock et al.
2005/0216830 A1 9/2005 Turner et al.
2005/0228250 A1 10/2005 Bitter et al.
2005/0251021 A1 11/2005 Kaufman et al.
2005/0257204 A1 11/2005 Bryant et al.
2005/0278297 A1 12/2005 Nelson
2005/0289170 A1 12/2005 Brown et al.
2005/0289342 A1 12/2005 Needham et al.
2005/0289453 A1 12/2005 Segal et al.
2006/0009960 A1 1/2006 Valencot et al.
2006/0013462 A1 1/2006 Sadikali
2006/0015499 A1 1/2006 Clissold et al.
2006/0015806 A1 1/2006 Wallace
2006/0031148 A1 2/2006 O'Dell et al.
2006/0031764 A1 2/2006 Keyser et al.
2006/0036568 A1 2/2006 Moore et al.
2006/0047811 A1 3/2006 Lau et al.
2006/0053096 A1 3/2006 Subramanian et al.
2006/0053194 A1 3/2006 Schneider et al.
2006/0069604 A1 3/2006 Leukart et al.
2006/0069635 A1 3/2006 Ram et al.
2006/0074735 A1 4/2006 Shukla et al.
2006/0074736 A1 4/2006 Shukla et al.
2006/0080594 A1 4/2006 Chavoustie et al.
2006/0085744 A1 4/2006 Hays et al.
2006/0090169 A1 4/2006 Daniels et al.
2006/0101324 A1 5/2006 Goldberg et al.
2006/0106642 A1 5/2006 Reicher et al.
2006/0107196 A1 5/2006 Thanu et al.
2006/0111953 A1 5/2006 Setya
2006/0112123 A1 5/2006 Clark et al.
2006/0129415 A1 6/2006 Thukral et al.
2006/0129913 A1 6/2006 Vigesaa et al.
2006/0136828 A1 6/2006 Asano
2006/0150090 A1 7/2006 Swamidass
2006/0173762 A1* 8/2006 Clater .................... G06Q 40/00
705/35
2006/0173908 A1 8/2006 Browning et al.
2006/0190313 A1 8/2006 Lu
2006/0212299 A1 9/2006 Law
2006/0224542 A1 10/2006 Yalamanchi
2006/0224568 A1 10/2006 Debrito
2006/0224946 A1 10/2006 Barrett et al.
2006/0236246 A1 10/2006 Bono et al.
2006/0250369 A1 11/2006 Keim
2006/0253205 A1 11/2006 Gardiner
2006/0271574 A1 11/2006 Villaron et al.
2006/0287998 A1 12/2006 Folting et al.
2006/0294451 A1 12/2006 Kelkar et al.
2007/0027932 A1 2/2007 Thibeault
2007/0032993 A1 2/2007 Yamaguchi et al.
2007/0033531 A1 2/2007 Marsh
2007/0050322 A1 3/2007 Vigesaa et al.
2007/0050379 A1 3/2007 Day et al.
2007/0067373 A1 3/2007 Higgins et al.
2007/0073899 A1 3/2007 Judge et al.
2007/0092048 A1 4/2007 Chelstrom et al.
2007/0094607 A1 4/2007 Morgan et al.
2007/0101291 A1 5/2007 Forstall et al.
2007/0106754 A1 5/2007 Moore
2007/0118527 A1 5/2007 Winje et al.
2007/0118813 A1 5/2007 Forstall et al.
2007/0143169 A1 6/2007 Grant et al.
2007/0143736 A1 6/2007 Moriarty et al.
2007/0150389 A1 6/2007 Aamodt et al.
2007/0168861 A1 7/2007 Bell et al.
2007/0174228 A1 7/2007 Folting et al.
2007/0174760 A1 7/2007 Chamberlain et al.
2007/0186173 A1 8/2007 Both et al.
2007/0192729 A1 8/2007 Downs
2007/0220119 A1 9/2007 Himmelstein
2007/0233647 A1 10/2007 Rawat et al.
2007/0239746 A1 10/2007 Masselle et al.
2007/0256043 A1 11/2007 Peters et al.
2007/0282522 A1 12/2007 Geelen
2007/0282627 A1 12/2007 Greenstein et al.
2007/0283259 A1 12/2007 Barry et al.
2007/0294235 A1 12/2007 Millett
2007/0299795 A1 12/2007 Macbeth et al.
2007/0300174 A1 12/2007 Macbeth et al.
2007/0300185 A1 12/2007 Macbeth et al.
2008/0004929 A9 1/2008 Raffel et al.
2008/0005235 A1 1/2008 Hegde et al.
2008/0010615 A1 1/2008 Curtis et al.
2008/0033777 A1 2/2008 Shukoor
2008/0034307 A1 2/2008 Cisler et al.
2008/0034314 A1 2/2008 Louch et al.
2008/0040181 A1 2/2008 Freire et al.
2008/0052291 A1 2/2008 Bender
2008/0059312 A1 3/2008 Gern et al.
2008/0059539 A1 3/2008 Chin et al.
2008/0065460 A1 3/2008 Raynor
2008/0077530 A1 3/2008 Banas et al.
2008/0097748 A1 4/2008 Haley et al.
2008/0104091 A1 5/2008 Chin
2008/0126389 A1 5/2008 Mush et al.
2008/0127205 A1 5/2008 Barros
2008/0133736 A1 6/2008 Wensley et al.
2008/0148140 A1 6/2008 Nakano
2008/0155547 A1 6/2008 Weber et al.
2008/0163075 A1 7/2008 Beck et al.
2008/0183593 A1 7/2008 Dierks
2008/0195948 A1 8/2008 Bauer
2008/0209318 A1 8/2008 Allsop et al.
2008/0216022 A1 9/2008 Lorch et al.
2008/0222192 A1 9/2008 Hughes
2008/0256014 A1 10/2008 Gould et al.
2008/0256429 A1 10/2008 Penner et al.
2008/0270597 A1 10/2008 Tenenti
2008/0282189 A1 11/2008 Hofmann et al.
2008/0295038 A1 11/2008 Helfman et al.
2008/0301237 A1 12/2008 Parsons et al.
2009/0006171 A1 1/2009 Blatchley et al.
2009/0006283 A1 1/2009 Labrie et al.
2009/0007157 A1 1/2009 Ward et al.
2009/0013244 A1 1/2009 Cudich et al.
2009/0019383 A1 1/2009 Riley et al.
2009/0024944 A1 1/2009 Louch et al.

(56) References Cited

U.S. PATENT DOCUMENTS

2009/0043814 A1 2/2009 Faris et al.
2009/0044090 A1 2/2009 Gur et al.
2009/0048896 A1 2/2009 Anandan
2009/0049372 A1 2/2009 Goldberg
2009/0075694 A1 3/2009 Kim et al.
2009/0077164 A1 3/2009 Phillips et al.
2009/0077217 A1 3/2009 McFarland et al.
2009/0083140 A1 3/2009 Phan
2009/0088875 A1 4/2009 Baier et al.
2009/0094514 A1 4/2009 Dargahi et al.
2009/0113310 A1 4/2009 Appleyard et al.
2009/0129596 A1 5/2009 Chavez et al.
2009/0132331 A1 5/2009 Cartledge et al.
2009/0132470 A1 5/2009 Vignet
2009/0150813 A1 6/2009 Chang et al.
2009/0174680 A1 7/2009 Anzures et al.
2009/0192787 A1 7/2009 Roon
2009/0198715 A1 8/2009 Barbarek
2009/0222760 A1 9/2009 Halverson et al.
2009/0248710 A1 10/2009 Mccormack et al.
2009/0256972 A1 10/2009 Ramaswamy et al.
2009/0262690 A1 10/2009 Breuer et al.
2009/0271696 A1 10/2009 Bailor et al.
2009/0276692 A1 11/2009 Rosner
2009/0292690 A1 11/2009 Culbert
2009/0313201 A1 12/2009 Huelsman et al.
2009/0313537 A1 12/2009 Fu et al.
2009/0313570 A1 12/2009 Po
2009/0319623 A1 12/2009 Srinivasan et al.
2009/0319882 A1 12/2009 Morrison et al.
2009/0327240 A1 12/2009 Meehan et al.
2009/0327301 A1 12/2009 Lees et al.
2009/0327851 A1 12/2009 Raposo
2009/0327875 A1 12/2009 Kinkoh
2010/0017699 A1 1/2010 Farrell et al.
2010/0031135 A1 2/2010 Naghshin et al.
2010/0070845 A1 3/2010 Facemire et al.
2010/0070895 A1 3/2010 Messer
2010/0077260 A1 3/2010 Pillai et al.
2010/0082705 A1 4/2010 Ramesh et al.
2010/0083164 A1 4/2010 Martin et al.
2010/0088636 A1 4/2010 Yerkes et al.
2010/0095219 A1 4/2010 Stachowiak et al.
2010/0095298 A1 4/2010 Seshadrinathan et al.
2010/0100427 A1 4/2010 Mckeown et al.
2010/0100463 A1 4/2010 Molotsi et al.
2010/0114926 A1 5/2010 Agrawal et al.
2010/0149005 A1 6/2010 Yoon et al.
2010/0174678 A1 7/2010 Massand
2010/0205521 A1 8/2010 Folting
2010/0228752 A1 9/2010 Folting et al.
2010/0241477 A1 9/2010 Nylander et al.
2010/0241948 A1 9/2010 Andeen et al.
2010/0241968 A1 9/2010 Tarara et al.
2010/0241972 A1 9/2010 Spataro et al.
2010/0241990 A1 9/2010 Gabriel et al.
2010/0251090 A1 9/2010 Chamberlain et al.
2010/0251386 A1 9/2010 Gilzean et al.
2010/0257015 A1 10/2010 Molander
2010/0262625 A1 10/2010 Pittenger
2010/0268705 A1 10/2010 Douglas et al.
2010/0268773 A1 10/2010 Hunt et al.
2010/0281462 A1 11/2010 Festa
2010/0287163 A1 11/2010 Sridhar et al.
2010/0287221 A1 11/2010 Battepati et al.
2010/0313119 A1 12/2010 Baldwin et al.
2010/0324964 A1 12/2010 Callanan et al.
2010/0332973 A1 12/2010 Kloiber et al.
2011/0010340 A1 1/2011 Hung et al.
2011/0016432 A1 1/2011 Helfman
2011/0028138 A1 2/2011 Davies-Moore et al.
2011/0047484 A1 2/2011 Mount et al.
2011/0055177 A1 3/2011 Chakra et al.
2011/0066933 A1 3/2011 Ludwig
2011/0071869 A1 3/2011 O'Brien et al.
2011/0106636 A1 5/2011 Spear et al.
2011/0119352 A1 5/2011 Perov et al.
2011/0154192 A1 6/2011 Yang et al.
2011/0179371 A1 7/2011 Kopycinski et al.
2011/0205231 A1 8/2011 Hartley et al.
2011/0208324 A1 8/2011 Fukatsu
2011/0208732 A1 8/2011 Melton et al.
2011/0209150 A1 8/2011 Hammond et al.
2011/0219321 A1 9/2011 Gonzalez Veron et al.
2011/0225525 A1 9/2011 Chasman et al.
2011/0231273 A1 9/2011 Buchheit
2011/0238716 A1 9/2011 Amir et al.
2011/0258040 A1 10/2011 Gnanasambandam
2011/0269424 A1 11/2011 Multer
2011/0288900 A1 11/2011 Mcqueen et al.
2011/0289397 A1 11/2011 Eastmond et al.
2011/0289439 A1 11/2011 Jugel
2011/0298618 A1 12/2011 Stahl et al.
2011/0302003 A1 12/2011 Shirish et al.
2012/0029962 A1 2/2012 Podgurny et al.
2012/0035974 A1 2/2012 Seybold
2012/0036423 A1 2/2012 Haynes et al.
2012/0036462 A1 2/2012 Schwartz et al.
2012/0050802 A1 3/2012 Masuda
2012/0066587 A1 3/2012 Zhou et al.
2012/0072821 A1 3/2012 Bowling
2012/0079408 A1 3/2012 Rohwer
2012/0081762 A1 4/2012 Yamada
2012/0084798 A1 4/2012 Reeves et al.
2012/0086716 A1 4/2012 Reeves et al.
2012/0086717 A1 4/2012 Liu
2012/0089610 A1 4/2012 Agrawal et al.
2012/0089914 A1 4/2012 Holt et al.
2012/0089992 A1 4/2012 Reeves et al.
2012/0096389 A1 4/2012 Flam et al.
2012/0096392 A1 4/2012 Ording et al.
2012/0102432 A1 4/2012 Breedvelt-Schouten et al.
2012/0102543 A1 4/2012 Kohli et al.
2012/0110515 A1 5/2012 Abramoff et al.
2012/0116834 A1 5/2012 Pope et al.
2012/0116835 A1* 5/2012 Pope ................ G06Q 10/06316 705/7.26
2012/0124749 A1 5/2012 Lewman
2012/0130907 A1* 5/2012 Thompson ........... G06Q 10/103 705/301
2012/0131445 A1 5/2012 Oyarzabal et al.
2012/0151173 A1 6/2012 Shirley et al.
2012/0158744 A1 6/2012 Tseng et al.
2012/0192050 A1 7/2012 Campbell et al.
2012/0198322 A1 8/2012 Gulwani et al.
2012/0210252 A1 8/2012 Fedoseyeva et al.
2012/0215574 A1 8/2012 Driessnack et al.
2012/0215578 A1 8/2012 Swierz et al.
2012/0229867 A1 9/2012 Takagi
2012/0233150 A1 9/2012 Naim et al.
2012/0233533 A1 9/2012 Yücel et al.
2012/0234907 A1 9/2012 Clark et al.
2012/0236368 A1 9/2012 Uchida et al.
2012/0239454 A1 9/2012 Taix et al.
2012/0244891 A1 9/2012 Appleton
2012/0246170 A1 9/2012 Iantorno
2012/0254252 A1 10/2012 Jin et al.
2012/0254770 A1 10/2012 Ophir
2012/0260190 A1 10/2012 Berger et al.
2012/0278117 A1 11/2012 Nguyen et al.
2012/0284197 A1 11/2012 Sitrick et al.
2012/0284643 A1 11/2012 Sitrick et al.
2012/0297307 A1 11/2012 Rider et al.
2012/0300931 A1 11/2012 Ollikainen et al.
2012/0303262 A1 11/2012 Alam et al.
2012/0304098 A1 11/2012 Kuulusa
2012/0311496 A1 12/2012 Cao et al.
2012/0311672 A1 12/2012 Connor et al.
2012/0324348 A1 12/2012 Rounthwaite
2013/0015954 A1 1/2013 Thorne et al.
2013/0018952 A1 1/2013 Mcconnell et al.
2013/0018953 A1 1/2013 Mcconnell et al.
2013/0018960 A1 1/2013 Knysz et al.
2013/0024418 A1 1/2013 Sitrick et al.

(56) References Cited

U.S. PATENT DOCUMENTS

2013/0024760 A1 1/2013 Vogel et al.
2013/0036369 A1 2/2013 Mitchell et al.
2013/0041958 A1 2/2013 Post et al.
2013/0054514 A1 2/2013 Barrett-Kahn et al.
2013/0055113 A1 2/2013 Chazin et al.
2013/0059598 A1 3/2013 Miyagi et al.
2013/0063490 A1 3/2013 Zaman et al.
2013/0086460 A1 4/2013 Folting et al.
2013/0090969 A1 4/2013 Rivere
2013/0097490 A1 4/2013 Kotler et al.
2013/0103417 A1 4/2013 Seto et al.
2013/0104035 A1 4/2013 Wagner et al.
2013/0111320 A1 5/2013 Campbell et al.
2013/0117268 A1 5/2013 Smith et al.
2013/0159832 A1 6/2013 Ingargiola et al.
2013/0159907 A1 6/2013 Brosche et al.
2013/0179209 A1 7/2013 Milosevich
2013/0211866 A1 8/2013 Gordon et al.
2013/0212197 A1 8/2013 Karlson
2013/0212234 A1 8/2013 Bartlett et al.
2013/0215475 A1 8/2013 Noguchi
2013/0238363 A1 9/2013 Ohta et al.
2013/0238968 A1 9/2013 Barrus
2013/0246384 A1 9/2013 Mctor
2013/0262527 A1 10/2013 Hunter et al.
2013/0268331 A1 10/2013 Bitz et al.
2013/0297468 A1 11/2013 Hirsch et al.
2013/0307997 A1 11/2013 O'Keefe et al.
2013/0318424 A1 11/2013 Boyd
2013/0339051 A1 12/2013 Dobrean
2014/0002863 A1 1/2014 Hasegawa et al.
2014/0006326 A1 1/2014 Bazanov
2014/0012616 A1 1/2014 Moshenek
2014/0019842 A1 1/2014 Montagna et al.
2014/0033307 A1 1/2014 Schmidtler
2014/0043331 A1 2/2014 Makinen et al.
2014/0046638 A1 2/2014 Peloski
2014/0052749 A1 2/2014 Rissanen
2014/0058801 A1 2/2014 Deodhar et al.
2014/0059017 A1 2/2014 Chaney et al.
2014/0068403 A1 3/2014 Bhargav et al.
2014/0074545 A1 3/2014 Minder et al.
2014/0075301 A1 3/2014 Mihara
2014/0078557 A1 3/2014 Hasegawa et al.
2014/0082525 A1 3/2014 Kass et al.
2014/0095237 A1 4/2014 Ehrler et al.
2014/0101527 A1 4/2014 Suciu
2014/0108985 A1 4/2014 Scott et al.
2014/0109012 A1 4/2014 Choudhary et al.
2014/0111516 A1 4/2014 Hall et al.
2014/0115515 A1 4/2014 Adams et al.
2014/0115518 A1 4/2014 Abdukalykov et al.
2014/0129960 A1 5/2014 Wang et al.
2014/0136972 A1 5/2014 Rodgers et al.
2014/0137003 A1 5/2014 Peters et al.
2014/0137144 A1 5/2014 Järvenpää et al.
2014/0172475 A1 6/2014 Olliphant et al.
2014/0173401 A1 6/2014 Oshlag et al.
2014/0181155 A1 6/2014 Homsany
2014/0188748 A1 7/2014 Cavoue et al.
2014/0195933 A1 7/2014 Rao Dv
2014/0214404 A1 7/2014 Kalia et al.
2014/0215303 A1 7/2014 Grigorovitch et al.
2014/0229816 A1 8/2014 Yakub
2014/0240735 A1 8/2014 Salgado
2014/0249877 A1 9/2014 Hull et al.
2014/0257568 A1 9/2014 Czaja et al.
2014/0278638 A1 9/2014 Kreuzkamp et al.
2014/0278720 A1 9/2014 Taguchi
2014/0280287 A1 9/2014 Ganti et al.
2014/0280377 A1 9/2014 Frew
2014/0281868 A1 9/2014 Vogel et al.
2014/0281869 A1 9/2014 Yob
2014/0282417 A1 9/2014 Paveza et al.
2014/0289223 A1 9/2014 Colwell et al.
2014/0304174 A1 10/2014 Scott et al.
2014/0306837 A1 10/2014 Hauck
2014/0310345 A1 10/2014 Megiddo et al.
2014/0324497 A1 10/2014 Verma et al.
2014/0324501 A1 10/2014 Davidow et al.
2014/0325552 A1 10/2014 Evans et al.
2014/0365938 A1 12/2014 Black et al.
2014/0372856 A1 12/2014 Radakovitz et al.
2014/0372932 A1 12/2014 Rutherford et al.
2015/0032686 A1 1/2015 Kuchoor
2015/0033131 A1 1/2015 Peev et al.
2015/0033149 A1 1/2015 Kuchoor
2015/0035918 A1 2/2015 Matsumoto et al.
2015/0039387 A1 2/2015 Akahoshi et al.
2015/0046209 A1 2/2015 Choe
2015/0046900 A1 2/2015 Eldridge et al.
2015/0058619 A1 2/2015 Sweet et al.
2015/0067556 A1 3/2015 Tibrewal et al.
2015/0074721 A1 3/2015 Fishman et al.
2015/0074728 A1 3/2015 Chai et al.
2015/0088822 A1 3/2015 Raja et al.
2015/0095752 A1 4/2015 Studer et al.
2015/0106736 A1 4/2015 Torman et al.
2015/0125834 A1 5/2015 Mendoza Tascon
2015/0142676 A1 5/2015 Mcginnis et al.
2015/0142829 A1 5/2015 Lee et al.
2015/0153943 A1 6/2015 Wang
2015/0154660 A1 6/2015 Weald et al.
2015/0169514 A1 6/2015 Sah et al.
2015/0169531 A1 6/2015 Campbell et al.
2015/0178657 A1 6/2015 Kleehammer et al.
2015/0188964 A1 7/2015 Sharma et al.
2015/0205830 A1 7/2015 Bastide et al.
2015/0212717 A1 7/2015 Nair et al.
2015/0213397 A1 7/2015 Arena
2015/0220491 A1 8/2015 Cochrane et al.
2015/0234887 A1 8/2015 Greene et al.
2015/0242091 A1 8/2015 Lu et al.
2015/0249864 A1 9/2015 Tang et al.
2015/0261796 A1 9/2015 Gould et al.
2015/0262121 A1 9/2015 Riel-Dalpe et al.
2015/0278699 A1 10/2015 Danielsson
2015/0281292 A1 10/2015 Kim et al.
2015/0295877 A1 10/2015 Roman et al.
2015/0310126 A1 10/2015 Steiner et al.
2015/0317590 A1 11/2015 Karlson
2015/0324453 A1 11/2015 Werner
2015/0331846 A1 11/2015 Guggilla et al.
2015/0363478 A1 12/2015 Haynes
2015/0370540 A1 12/2015 Coslovi et al.
2015/0370776 A1 12/2015 New
2015/0370904 A1 12/2015 Joshi et al.
2015/0378542 A1 12/2015 Saito et al.
2015/0378711 A1 12/2015 Cameron et al.
2015/0378979 A1 12/2015 Hirzel et al.
2015/0379472 A1 12/2015 Gilmour et al.
2016/0012111 A1 1/2016 Pattabhiraman et al.
2016/0018962 A1 1/2016 Low et al.
2016/0026939 A1 1/2016 Schiffer et al.
2016/0027076 A1 1/2016 Jackson et al.
2016/0035546 A1 2/2016 Platt et al.
2016/0041736 A1 2/2016 Schulz
2016/0055134 A1 2/2016 Sathish et al.
2016/0055374 A1 2/2016 Zhang et al.
2016/0057163 A1 2/2016 Boffa et al.
2016/0063435 A1 3/2016 Shah et al.
2016/0068960 A1 3/2016 Jung et al.
2016/0078368 A1 3/2016 Kakhandiki et al.
2016/0088480 A1 3/2016 Chen et al.
2016/0092557 A1 3/2016 Stojanovic et al.
2016/0098574 A1 4/2016 Bargagni
2016/0117308 A1 4/2016 Haider et al.
2016/0170586 A1 6/2016 Gallo
2016/0173122 A1 6/2016 Akitomi et al.
2016/0196310 A1 7/2016 Dutta
2016/0210572 A1 7/2016 Shaaban et al.
2016/0216948 A1 7/2016 Mcpherson et al.
2016/0224532 A1 8/2016 Miller et al.
2016/0224676 A1 8/2016 Miller et al.

(56) References Cited

U.S. PATENT DOCUMENTS

2016/0224939 A1 8/2016 Chen et al.
2016/0231915 A1 8/2016 Nhan et al.
2016/0232489 A1 8/2016 Skaaksrud
2016/0246490 A1 8/2016 Cabral
2016/0253982 A1 9/2016 Cheung et al.
2016/0259856 A1 9/2016 Ananthapur Bache et al.
2016/0275150 A1 9/2016 Bourbonnais et al.
2016/0292206 A1 10/2016 Ruiz Velazquez et al.
2016/0299655 A1 10/2016 Migos et al.
2016/0308963 A1 10/2016 Kung
2016/0321235 A1 11/2016 He et al.
2016/0321604 A1 11/2016 Imaeda et al.
2016/0335302 A1 11/2016 Wright et al.
2016/0335303 A1 11/2016 Madhalam et al.
2016/0335604 A1 11/2016 Reminick et al.
2016/0335731 A1 11/2016 Hall
2016/0335903 A1 11/2016 Mendoza Tascon
2016/0344828 A1 11/2016 Häusler et al.
2016/0350950 A1 12/2016 Ritchie et al.
2016/0381099 A1 12/2016 Keslin et al.
2017/0017779 A1 1/2017 Huang et al.
2017/0031967 A1 2/2017 Chavan et al.
2017/0038919 A1 2/2017 Moss et al.
2017/0041296 A1 2/2017 Ford et al.
2017/0052937 A1 2/2017 Sirven et al.
2017/0061342 A1 3/2017 Lore et al.
2017/0061360 A1 3/2017 Rucker et al.
2017/0061820 A1 3/2017 Firoozbakhsh
2017/0063722 A1 3/2017 Cropper et al.
2017/0075557 A1 3/2017 Noble et al.
2017/0076101 A1 3/2017 Kochhar et al.
2017/0090734 A1 3/2017 Fitzpatrick
2017/0090736 A1 3/2017 King et al.
2017/0091337 A1 3/2017 Patterson
2017/0093876 A1 3/2017 Feng et al.
2017/0109499 A1 4/2017 Doshi et al.
2017/0111327 A1 4/2017 Wu
2017/0116552 A1 4/2017 Deodhar et al.
2017/0124042 A1 5/2017 Campbell et al.
2017/0124048 A1 5/2017 Campbell et al.
2017/0124055 A1 5/2017 Radakovitz et al.
2017/0124740 A1 5/2017 Campbell et al.
2017/0126772 A1 5/2017 Campbell et al.
2017/0132296 A1 5/2017 Ding
2017/0132652 A1 5/2017 Kedzlie et al.
2017/0139874 A1 5/2017 Chin
2017/0139884 A1 5/2017 Bendig et al.
2017/0139891 A1 5/2017 Ah-Soon et al.
2017/0139992 A1 5/2017 Morin
2017/0140047 A1 5/2017 Bendig et al.
2017/0140219 A1 5/2017 King et al.
2017/0153771 A1 6/2017 Chu
2017/0161246 A1 6/2017 Klima
2017/0177556 A1 6/2017 Fay et al.
2017/0177888 A1 6/2017 Arora et al.
2017/0185575 A1 6/2017 Sood et al.
2017/0185592 A1 6/2017 Frei et al.
2017/0185668 A1 6/2017 Convertino et al.
2017/0200122 A1 7/2017 Edson et al.
2017/0206366 A1 7/2017 Fay et al.
2017/0212924 A1 7/2017 Semlani et al.
2017/0220813 A1 8/2017 Mullins et al.
2017/0221072 A1 8/2017 Athulurutlrumala et al.
2017/0228421 A1 8/2017 Sharma et al.
2017/0228445 A1 8/2017 Chiu et al.
2017/0228460 A1 8/2017 Amel et al.
2017/0229152 A1 8/2017 Loganathan et al.
2017/0236081 A1 8/2017 Grady Smith et al.
2017/0242921 A1 8/2017 Rota
2017/0257517 A1 9/2017 Panda
2017/0262786 A1 9/2017 Khasis
2017/0270970 A1 9/2017 Ho et al.
2017/0272316 A1 9/2017 Johnson et al.
2017/0272331 A1 9/2017 Lissack
2017/0277620 A1 9/2017 Kadioglu
2017/0277669 A1 9/2017 Sekharan
2017/0285879 A1 10/2017 Pilkington et al.
2017/0285890 A1 10/2017 Dolman
2017/0289619 A1 10/2017 Xu et al.
2017/0301039 A1 10/2017 Dyer et al.
2017/0315683 A1 11/2017 Boucher et al.
2017/0315974 A1 11/2017 Kong et al.
2017/0315979 A1 11/2017 Boucher et al.
2017/0316355 A1 11/2017 Shrestha et al.
2017/0322963 A1 11/2017 Ramamurthi et al.
2017/0324692 A1 11/2017 Zhou
2017/0329479 A1 11/2017 Rauschenbach et al.
2017/0351252 A1 12/2017 Kleifges et al.
2017/0351974 A1 12/2017 Rose et al.
2017/0372442 A1 12/2017 Mejias
2017/0374205 A1 12/2017 Panda
2018/0011827 A1 1/2018 Avery et al.
2018/0025084 A1 1/2018 Conlan et al.
2018/0026954 A1 1/2018 Toepke et al.
2018/0032492 A1 2/2018 Altshuller et al.
2018/0032570 A1 2/2018 Miller et al.
2018/0039651 A1 2/2018 Tobin et al.
2018/0055434 A1 3/2018 Cheung et al.
2018/0075104 A1 3/2018 Oberbreckling et al.
2018/0075115 A1 3/2018 Murray et al.
2018/0075413 A1 3/2018 Culver et al.
2018/0075560 A1 3/2018 Thukral et al.
2018/0081505 A1 3/2018 Ron et al.
2018/0081863 A1 3/2018 Bathla
2018/0081868 A1 3/2018 Willcock et al.
2018/0082072 A1 3/2018 Hosie et al.
2018/0088753 A1 3/2018 Viégas et al.
2018/0088989 A1 3/2018 Nield et al.
2018/0089299 A1 3/2018 Collins et al.
2018/0095938 A1 4/2018 Monte
2018/0096417 A1 4/2018 Cook et al.
2018/0109760 A1 4/2018 Metter et al.
2018/0121028 A1 5/2018 Kuscher et al.
2018/0121994 A1 5/2018 Matsunaga et al.
2018/0128636 A1 5/2018 Zhou
2018/0129651 A1 5/2018 Latvala et al.
2018/0157455 A1 6/2018 Troy et al.
2018/0157467 A1 6/2018 Stachura
2018/0157468 A1 6/2018 Stachura
2018/0157633 A1 6/2018 He et al.
2018/0173715 A1 6/2018 Dunne
2018/0174104 A1 6/2018 Schikora et al.
2018/0181650 A1 6/2018 Komatsuda et al.
2018/0181716 A1 6/2018 Mander et al.
2018/0189734 A1 7/2018 Newhouse et al.
2018/0210936 A1 7/2018 Reynolds et al.
2018/0225270 A1 8/2018 Bhide et al.
2018/0232422 A1 8/2018 Park et al.
2018/0260371 A1 9/2018 Theodore et al.
2018/0260435 A1 9/2018 Xu
2018/0262705 A1 9/2018 Park et al.
2018/0276417 A1 9/2018 Cerezo Sanchez
2018/0285918 A1 10/2018 Staggs
2018/0293217 A1 10/2018 Callaghan
2018/0293587 A1 10/2018 Oda
2018/0293669 A1 10/2018 Jackson et al.
2018/0329930 A1 11/2018 Eberlein et al.
2018/0330320 A1 11/2018 Kohli
2018/0357047 A1 12/2018 Brown et al.
2018/0357305 A1 12/2018 Kinast et al.
2018/0365429 A1 12/2018 Segal
2018/0367484 A1 12/2018 Rodriguez et al.
2018/0373434 A1 12/2018 Switzer et al.
2018/0373757 A1 12/2018 Schukovets et al.
2019/0005094 A1 1/2019 Yi et al.
2019/0011310 A1 1/2019 Turnbull et al.
2019/0012306 A1 1/2019 Dvorak
2019/0012342 A1 1/2019 Cohn
2019/0028360 A1 1/2019 Douglas et al.
2019/0034395 A1 1/2019 Curry et al.
2019/0036989 A1 1/2019 Eirinberg et al.
2019/0042628 A1 2/2019 Rajpara
2019/0050445 A1 2/2019 Griffith et al.
2019/0050466 A1 2/2019 Kim et al.

(56) References Cited

U.S. PATENT DOCUMENTS

2019/0050812 A1 2/2019 Boileau
2019/0056856 A1 2/2019 Simmons et al.
2019/0065545 A1 2/2019 Hazel et al.
2019/0068703 A1 2/2019 Vora et al.
2019/0073350 A1 3/2019 Shiotani
2019/0079751 A1 3/2019 Foskett et al.
2019/0095413 A1 3/2019 Davis et al.
2019/0097909 A1 3/2019 Puri et al.
2019/0102425 A1 4/2019 Obeidat
2019/0108046 A1 4/2019 Spencer-Harper et al.
2019/0113935 A1 4/2019 Kuo et al.
2019/0114308 A1 4/2019 Hancock
2019/0114589 A1 4/2019 Voss et al.
2019/0123924 A1 4/2019 Embiricos et al.
2019/0130611 A1 5/2019 Black et al.
2019/0138583 A1 5/2019 Silk et al.
2019/0138588 A1 5/2019 Silk et al.
2019/0138653 A1 5/2019 Roller et al.
2019/0147030 A1 5/2019 Stein et al.
2019/0155821 A1 5/2019 Dirisala
2019/0166110 A1 5/2019 Miu
2019/0179501 A1 6/2019 Seeley et al.
2019/0199823 A1 6/2019 Underwood et al.
2019/0208058 A1 7/2019 Dvorkin et al.
2019/0213557 A1 7/2019 Dotan-Cohen et al.
2019/0220161 A1 7/2019 Loftus et al.
2019/0236188 A1 8/2019 Mckenna
2019/0243879 A1 8/2019 Harley et al.
2019/0251884 A1 8/2019 Burns et al.
2019/0258461 A1 8/2019 Li et al.
2019/0258706 A1 8/2019 Li et al.
2019/0286839 A1 9/2019 Mutha et al.
2019/0306009 A1 10/2019 Makovsky et al.
2019/0312899 A1 10/2019 Shulman et al.
2019/0324840 A1 10/2019 Malamut et al.
2019/0325012 A1 10/2019 Delaney et al.
2019/0327294 A1 10/2019 Subramani Nadar et al.
2019/0340550 A1 11/2019 Denger et al.
2019/0347077 A1 11/2019 Huebra
2019/0349447 A1 11/2019 Adams et al.
2019/0361879 A1 11/2019 Rogynskyy et al.
2019/0361971 A1 11/2019 Zenger et al.
2019/0364009 A1 11/2019 Joseph et al.
2019/0371442 A1 12/2019 Schoenberg
2019/0377791 A1 12/2019 Abou Mahmoud et al.
2019/0391707 A1 12/2019 Ristow et al.
2020/0005248 A1 1/2020 Gerzi et al.
2020/0005295 A1 1/2020 Murphy
2020/0012629 A1 1/2020 Lereya et al.
2020/0019548 A1 1/2020 Agnew et al.
2020/0019595 A1 1/2020 Azua Garcia
2020/0026352 A1 1/2020 Wang et al.
2020/0026397 A1 1/2020 Wohlstadter et al.
2020/0042648 A1 2/2020 Rao
2020/0050696 A1 2/2020 Mowatt et al.
2020/0053176 A1 2/2020 Jimenez Salgado et al.
2020/0125574 A1 4/2020 Ghoshal et al.
2020/0134002 A1 4/2020 Tung et al.
2020/0142546 A1 5/2020 Breedvelt-Schouten et al.
2020/0151630 A1 5/2020 Shakhnovich
2020/0159558 A1 5/2020 Bak et al.
2020/0175094 A1 6/2020 Palmer
2020/0176089 A1 6/2020 Jones et al.
2020/0192646 A1 6/2020 Yerramreddy et al.
2020/0192785 A1 6/2020 Chen
2020/0193388 A1 6/2020 Tran-Kiem et al.
2020/0236110 A1 7/2020 Metzler et al.
2020/0247661 A1 8/2020 Rao et al.
2020/0265112 A1 8/2020 Fox et al.
2020/0279315 A1 9/2020 Manggala
2020/0293337 A1 9/2020 Rangasamy et al.
2020/0293616 A1 9/2020 Nelson et al.
2020/0301678 A1 9/2020 Burman et al.
2020/0301902 A1 9/2020 Maloy et al.
2020/0310835 A1 10/2020 Momchilov
2020/0310888 A1 10/2020 Gopalan et al.
2020/0326824 A1 10/2020 Magahern et al.
2020/0327244 A1 10/2020 Blass et al.
2020/0334019 A1 10/2020 Bosworth et al.
2020/0348809 A1 11/2020 Drescher
2020/0349320 A1 11/2020 Owens
2020/0356740 A1 11/2020 Principato
2020/0356873 A1 11/2020 Nawrocke et al.
2020/0372055 A1 11/2020 Joko et al.
2020/0374146 A1 11/2020 Chhabra et al.
2020/0380212 A1 12/2020 Butler et al.
2020/0380449 A1 12/2020 Choi
2020/0387664 A1 12/2020 Kusumura et al.
2020/0401581 A1 12/2020 Eubank et al.
2020/0409949 A1 12/2020 Saxena et al.
2020/0410395 A1 12/2020 Ray et al.
2021/0014136 A1 1/2021 Rath
2021/0019287 A1 1/2021 Prasad et al.
2021/0021603 A1 1/2021 Gibbons
2021/0034058 A1 2/2021 Subramanian et al.
2021/0034443 A1 2/2021 Lowin et al.
2021/0035069 A1 2/2021 Parikh
2021/0042796 A1 2/2021 Khoury et al.
2021/0049524 A1 2/2021 Nachum et al.
2021/0049555 A1* 2/2021 Shor .................. G06Q 10/0635
2021/0055955 A1 2/2021 Yankelevich et al.
2021/0056509 A1 2/2021 Lindy
2021/0065203 A1 3/2021 Billigmeier et al.
2021/0072883 A1 3/2021 Migunova et al.
2021/0073526 A1 3/2021 Zeng et al.
2021/0075870 A1 3/2021 Kempf et al.
2021/0081404 A1 3/2021 Kempf et al.
2021/0084120 A1 3/2021 Fisher et al.
2021/0096852 A1 4/2021 Stump et al.
2021/0117864 A1 4/2021 Weast et al.
2021/0124749 A1 4/2021 Suzuki et al.
2021/0124872 A1 4/2021 Lereya
2021/0136027 A1 5/2021 Barbitta et al.
2021/0141923 A1 5/2021 Wu et al.
2021/0149553 A1 5/2021 Lereya et al.
2021/0149688 A1 5/2021 Newell et al.
2021/0149925 A1 5/2021 Mann et al.
2021/0150489 A1 5/2021 Haramati et al.
2021/0158214 A1 5/2021 Witt et al.
2021/0165782 A1 6/2021 Deshpande et al.
2021/0166196 A1 6/2021 Lereya et al.
2021/0166339 A1 6/2021 Mann et al.
2021/0173682 A1 6/2021 Chakraborti et al.
2021/0174006 A1 6/2021 Stokes
2021/0192126 A1 6/2021 Gehrmann et al.
2021/0203549 A1 7/2021 Snehashis et al.
2021/0232484 A1 7/2021 Keneally et al.
2021/0248311 A1 8/2021 Helft et al.
2021/0257065 A1 8/2021 Mander et al.
2021/0264220 A1 8/2021 Wei et al.
2021/0271726 A1 9/2021 Trainor
2021/0273957 A1 9/2021 Boyer et al.
2021/0281428 A1 9/2021 Kempf et al.
2021/0326519 A1 10/2021 Lin et al.
2021/0328888 A1 10/2021 Rath
2021/0342145 A1 11/2021 Miller et al.
2021/0342785 A1 11/2021 Mann et al.
2021/0365446 A1 11/2021 Srivastava et al.
2021/0374197 A1 12/2021 Chauhan
2021/0382611 A1 12/2021 Gan
2021/0397585 A1 12/2021 Seward
2022/0066847 A1 3/2022 Liu et al.
2022/0099454 A1 3/2022 Decrop et al.
2022/0103589 A1 3/2022 Shen et al.
2022/0121325 A1 4/2022 Roberts et al.
2022/0121478 A1 4/2022 Chivukula et al.
2022/0129283 A1 4/2022 Sharma et al.
2022/0138004 A1 5/2022 Nandakumar et al.
2022/0147934 A1 5/2022 Chandrashekar et al.
2022/0191251 A1 6/2022 Gavish et al.
2022/0206864 A1 6/2022 Nadathur et al.

(56) References Cited

U.S. PATENT DOCUMENTS

| | | | |
|---|---|---|---|
| 2022/0221591 | A1 | 7/2022 | Smith et al. |
| 2022/0222427 | A1 | 7/2022 | Mann et al. |
| 2022/0229928 | A1 | 7/2022 | Shachar et al. |
| 2022/0237550 | A1* | 7/2022 | Jennings .............. G06Q 10/063 |
| 2022/0261288 | A1 | 8/2022 | Viswanathan et al. |
| 2022/0291666 | A1 | 9/2022 | Cella et al. |
| 2022/0292180 | A1 | 9/2022 | Chauhan |
| 2022/0308918 | A1 | 9/2022 | Pandey et al. |
| 2022/0335362 | A1 | 10/2022 | Nikain et al. |
| 2022/0343258 | A1* | 10/2022 | Wilde .................. G06Q 10/103 |
| 2022/0357905 | A1 | 11/2022 | Dohmae |
| 2022/0358190 | A1 | 11/2022 | Baghani et al. |
| 2022/0382522 | A1 | 12/2022 | Heynemann Nascentes Da Silva et al. |
| 2022/0413846 | A1 | 12/2022 | Clarke et al. |
| 2023/0004832 | A1 | 1/2023 | Sahasi et al. |
| 2023/0014233 | A1 | 1/2023 | Xiang et al. |
| 2023/0016946 | A1 | 1/2023 | Wouhaybi et al. |
| 2023/0035600 | A1 | 2/2023 | Holzman et al. |
| 2023/0075183 | A1 | 3/2023 | Copty et al. |
| 2023/0081880 | A1 | 3/2023 | Mathur et al. |
| 2023/0083891 | A1 | 3/2023 | Achin et al. |
| 2023/0093470 | A1 | 3/2023 | Dvornik et al. |
| 2023/0108808 | A1 | 4/2023 | Lerman |
| 2023/0113369 | A1 | 4/2023 | Wang et al. |
| 2023/0142774 | A1 | 5/2023 | Hashemi et al. |
| 2023/0153651 | A1 | 5/2023 | Bi et al. |
| 2023/0153724 | A1 | 5/2023 | Thampy et al. |
| 2023/0171241 | A1 | 6/2023 | Amichay et al. |
| 2023/0188516 | A1 | 6/2023 | Danilov et al. |
| 2023/0230006 | A1 | 7/2023 | Bosch et al. |
| 2023/0259390 | A1 | 8/2023 | Howley et al. |
| 2023/0259839 | A1 | 8/2023 | Manalo et al. |
| 2023/0281040 | A1 | 9/2023 | Cao |
| 2023/0316382 | A1 | 10/2023 | Faricy et al. |
| 2023/0385085 | A1 | 11/2023 | Singh |
| 2023/0393832 | A1 | 12/2023 | Touati et al. |
| 2023/0396641 | A1 | 12/2023 | Hebbagodi et al. |
| 2023/0419161 | A1 | 12/2023 | Dines |
| 2024/0046142 | A1 | 2/2024 | Marks et al. |
| 2024/0053727 | A1 | 2/2024 | Timisescu et al. |
| 2024/0054526 | A1 | 2/2024 | Horwitz et al. |
| 2024/0250977 | A1 | 7/2024 | Shulman et al. |
| 2025/0103566 | A1 | 3/2025 | Underwood, Jr. et al. |

FOREIGN PATENT DOCUMENTS

| | | | |
|---|---|---|---|
| CN | 107123424 | A | 9/2017 |
| CN | 107422666 | A | 12/2017 |
| CN | 107623596 | A | 1/2018 |
| CN | 107885656 | A | 4/2018 |
| CN | 108717428 | A | 10/2018 |
| CN | 112929172 | A | 6/2021 |
| DE | 102013104892 | A1 | 11/2014 |
| EP | 3443466 | B1 | 12/2021 |
| JP | H0756821 | A | 3/1995 |
| KR | 20150100760 | A | 9/2015 |
| KR | 20220016276 | A | 2/2022 |
| WO | 2004100015 | A2 | 11/2004 |
| WO | 2006116580 | A2 | 11/2006 |
| WO | 2008109541 | A1 | 9/2008 |
| WO | 2014088393 | A1 | 6/2014 |
| WO | 2017202159 | A1 | 11/2017 |
| WO | 2018023798 | A1 | 2/2018 |
| WO | 2018042424 | A1 | 3/2018 |
| WO | 2020139865 | A1 | 7/2020 |
| WO | 2020187408 | A1 | 9/2020 |
| WO | 2020215123 | A1 | 10/2020 |
| WO | 2021096944 | A1 | 5/2021 |
| WO | 2021144656 | A1 | 7/2021 |
| WO | 2021161104 | A1 | 8/2021 |
| WO | 2021220058 | A1 | 11/2021 |
| WO | 2022153122 | A1 | 7/2022 |

OTHER PUBLICATIONS

P. Genfer, J. Grabner, C. Zoffi, M. Bernhart and T. Grechenig, "Visualizing Metric Trends for Software Portfolio Quality Management," 2021 Working Conference on Software Visualization (VISSOFT), Luxembourg, 2021, pp. 88-99, doi: 10.1109/VISSOFT52517.2021.00018. (Year: 2021).*

Abor Jr. C., "Low-Code and No-Code AI: New AI Development—What is code anymore?!?!" Linkedin, Published Jul. 15, 2023, Retrieved from <https://www.linkedin.com/pulse/low-code-no-code-ai-new-development-what-code-anymore-c-l-abor-jr>, 15 pages.

Anupam et al., "Personalizing the Web Using Site Descriptions," In: Proceedings of the Tenth International Workshop on Database and Expert Systems Applications, Sep. 1999, 7 pages.

Aylward, Grant, "Drag-and-Drop AI Enables Digital Workforce Deployment at Scale Share," Blue Prism, Mar. 19, 2020, Retrieved from <https://www.blueprism.com/resources/ blog/drag-and-drop-ai-enables-digital-workforce-deployment-at-scale/>, 10 pages.

Baarslag et al., "Negotiation as an Interaction Mechanism for Deciding App Permissions," In: Proceedings of the 2016 CHI Conference Extended Abstracts on Human Factors in Computing Systems, 2016, pp. 2012-2019.

Bahrebar et al., "A Novel Type-2 Fuzzy Logic for Improved Risk Analysis of Proton Exchange Membrane Fuel Cells in Marine Power Systems Application," Energies, Mar. 22, 2018, vol. 11, No. 721, pp. 1-16.

Barai et al., "Image Annotation System Using Visual and Textual Features," In: Proceedings of the 16th International Conference on Distributed Multi-media Systems, 2010, 8 pages.

Basic Walkthrough, Aug. 9, 2019, Retrieved from <https://www.youtube.com/watch?v=VpbgWyPf74g>, 16 pages.

Breitgand et al., "Serverless Data Analytics Platform: D3.1 Intital specs of the Serverless Compute and Execution Engine," CloudButton, Jul. 22, 2019, Retrieved from <https://cloudbutton.eu/docs/deliverables/CloudButton_D3.1_Public.pdf>, 56 pages.

Chen et al., "Artificial Intelligence in Education: A Review," IEEEAccess, Apr. 2020, vol. 8, pp. 75264-75278.

Demonstracion en espanol de Monday.com, Published Feb. 20, 2019, Retrieved from <https://www.youtube.com/watch?v=zOqydTgof1A>, 53 pages.

Desmedt et al., "Function-Based Access Control (FBAC) From Access Control Matrix to Access Control Tensor," In: Proceedings of the 8th ACM CCS International Workshop on Managing Insider Security Threats, 2016, 12 pages.

Donath, Judith, "Interfaces Make Meaning," Chapter 3 from The Social Machine: Designs for Living Online, 2014, pp. 41-76.

Dorn et al., "Efficient Full-Field Vibration Measurements and Operational Modal Analysis Using Neuromorphic Event-Based Imaging," Journal of Engineering Mechanics, Jul. 1, 2018, vol. 144, No. 7, 25 pages.

Features, daPulse, Nov. 2021, Retrieved from <web.archive.org/web/2014091818421/https://dapulse.com/features>, 22 pages.

Freund, Karl, "SiMa.ai Creates Drag-And-Drop Platform For Building AI Workflows," Forbes, Sep. 12, 2023, Retrieved from <https://www.forbes.com/sites/karlfreund/2023/09/12/simaai-creates-drag-and-drop-platform-for-building-ai-workflows/?sh=789de8466046>, 6 pages.

Gutwin et al., "Supporting Informal Collaboration in Shared-Workspace Groupware," Journal of Universal Computer Science, 2008, vol. 14, No. 9, pp. 1411-1434.

High Level Overview, daPulse, 2016, Retrieved from <https://web.archive.org/web/20161104170936/https://dapulse.com>, 12 pages.

Hupfer et al., "Introducing collaboration into an application development environment," In: Proceedings of the 2004 ACM Conference on Computer Supported Cooperative Work, Nov. 2004, vol. 6, No. 3, pp. 21-24.

International Search Report and Written Opinion in PCT/IB2020/000658, mailed Nov. 11, 2020, 8 pages.

International Search Report and Written Opinion in PCT/IB2020/000974, mailed May 3, 2021, 15 pages.

International Search Report and Written Opinion in PCT/IB2021/000090, mailed Jul. 27, 2021, 12 pages.

(56) References Cited

OTHER PUBLICATIONS

International Search Report and Written Opinion in PCT/IB2021/000297, mailed Oct. 12, 2021, 17 pages.
International Search Report and Written Opinion in PCT/IB2023/061991, mailed Feb. 26, 2024, 6 pages.
International Search Report and Written Opinion in PCT/IB2023/061992, mailed Mar. 19, 2024, 7 pages.
International Search Report and Written Opinion in PCT/IB2023/061994, mailed Apr. 25, 2024, 11 pages.
Ionescu et al., "A chat-centric collaborative environment for web-based real-time collaboration," 2015 IEEE 10th Jubilee International Symposium on Applied Computational Intelligence and Informatics, May 21-23, 2015, pp. 105-110.
Kantorovitz, Isaiah, "Lexical Analysis Tool," May 2004, Retrieved from <https://dl.acm.org/doi/pdf/10.1145/997140.997147>, vol. 39, No. 5, pp. 66-74.
Kollmann, Franz, "Realizing Fine-Granular Read and Write Rights on Tree Structured Documents," in: The Second International Conference on Availability, Reliability and Security, 2007, 7 pages.
Larson, Stephen, "Introducing Data Mining Concepts Using Microsoft Excel's Table Analysis Tools," Oct. 2015, Retrieved from <https://dl.acm.org/doi/pdf/10.5555/2831373.2831394>, pp. 127-129.
Lins et al., "Artificial Intelligence as a Service," Business & Information Systems Engineering, vol. 63, 2021, pp. 441-456.
List et al., "An Evaluation of Conceptual Business Process Modelling Languages," In: Proceedings of the 2006 ACM symposium on Applied Computing, Apr. 2006, pp. 1532-1539.
Monday.com Walkthrough 2018/All Features, Platforms & Thoughts, Transcription Provided, Mar. 1, 2018, pp. 1-55.
Ni et al., "Asynchronous Event-Based Visual Shape Tracking for Stable Haptic Feedback in Microrobotics," IEEE Transactions on Robotics, vol. 28, No. 5, Oct. 1, 2012, pp. 1081-1089.
Pedersen et al., "Tivoli: an electronic whiteboard for informal workgroup meetings," Conference on Human Factors in Computing Systems: Proceedings of the INTERACT '93 and CHI '93 conference on Human factors in computing systems, Apr. 24-29, 1993, pp. 391-398.
Peltier, J., "Clustered and Stacked Column and Bar Charts," Peltier Technical Services, Inc., Aug. 2011, 128 pages.
Pivot table, Wikipedia, Jul. 2021, Retrieved from <https://en.wikepedia .org/w/index.php?title=Pivot table&oldid=857163289>, 5 pages.
Rodrigo, A., "Project Management with Monday.com: A 101 Introduction," Envato Tuts+, Jul. 22, 2019, Retrieved from <https://business.tutsplus.com/tutorials/project-management-with-mondaycom--cms-33586>, 11 pages.
Singh et al., "A Theoretical Framework of a BIM-based Multi-Disciplinary Collaboration Platform," Automation in Construction, Nov. 2011, vol. 20, pp. 134-144.
Sreenath et al., "Agent-based service selection," Journal of Web Semantics 1.3, Oct. 2003, 29 pages.
Stancu et al., "SecCollab-Improving Confidentiality for Existing Cloud-Based Collaborative Editors," In: 2017 21st International Conferences on Control Systems and Computer Science, 2017, pp. 324-331.
Stohr, E., "Workflow Automation: Overview and Research Issues," Information Systems Frontiers, 2001, pp. 281-296.
Sun et al., "Geoweaver: Advanced Cyberinfrastructure for Managing Hybrid Geoscientific AI Workflows," International Journal of Geo-Information, Feb. 2020, vol. 9, 20 pages.
Switch Presenter While Using ShowMyPC, ShowMyPC, Aug. 2016, Retrieved from <The Wayback Machine>, 1 page.
Using Filters in Overview, Published Mar. 7, 2017, Retrieved from <https://www.youtube.com/watch?v=hycANhz7gww> 1 page.
Wilson et al., "Beyond Social Graphs: User Interactions in Online Social Networks and their Implications," ACM Transactions on the Web, Nov. 2012, vol. 6, No. 4, 31 pages.
Yamada et al., "A Software Tag Generation System to Realize Software Traceability," 2010 Asia Pacific Software Engineering Conference, pp. 423-432.
Zhang et al., "Integrating semantic NLP and logic reasoning into a unified system for fully-automated code checking," Automation in Construction, 2017, vol. 73, 2017, pp. 45-57.
International Search Report and Written Opinion in PCT/IB2024/055803, mailed Sep. 30, 2024, 13 pages.

* cited by examiner

DATA STRUCTURE 200

204

202

| Project Name | Type | Project size ($) | Project Status | Number of Tasks | Due Date | Project Manager | Task Completion Rate | Region |
|---|---|---|---|---|---|---|---|---|
| Name A | X | 94K | Off Track | 25 | 06.09 | Pers. A | 40% | North America |
| Name B | Y | 52K | At Risk | 60 | 06.06 | Pers. B | 15% | Europe |
| Name C | X | 11K | On Track | 10 | 06.04 | Pers. A, Pers. C | 25% | Asia |
| Name D | Y | 156K | On Track | 14 | 06.24 | Pers. D, Pers. B | 90% | Middle-East |
| Name E | Y | 23K | Off Track | 53 | 08.08 | Pers. E | 60% | Europe |
| Name F | Z | 68K | At Risk | 85 | 14.07 | Pers. C | 55% | Africa |
| Name G | X | 15K | Off Track | 32 | 08.30 | Pers. B, Pers. E | 22% | North America |
| Name H | Y | 240K | On Track | 20 | 10.15 | Pers. D | 95% | Europe |
| ⋮ | ⋮ | ⋮ | ⋮ | ⋮ | ⋮ | ⋮ | ⋮ | ⋮ |
| Name AJ | Z | 136K | At Risk | Evaluation | 05.30 | Pers. D, Pers. E | 14% | Asia |

DIGITAL PROCESSING SYSTEMS AND METHODS FOR ENHANCED DATA REPRESENTATION

CROSS-REFERENCE TO RELATED APPLICATION

This application claims the benefit of priority to U.S. Provisional Patent Application No. 63/548,339, filed Nov. 13, 2023, which is incorporated herein by reference in its entirety.

TECHNICAL FIELD

The present disclosure relates generally to data management solutions systems, methods, and computer-readable media, in a collaborative work system. More specifically, the disclosed embodiments enable user-enhanced data representation. Various disclosed embodiments employ structures and non-transitory computer-readable storage media that store program instructions executable by at least one processing device to perform any of the steps and/or methods described herein.

BACKGROUND

Operations of modern enterprises can be complicated and time-consuming. In many cases, managing a single project often requires integrating several employees, departments, and other resources of the entity. To manage challenging operations, project management software applications or platforms (e.g., Software as a Service platforms or SaaS platforms) may be used. Such software applications allow a user to organize, plan, and manage resources in collaboration with other users by providing a collaborative platform in which users share project-related information to optimize the time and resources spent on each project.

Despite the utility of project management tools, they often fall short in providing project managers with comprehensive insights into existing project latencies and potential risks. Additionally, for large corporations with multiple teams distributed across the globe, synthesizing an entire project portfolio into a single view can be particularly challenging. These organizations often deal with vast amounts of data generated from various sources, including different departments, regional offices, and external partners. This data is typically stored in disparate systems and formats, making it difficult to consolidate and analyze effectively. Maintaining data consistency and quality with real-time synchronization across different systems and sources can pose significant technical challenges and consume valuable time. The present disclosure describes solutions to address or overcome one or more of the above-stated challenges, among other drawbacks in existing project management systems.

SUMMARY

Some embodiments consistent with the present disclosure provide digital systems, methods, and computer-readable media for implementing data management solutions enabling user-enhanced data representation. Some such embodiments may be implemented using a combination of conventional hardware and software as well as specialized hardware and software such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

In one embodiment, systems, methods, and computer-readable media for providing a categorized display of discrete graphical elements associated with project-related data are disclosed. Systems, methods, devices, and non-transitory computer readable media may involve at least one processor configured to: access a data structure including data on a plurality of differing projects, wherein each project has one of a plurality of project statuses; receive a request for a status-level summarization of the plurality of projects; in response to the request for the status-level summarization, scan the data structure; based on the scanning of the data structure, aggregate project status level categorization data associated with the plurality of projects, thereby defining a set of status groups; generate a plurality of interactive aggregate project graphics, each interactive aggregate project graphic including a plurality of interactive project elements, and each of the plurality of interactive aggregate project graphics being associated with a differing one of the status groups in the set; and display each of the interactive aggregate project graphics as interactive aggregate project graphics on a common display.

In another embodiment, methods, and computer-readable media for improving dataset state determinations using artificial intelligence (AI) are disclosed. Systems, methods, devices, and non-transitory computer-readable media may involve at least one processor configured to: access a data structure including a plurality of differing datasets, wherein each of the plurality of datasets is associated with a user-determined dataset status, and wherein the user-determined dataset status is selected from a plurality of dataset statuses; for each of the plurality of datasets: input the dataset into an AI agent configured to analyze the dataset to automatically determine an associated AI-determined dataset status; compare the user-determined dataset status with the AI-determined dataset status; and when the comparing results in a determination of a difference between the user-determined dataset status and the AI-determined dataset status, institute a remedial action.

BRIEF DESCRIPTION OF DRAWINGS

The accompanying drawings, which are incorporated in and constitute a part of this disclosure, illustrate various disclosed embodiments. In the drawings:

FIG. 2 illustrates a representation of an exemplary data structure, consistent with some disclosed embodiments;

FIGS. 6A and 6B are exemplary illustrations of displays including a plurality of datasets and AI-determined dataset statuses, consistent with some of the disclosed embodiments;

DETAILED DESCRIPTION

Figure 1:
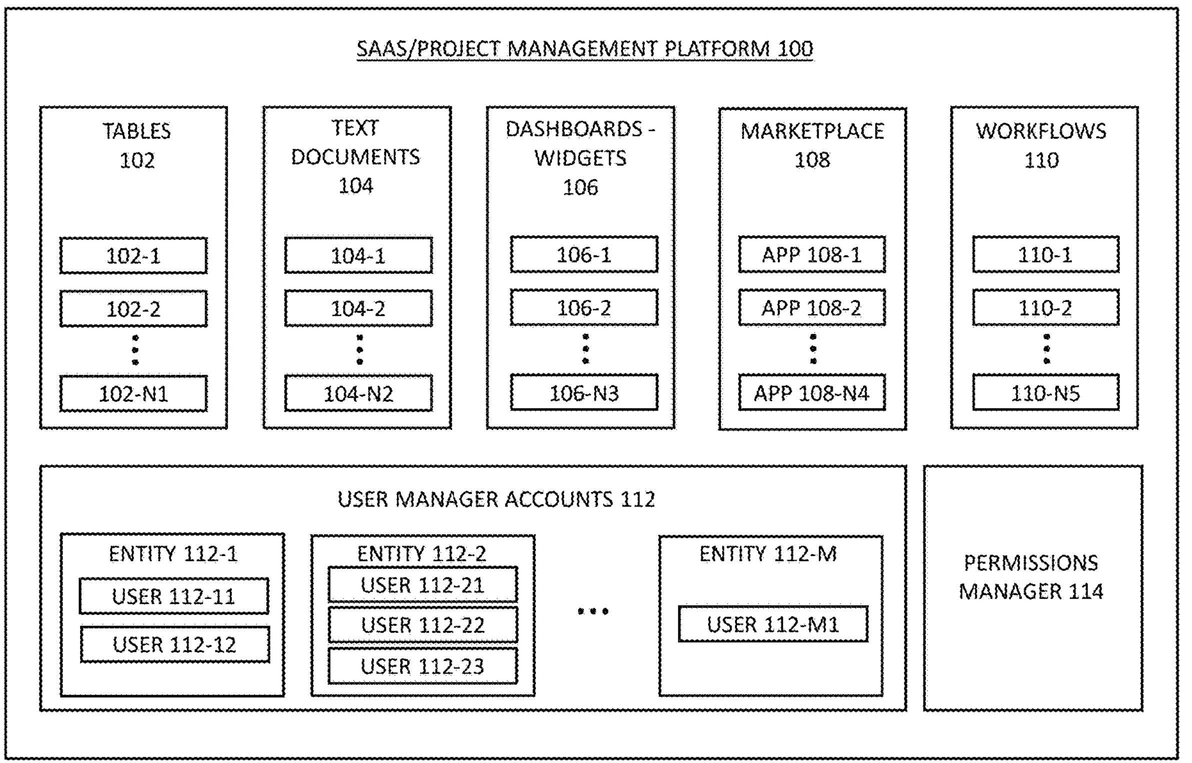
FIG. 1 is a block diagram of an exemplary SaaS/project management platform, consistent with some disclosed embodiments.

Disclosed embodiments provide new and improved techniques for implementing data management solutions enabling user-enhanced data representation.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspects of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience and form the word "embodiment" as used herein is intended to refer to a single embodiment or multiple embodiments of the disclosure.

Certain embodiments disclosed herein include devices, systems, and methods for collaborative work systems that may allow one or more users to interact with information in real-time. To avoid repetition, the functionality of some embodiments is described herein solely in connection with a processor or at least one processor. It is to be understood that such exemplary descriptions of functionality apply equally to methods and computer-readable media and constitute a written description of systems, methods, and computer-readable media. The underlying platform may allow a user to structure systems, methods, or computer-readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond what is displayed in a table. For example, a board may further contain cell comments, hidden rows and columns, formulas, data validation rules, filters, specific formatting, audit logs, version history, cross-referencing with different boards, external linking with data sources, permissions of access, or a combination thereof. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining one or more associated data types and may further include metadata (e.g., definitions, validation rules, ranges, hyperlinks, macros . . . ). When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure but rather may be practiced in conjunction with any desired organizational arrangement. In addition, tablature may include any type of information, depending on intended use. As an example, when used in conjunction with a project/task management application, the tablature may include any information associated with one or more tasks, such as one or more status values, projects, time-frames/deadlines, countries, persons, teams, progress statuses, a combination thereof, or any other information related to a task. In some cases, a hierarchy may be established between different items/cells in a same row. For example, a unique identifier (UID) may be assigned to an item and the other cell of the same row may then be associated with the item or the assigned UID.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics (which may also be referred to more generically as "widgets"). In some instances, dashboards may also include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. In alternative scenarios, permission may not only be provided at the board level, but also at a more granular level such as rows, columns, and even individual cells, allowing for fine-grained control over who may access, view, edit, or interact with the data included in the board, particularly useful when dealing with collaborative boards. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real-time in collaborative work systems involving electronic collaborative word-processing documents. Electronic collaborative word processing documents (and other variations of the term) as used herein are not limited to only digital files for word processing but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information and may be linked to other sources of data for dynamic updates. Blocks may be automatically organized by the system or may be manually selected by a user according to preference. In one embodiment, a user may select a segment of any information in an electronic word-processing document and assign it as a particular block for input, editing, formatting, or any other further configuration.

An electronic collaborative word-processing document may be stored in one or more repositories connected to a network accessible by one or more users through their computing devices. In one embodiment, one or more users may simultaneously edit an electronic collaborative word-processing document. The one or more users may access the electronic collaborative word-processing document through one or more user devices connected to a network. User access to an electronic collaborative word processing document may be managed through permission settings set by an author of the electronic collaborative word processing document. Alternatively, permissions to specific portions of the electronic collaborative word-processing document may be provided in order to control access, facilitate collaboration, and ensure that different users have appropriate levels of involvement and authority over different parts of the content. An electronic collaborative word-processing document may include graphical user interface elements enabled to support the input, display, and management of multiple edits made by multiple users operating simultaneously within the same document.

Various embodiments are described herein with reference to a system, method, device, or computer-readable medium. It is intended that the disclosure of one is a disclosure of all. For example, it is to be understood that disclosure of a computer-readable medium described herein also constitutes a disclosure of methods implemented by the computer-readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer-readable medium containing instructions that when executed by at least one processor, cause the at least one processor to perform a method. Non-transitory computer-readable mediums may be any medium capable of storing data in any memory in a way that may be read by any computing device with a processor to carry out methods or any other instructions stored in the memory. The non-transitory computer-readable medium may be implemented as hardware, firmware, software, or any combination thereof. Moreover, the software may preferably be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium may be any computer-readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as temporary storage. Accordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuits (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated into a single circuit. When more than one processor is used, the processors may be configured to operate independently or collaboratively and may be co-located or located remotely from each other. The processors may be coupled electrically, magnetically, optically, acoustically, mechanically, or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the foregoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or an unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near-field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column-oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), or virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multi-dimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database, or NoSQL alternatives for data storage/search such as MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table or board, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data with different levels of granularity (e.g., a specific board, a plurality of boards . . . ) or across an entirety of an account or entity (e.g., multiple boards, workspaces, or projects within the account). An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more automations, logical rules, logical sentence structures, and logical (sentence structure) templates. While these terms are described herein in differing contexts, in the broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that responds to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyperparameters, where the hyperparameters are set manually by a person or automatically by a process external to the machine learning algorithm (such as a hyperparameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

Project management platforms are digital tools or software designed to streamline and automate various processes within an organization. They help to coordinate and manage tasks, activities, and information flow among several team members or different departments, ensuring efficient collaboration and productivity. These platforms typically provide features such as task assignment, progress tracking, notifications, and document management. In some cases, these platforms may correspond to a Software-as-a-Service (SaaS) platform. Within the context of this disclosure, a SaaS platform may refer to any kind of cloud-based software delivery model where service providers host software applications and make them accessible to users over the Internet. Instead of installing, managing, and maintaining the software locally, users access and utilize it through a web browser or thin client interface.

SaaS platforms offer a wide range of applications and services to meet various business needs such as customer relationship management (CRM), human resources management (HRM), project management, accounting, marketing automation, and more. In most scenarios, these platforms operate on a subscription basis, with customers paying recurring fees for software access and usage. SaaS platforms may provide several advantages including:

Accessibility: Users may conveniently and securely access software and data from any device with an internet connection.

Scalability: SaaS platforms may easily scale up or down to accommodate changing business requirements, providing flexibility and cost-effectiveness.

Cost-effectiveness: By eliminating upfront investments in hardware and software, SaaS may reduce initial costs. Customers may pay subscription fees based on their usage.

Maintenance and Updates: Service providers handle software maintenance, updates, and security patches, relieving customers of these responsibilities.

Collaboration: SaaS platforms often offer collaboration features, enabling multiple users to work together, share data, and communicate within the platform.

Customization: SaaS platforms can offer a high level of customization, allowing businesses to tailor the software to their specific needs. These applications can be seamlessly integrated with other business applications, particularly those offered by the same software provider. This integration enables smooth data flow and collaboration between different software systems, enhancing overall productivity and efficiency.

Some examples of SaaS platforms include Monday.com™ for project management, Salesforce™ for CRM, Slack™ for team collaboration, Dropbox™ for file hosting and sharing, Microsoft 365™ for productivity tools, Google Workspace™ apps for productivity and collaboration tools, Zendesk™ for customer support, HubSpot™ for marketing, and Shopify™ for e-commerce.

SaaS platforms may include a plurality of SaaS platform elements which may correspond to components or building blocks of the platform that work together to deliver software applications and services over the Internet. Examples of such elements may include application software, infrastructure, or user interface. For example, a platform may offer project management capabilities to its users via dashboards, tables, text documents, a workflow manager, diverse applications offered on a marketplace, all of which constitute building blocks and therefore elements of the platform. Application offered on the marketplace may be provided by developers external to the SaaS platform, accordingly, they may utilize a user interface different from a generic user interface provided by the SaaS platform. In addition, each SaaS platform element may include a plurality of SaaS platform sub-elements which may refer to smaller components or features that are part of a larger element within a SaaS platform. These sub-elements may be designed to perform specific tasks or provide specialized functionality. The collaboration of multiple sub-elements aims to create a comprehensive and integrated SaaS solution. Examples of SaaS platform sub-element may include a widget associated with a dashboard, a column or a cell associated with a table, a workflow block associated with a workflow manager, or pipeline management tools.

FIG. 1 is a block diagram of an exemplary SaaS platform 100. SaaS platform 100 may be associated with one or more components of a computing network such as the one shown in FIG. 9. As illustrated, SaaS platform 100 includes a plurality of SaaS platform elements, namely Tables 102, Text documents 104, Dashboards 106, Marketplace 108, and Workflows 110. Each of these SaaS platform elements includes a plurality of SaaS platform sub-elements respectively 102-1 through 102-N1 for Tables 102, 104-1 through 104-N2 for Text documents 104, 106-1 through 106-N3 for Dashboards 106, APP 20 through APP 108-N4 for Marketplace 108 and 110-1 through 101-N5 for Workflows 110, wherein N1, N2, N3, N4 and N5 represent natural numbers.

It is to be appreciated that these SaaS platform elements may collaborate seamlessly. For instance, a text document (e.g., 104-1) might incorporate data from a table (e.g., 102-1), and a dashboard/widget (e.g., 106-1) might display data originating from a table (e.g., 102-1). This integration may ensure a cohesive and flexible user experience, allowing different components of the platform to work together effectively and dynamically share data. Additionally, it is to be appreciated that the utilizations of data originating from a first SaaS platform element (e.g., a table), by a second SaaS platform (e.g., a widget included a plurality of graphical representations) may not necessarily lead to additional memory allocation on a SaaS platform server. This efficiency maybe achieved because the data is not duplicated for each view (a table view or a dashboard/widget view). Instead, the data may be dynamically imported from the first SaaS platform element, often using pointers to their specific locations in memory. This approach ensures that the original data remains intact and avoids the overhead associated with creating multiple copies, thereby optimizing memory usage and improving the overall performance of the server. For example, when a user of the SaaS platform requests a graphical representation (widget view) of data from a table, the platform may retrieve the necessary data by referencing the memory locations where the data is stored, rather than creating new instances of the data. These references, or pointers, serve as links to the original data, enabling the server to efficiently handle multiple requests without incurring significant memory costs. By leveraging this method, the SaaS platform may support numerous simultaneous views and graphical representations without a proportional increase in memory usage. Furthermore, this approach allows for real-time data updates to be reflected instantly across all views. Since all views point to the same data source, any changes to the data are immediately visible, ensuring consistency and accuracy. This method may be advantageous in environments where data is frequently updated, such as in financial systems, real-time analytics, and monitoring applications.

Several entity or organization accounts (user management accounts) 112 (112-1 to 112-M, M being a natural number) may be affiliated with SaaS platform 100 and managed via a user manager. Each of these entity accounts may include at least one user account. For example, entity account 112-1 includes two user accounts 112-11, 112-12, entity account 112-2 three user accounts 112-21, 112-22, and 112-23, and entity account 112-M one user account 112-M1. Within the context of the disclosed embodiments, an entity account may refer to the central account managing the overall SaaS platform subscription, billing, and settings. Within this entity account, multiple user accounts may be created for different individuals within the entity/organization. User accounts may have their own login credentials, access privileges, and settings. The entity account owner or administrators may have control over access, permissions, and data segregation. User accounts may collaborate and share resources within the entity account while maintaining a personalized experience. Each of the user accounts 112 may include different permutations of SaaS platform elements such as a plurality of tables, text documents, dashboards, marketplace applications, or CRM/pipeline management tools (not shown in FIG. 1) in association with the above-mentioned SaaS platform elements 102, 104, 106, 108, and 110. Accordingly, various SaaS platform elements or sub-elements may include metadata associated with users. Metadata associated with users may provide additional information and context about the users themselves, their profiles, roles, preferences, and interactions within the SaaS platform. Examples of metadata may include user profiles, roles and permissions, activity logs, usage indications, preferences and settings, user associations/relationships, user history, or a combination thereof.

In addition, each of these user accounts may include one or more private apps, that have been specifically designed and tailored to suit the needs of a user and that employ functionalities offered by or in association with SaaS platform 100 (via SaaS platform elements 102, 104, 106, 108, and 110 or their associated sub-elements). Private apps are exclusively accessible to users who are affiliated with an entity owning or implementing that app. These applications may not be publicly available (i.e., not on the market/publicly offered on the marketplace 108) and may only be accessed by individuals who have specific authorization or are part of the designated user group. The privacy settings associated with these apps restrict access to ensure that only authorized users can use and interact with them. This level of privacy and restricted access helps maintain confidentiality, control, and security over the application's functionalities and data, limiting usage to approved individuals within the user account. Centralization of user access and authorization management is performed by a permission manager 114 enabling administrators to control and regulate user privileges, ensuring that users have appropriate levels of access to data, features, and resources based on their roles and responsibilities. Permissions Manager 114 may offer granular control, and role-based access, facilitating efficient user management, collaboration, and compliance monitoring. Its objective is to enhance data security, streamline user administration, and maintain proper governance within the SaaS platform.

In some cases, a project management solution may be incorporated into a broader project management platform or may be offered as an offline software or as a Software-as-a-Service (SaaS). Project management solutions represent software application solutions designed to help individuals and teams plan, execute, and monitor projects efficiently. These solutions may provide tools for organizing tasks, managing resources, tracking progress, and facilitating collaboration among team members. Example features may include but are not limited to task scheduling, resource allocation, time tracking, budget management, and reporting. By centralizing project-related information and workflows, project management solutions aim to optimize productivity, ensure timely project completion, and improve overall project outcomes. At their core, project management solutions may encompass a diverse array of utilities. These utilities may include dynamic data tables and interactive boards that empower professionals to monitor and orchestrate every aspect of their project workflow. From the start of the project to the project deliverable, these solutions may offer a versatile toolkit designed to optimize performance and streamline processes.

Still referring to FIG. 1, SaaS platform 100 may include one or more project management tools that may involve a combination of one or more SaaS platform elements or sub-elements. For example, a project management tool may leverage data stored in one or more tables and offer comprehensive data visualization through prebuilt dashboards and/or widgets, furnishing users with deep and meaningful insights into their operations. In some embodiments, these tools may enable visualization of alphanumeric data in a non-alphanumeric manner. For instance, instead of conventional tables or charts, these tools may employ immersive graphical interfaces or interactive simulations to depict complex datasets. These visualizations may encompass versatile views such as Kanban boards, timeline representations, Gannt charts, or other representations, offering users diverse perspectives and facilitating informed decision-making. This approach may enable users to interact with the data in a more intuitive and engaging manner, facilitating deeper understanding and analysis. Each of these project management tools may be coupled to a one or more user accounts 112 and may operate synergistically within SaaS platform 100, empowering users to streamline and optimize their project workflow. These tools leverage the analytical capabilities of the SaaS platform to provide users with actionable insights and facilitate efficient management of project workflow.

To provide meaningful data visualizations, project management tools may access one or more data structures. As mentioned earlier, a data structure refers to any collection of data values and relationships among them. A data structure may include a plurality of data items and may define the relationship between the items and the operations that may be performed on them. Each item may include one or more characteristics associated with a value (e.g., an alphanumeric value). Within the context of project management, a data structure may include a plurality of items. Examples of items may include but are not limited to a project, a task, a deal, a transaction, a client account, a prospect, or an order. A characteristic of an item may include any distinctive feature or quality that helps to identify or define an item. The characteristics of items may include, for example, a name a type, a project/budget size, a project status, a number of tasks, a task completion rate, one or more associated project managers, a client name, a client type, one or more due dates, a region, stakeholder(s), a level of strategic importance, resource type, vendor involvement, comments, or any additional feature or quality relevant to an item included in a data structure. The characteristics of an item may present relationships and patterns that offer valuable insights into operational efficiencies. For instance, tracking the performance of a given project team member in relation to completion rates may highlight strengths and areas for improvement within the project team.

The plurality of items of a data structure may be associated with a common objective. A common objective refers to a shared goal or aim. Examples of common objectives in a project management context include efficiently allocating and managing resources, including personnel, equipment, and budget, to ensure projects stay on track and within budget; tracking and measuring projects performance against predefined metrics to ensure projects are progressing as planned and make adjustments as necessary, or ensure all project activities are completed, deliverables are handed over, and project documentations are finalized and archived. In general, a common objective may refer to increasing a positive measure and/or decreasing a negative measure. In this context, a common objective may guide the arrangement and interaction of the individual elements towards a shared purpose or goal. This objective may span a broad spectrum, ranging from high-level aspirations, such as maximizing efficiency, to more specific aims, such as streamlining processes or achieving targeted outcomes. Whether the objective is overarching or focused, the association between the items and the common objective underscores the cohesion and purposefulness of the data structure, driving meaningful insights and outcomes. A comprehensive visualization of the data structure may provide valuable insights into the common objective. By presenting the relationships and patterns inherent within the data structure, such a visualization may enable a deeper understanding of how individual items contribute to the overarching goal. This comprehensive view may facilitate the identification of key trends, dependencies, and potential optimizations that can propel progress toward achieving the common objective. Moreover, by offering a holistic perspective, the visualization may empower users (e.g., program manager, portfolio manager, etc.) to make informed decisions and strategic adjustments, leveraging the collective knowledge embedded within the data structure to drive toward the desired common objective.

FIG. 2 illustrates a representation of an exemplary data structure 200. Consistent with the disclosed embodiments, data structure 200 may be accessed by one or more project management tools. Data structure 200 includes data on a plurality of differing projects 202, each included in a row of data structure 200. Each item 202 includes a plurality of characteristics or project-related data 204, represented in columns of data structure 200, where each column is associated with a single characteristic or project-related data (First column=Project Name, Second column=Project Type, etc.). Although data structure 200 is represented here as a table, it is to be appreciated that data structure 200 may adopt any suitable format. Examples of formats include but are not limited to lists, linked lists, hash tables, or boards. Additionally, data structure 200 may be stored in a database in a different digital format. For example, data structure 200 may be stored as a text file, a CSV file, an XML file, a JSON file, a YAML file, or an INI file. In some embodiments, data structure 200 may be directly stored in a database/server accessible to and handled by a project management solution or SaaS platform 100. Alternatively, data structure 200 may be stored in a database external to SaaS platform 100, which may be managed by another external cloud provider. In such cases, proper credentials/authentication flow may be required to grant access to the external database. Data structure 200 may also include unstructured databases such as a folder of documents or a bunch of emails, in which the value may appear directly or be generated ad hoc by AI.

Some disclosed embodiments involve providing a categorized display of discrete graphical elements associated with project-related data. Within the context of this disclosure, a categorized display refers to any organized presentation of information or items grouped into specific categories or sections. A categorized display may help users easily navigate a substantial amount of data (e.g., project-related data) and find what they are looking for by sorting related items together based on common characteristics (e.g., project status) or themes. Discrete graphical elements refer to individual visual components that are distinct from one another, enabling visual comparison between them. Each element may adopt a plurality of graphical characteristics such as shape, color, size/dimensions, borderline, texture, or position with respect to a screen and/or other presented elements, that may be used to visually encode and/or provide information. In this disclosure, unless specified otherwise, a graphical element may equally refer to the visual representation/entity as presented on a display and/or to the underlying data model of the visual representation that may be readily understood and manipulated by a processing device and that includes properties defining the graphical characteristics of the visual representation.

The provision of a categorized display may enable users to quickly visualize a substantial amount of data at a glance. Organizing information into distinct categories may help users easily navigate through the data and identify relevant patterns, trends, and insights. This method of display may enhance users' ability to comprehend complex information efficiently, as it breaks down large datasets into manageable sections. Additionally, categorized displays may facilitate better decision-making by highlighting key data points and relationships within each category. Users may compare and contrast information across different categories, leading to a deeper understanding of the overall dataset. This approach may be useful in environments where quick access to critical information is essential, such as in business dashboards, data analysis tools, and content management systems.

For a portfolio manager, categorized displays may be particularly valuable. They enable the portfolio manager to oversee multiple projects or programs simultaneously, providing a clear view of the status, progress, and performance of each initiative. By categorizing projects based on various criteria such as status, priority, department, or phase, a portfolio manager may quickly identify which projects are on track or off track, which need attention, and where resources should be allocated. This organized approach may help in making informed strategic decisions, optimizing resource utilization, and ensuring that the portfolio aligns with the organization's overall objectives. The structured nature of categorized displays not only improves data accessibility but also enhances the user's ability to derive meaningful insights from the information presented, making it an indispensable tool for effective portfolio management.

Figure 3:
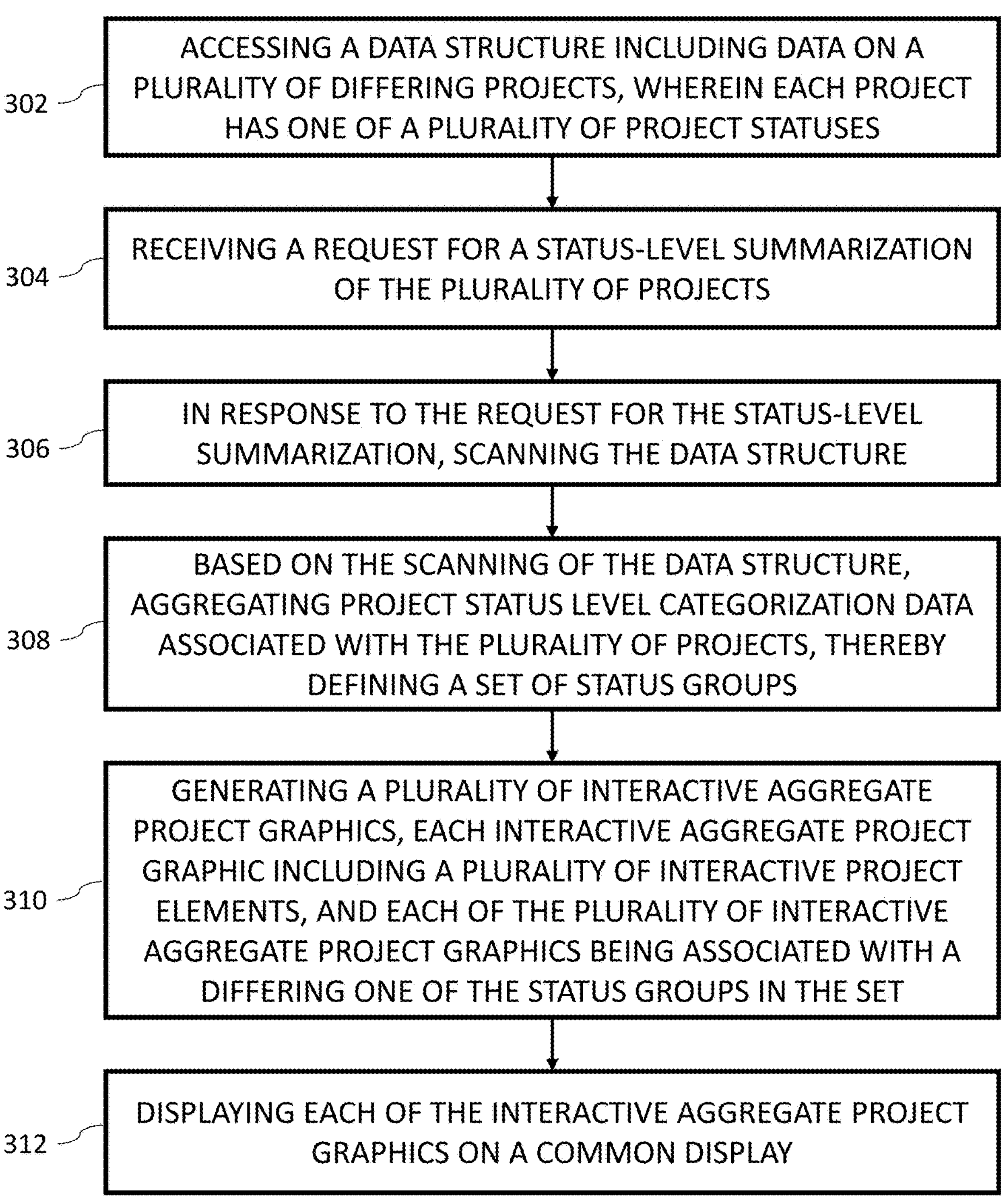
FIG. 3 is a flowchart of an exemplary process for performing operations for providing a categorized display of discrete graphical elements associated with project-related data, consistent with some disclosed embodiments.

FIG. 3 is a flowchart of an exemplary process 300 for providing a categorized display of discrete graphical elements associated with project-related data, consistent with some of the disclosed embodiments. Process 300 is discussed herein for explanatory purposes and is not intended to be limiting. In some embodiments, steps of process 300 may be changed, modified, substituted, or rearranged, consistent with the present disclosure. Process 300 may be implemented using one or more components of a computing device 800 (discussed in FIG. 8) or user device 920 of computing architecture 900 (discussed in FIG. 9). Some disclosed embodiments may include at least one processor that may be configured to execute stored instructions to perform operations for providing a categorized display of discrete graphical elements associated with project-related data. As shown in FIG. 3, process 300 may include steps 302, 304, 306, 308, 310, and 312, discussed in further detail below. It is to be appreciated that while embodiments of the present disclosure are presented within the context of project management, the disclosed embodiments may apply to different contexts involving high-level views of data categorized display and data-enhanced presentations, such as sales pipeline data, CRM solutions, or financial reporting.

Some disclosed embodiments involve accessing a data structure including data on a plurality of differing projects, wherein each project has one of a plurality of project statuses. Accessing a data structure (as defined earlier) from the point of view of a software component or a processing unit relates to performing operations to retrieve, modify, or manage data contained within that structure. For example, a processing unit by accessing a data structure may extract data from the structure. This may involve reading specific elements, searching for particular values, or querying the data based on certain criteria. In another example, accessing a data structure may involve updating or changing the data within the structure such as inserting new elements, updating existing values, or deleting elements. Additionally, accessing a data structure may include performing tasks that ensure the data structure is maintained and operates efficiently. This may involve tasks like sorting, reorganizing, or balancing the data structure to optimize performance. In some embodiments, the data structure may be accessible from an external data source. For example, the data structure may be external to computing device 800 (discussed in FIG. 8) or user device 920 of computing architecture 900 (discussed in FIG. 9). Similarly, the data structure may be external to SaaS platform 100 illustrated in FIG. 1. In some embodiments, the data structure may include a plurality of different data structures including data on different sets of projects and accessing the data structure may include aggregating the plurality of data structures into a cohesive data structure. These plurality of data structures may be stored on different servers, that may be distributed across the globe. Aggregating a plurality of data structures may involve retrieving data from various sources, which may comprise databases, spreadsheets, and other systems; converting data into a consistent format; summarizing or consolidating data to provide a higher-level view; ensuring the accuracy and consistency of the aggregated data; and/or storing the aggregated data in a cohesive structure, such as a centralized database or data warehouse, where it may be easily accessed and analyzed. Furthermore, in some embodiments, accessing the data structure including data on the plurality of differing projects may include refreshing data on the plurality of differing projects. Refreshing data may involve operations such as real-time synchronization, dynamic fetching, data polling, event-driven updates, data replication, incremental updates, conflict resolution, monitoring, and alters or caching data. Method 300 includes a step 302 of accessing a data structure, as illustrated in FIG. 3, and an exemplary data structure 200 is shown in FIG. 2.

The data structure may include data on a plurality of differing projects, each having a project status. A project status refers to the current state or condition of a project at a specific point in time. A status may provide an overview of how the project is progressing relative to its planned schedule, budget, and objectives. Project status may be categorized into different labels to quickly convey the project's health and any potential issues. Project status labels may include for example "on track", i.e., the project is proceeding as planned, "at risk", i.e., the project is facing potential issues that could jeopardize its completion, and "off track", i.e., the project is experiencing significant problems or delays that are preventing it from meeting its planned milestones. For example, referring to FIG. 2 representing in the context of a project management solution a data structure 200 corresponding to a plurality of projects 202, each project item 202 includes a project status. In some other embodiments, a project status associated with project may not be included in the data structure. In that case, the project status may need to be determined or is stored elsewhere.

A project may be associated with a project status in different ways. For example, in some embodiments, a project status may be determined and manually assigned by a user/person/project manager. By analyzing project-related data such as a project size, due dates, a timeline (e.g., scheduled vs actual), a number of tasks, or a task completion rate, a project manager may determine a status for the project. For instance, a project manager may determine whether a project is on track, off track, or at risk. In some embodiments, a project status may be assigned to a project by a project manager with the help of one or more automations or rules implemented in a project management tool. Specifically, different predetermined rules may be set to participate in an automation to help the project manager in the determination of the project status. For instance, a rule may automatically flag a project as off track if it is overdue by at least one week. Similarly, if a project manager is handling multiple projects simultaneously, indicating a heavy workload, these projects may be flagged as at risk. A project management tool may automatically select or suggest a project status based on one or more of these rules which the project manager can then accept or adjust as needed. In some other embodiments, a project status may be determined and assigned to a project by an artificial intelligence (AI) agent. As used herein, an AI agent refers to a software that uses artificial intelligence techniques, such as natural language processing, machine learning, and decision-making algorithms, to interpret queries, process information, and provide relevant and context-aware assistance. In the present context, the AI agent may be trained to interpret project-related data and infer a project status. An AI agent may also involve learning capabilities to improve performance over time through user interactions and feedback. Further details regarding the determination of a project status by an AI agent are provided below.

Some disclosed embodiments involve receiving a request for a status-level summarization of the plurality of projects. A request refers to a signal or event that initiates a specific action or process within a system, software component, or application. Requests may stem from a user-initiated action. For example, in some embodiments, receiving a request may include at least one of receiving a scroll signal resulting from a motion of a user on a display (e.g., a display wherein the data structure would be graphically represented), loading a certain URL, or receiving a trigger via a Graphical User Interface (GUI) component (e.g., a button, a check box etc.) present on the display. Alternatively, in some embodiments, receiving a request may be an automated event such as reaching a certain number of projects in the data structure or time threshold (e.g., every week, month, fiscal quarter, etc.). Method 300 includes a step 304 of receiving a request, as illustrated in FIG. 3.

Some disclosed embodiments involve scanning the data structure in response to the request for the status-level summarization. In other words, once the request is received, preparation of the categorized display may be initiated. This may occur by scanning the data structure. For example, once a request is received by a processor (e.g., a processor included in computing device 800 or user device 920), the process may proceed to scan the data structure (e.g., data structure 200). Scanning a data structure may involve differing operations such as searching, sorting, merging, splitting, reversing, or indexing the data structure. Method 300 includes a step 306 of scanning a data structure in response to a received request, as illustrated in FIG. 3.

Some disclosed embodiments involve aggregating project status level categorization data associated with the plurality of projects, based on the scanning of the data structure, thereby defining a set of status groups. In this context, "aggregating" may refer to the evaluation of the project status level categorization data associated with the plurality of projects. This process may involve scrutinizing this data to identify patterns, relationships, or criteria that may be used to categorize or segment the items into distinct status groups. Project status level categorization data may include project status associated with projects or assigned to projects, such as statuses "off track", "at risk", and "on track" associated with project items 202 in data structure 200 shown in FIG. 2. In some other embodiments, when automation rules are performed and/or when an AI agent is involved the evaluation of the project status level categorization data may include the determination of a project status. In this scenario, project status level categorization data may include at least some of the project-related data, and the evaluation of such data may involve the determination of patterns or trends within the data to determine the set of status groups. For example, a first status group may be defined for projects that have a task completion rate of at least 70%, a second one for projects that have a task completion rate between 20% and 70%, and a third one for projects that have a task completion rate below 20%. The aggregation of the project status level categorization data may represent a first method of sorting the plurality of projects (i.e., a first partitioning). Method 300 includes a step 308 of aggregating project status level categorization data to thereby define a set of status groups, as illustrated in FIG. 3.

In some embodiments, each of the status groups may include at least one project, with each project being uniquely attributed to a single status group. In other words, in this context, projects cannot simultaneously be associated with two distinct project groups. In some embodiments, defining a status group may involve associating a label with the status group. For instance, if multiple status groups are defined, each containing projects with the same status (such as "off track," "at risk," or "on track"), then each group may be labeled according to the shared status of its projects.

In some embodiments, project status level categorization data may be incomplete, lacking specific information such as project status data. This may lead to inconclusive evaluations when attempting to categorize and distribute projects within a project group. To address this issue, an additional "unassigned" group may be created. This group may serve as a temporary holding area for projects that are missing project status information. When a project lacks the status data, it may be allocated to this unassigned group. This may ensure that all projects are accounted for, even if they cannot be immediately categorized. The unassigned group may allow project managers or portfolio managers to easily identify which projects require further data collection or analysis. Once the missing information is obtained, these projects may be reassessed and appropriately categorized into their respective project groups. This approach may help maintain the integrity and accuracy of project status evaluations, ensuring that no project is overlooked due to incomplete data. It may also provide a clear workflow for handling projects with missing information, facilitating better project management and decision-making.

Some disclosed embodiments involve generating a plurality of interactive aggregate project graphics, each interactive aggregate project graphic including a plurality of interactive project elements, and each of the plurality of interactive aggregate project graphics being associated with a differing one of the status groups in the set. As used herein, an interactive aggregate project graphic refers to a visual representation designed to engage users through interactive elements. These graphics may include features like clickable areas, animations, and dynamic content that respond to user actions. Consistent with the disclosed embodiments, each interactive aggregate project graphic may be associated with a differing one of the status groups in the sets. Accordingly, a number of generated interactive aggregate project graphics may be equal to a number of status groups in the set, and an interactive aggregate project graphic may be designed to engage users with a defined status group. For example, if based on the scanning of the data structure, five different status groups have been defined, five interactive aggregate project graphics may be generated, and a user may interact with any of the five status groups via the five interactive aggregate project graphics. Additionally, in some embodiments, each of the plurality of interactive aggregate project graphics may be associated with or labeled with a differing one of the project status. For example, if four status groups, associated with project statuses "off track", "at risk, "on track" and "unassigned" are defined, the corresponding interactive aggregate project graphics may be labeled accordingly to reflect the four different project statuses.

Consistent with the disclosed embodiments, each interactive aggregate project graphic may include a plurality of interactive project elements. An interactive project element refers to a visual representation designed to engage users with a specific project through interactive features. These features might include clickable areas, animations, and dynamic content that respond to user actions. A number of generated interactive project elements for each interactive aggregate project graphic may correspond to a number of projects included in the status group associated with the interactive aggregate project graphics. For example, if for a given interactive aggregate project graphic, the associated status group comprises ten projects, ten interactive project elements may be created. Method 300 includes a step 310 of generating a plurality of interactive aggregate project graphics and for each interactive aggregate project graphic a plurality of interactive project elements, as illustrated in FIG. 3.

Some disclosed embodiments involve displaying each of the interactive aggregate project graphics on a common display. As used herein, the term "display" refers to any physical device capable of providing a visual presentation of data. Examples of physical devices acting as displays include computer screens, smartphone screens, tablet screens, smartwatch screens, laptop screens, video walls, projectors, head-mounted displays, or virtual/extended reality headsets. Additionally, displays may utilize graphical user interfaces (GUIs) to permit user interaction with data. In many GUIs, a visual presentation of data is often provided using a graphical user interface component known as a window, or a page. In this context, a common display refers to the situation wherein the interactive aggregate project graphics are presented on a single window or page. In some embodiments, displaying each of the interactive aggregate project graphics on a common display includes displaying each of the interactive project elements included in each of the interactive aggregate project graphics on the common display. An example of displaying each of the interactive aggregate project graphics on a common display is illustrated as step 312 of FIG. 3.

In some embodiments, generating a plurality of interactive aggregate project graphics and/or a plurality of interactive project elements may be based on one or more properties of the common display. For example, different sizes for the graphics and/or elements may be determined by considering the dimensions of the display, such as its resolution and aspect ratio, or a set of different colors for the graphics and/or elements may be determined based on the number of available colors that the display can render. Other properties, such as brightness, contrast ratio, and refresh rate, may also influence the selection of visual characteristics to ensure optimal visibility and clarity of the graphics/elements presented. This approach may allow the visual characteristics to be tailored to the capabilities of the display, enhancing the overall user experience and effectiveness of the data visualization.

Some disclosed embodiments involve arranging the plurality of interactive project elements on the common display as groupings. In other words, instead of incorporating all interactive project elements within a single interactive aggregate project graphic, each set of interactive project elements corresponding to projects in a specific status group may be displayed as separate groupings on the common display. In this context, "arranging interactive project elements" refers to the organization of interactive project elements into groupings such that each grouping includes at least one interactive project element. This process may involve determining a unique position for each of the plurality of interactive project elements, thereby ensuring that each interactive project element is placed in a specific location within the overall arrangement, facilitating an organized and coherent visual representation. A grouping corresponds to a collection or arrangement of interactive project elements that belong to a given status group. For example, interactive project elements may be grouped together if they share the same status groups (e.g., "off track"). In other words, the groupings may correspond to partitioning groups associated with the status groups. These groupings may help organize and visually represent the status group in a way that does not involve generating interactive aggregate project graphics.

FIGS. 4A-4F are exemplary illustrations of arrangements of categorized displays of discrete graphical elements associated with project-related data, consistent with some of the disclosed embodiments. In these figures, the dimensions of the common display are represented by the dot-dash line 410. A plurality of interactive aggregate project graphics 402, presented as panels are shown. It is to be appreciated that a panel is a mere example of interactive aggregate project graphics 402. In some embodiments, interactive aggregate project graphics 402 may be displayed in various other forms such as tabs, floating windows, split views, carousels, or accordions. Each of the interactive aggregate project graphics 402 is associated with an identified status group. Specifically, in the examples shown in FIGS. 4A-4F, three status groups are defined: a first status group including projects having "off track" as a project status (panel on the left), a second status group including projects having "at risk" as a project status (center panel), and a third group having "on track" as a project status (panel on the right). It should be noted that three status groups are just an example, and the number of status groups, and consequently the number of interactive aggregate project graphics, may vary. For instance, in some embodiments, a fourth panel representing projects with an unassigned status group may also be displayed.

Some disclosed embodiments involve, based on the set of status groups, identifying a set of visual characteristics for graphically expressing the plurality of project statuses, and applying the set of visual characteristics to the plurality of interactive aggregate project graphics. A visual characteristic may refer to any attribute or feature that defines an appearance and enhances a visual representation. Examples of visual characteristics include but are not limited to color, shape, size, texture, pattern, opacity/transparency, border, shadow, or 3D effects. Identifying a set of visual characteristics may involve selecting a subset of visual characteristics from a larger predetermined set of visual characteristics based on the plurality of project status. For example, by default, ten different colors may be predetermined for expressing the plurality of project statuses. If the number of status groups is equal to three, identifying the set of visual characteristics may correspond to selecting three distinct colors from the predetermined ten different colors. Alternatively, in some embodiments, identifying the set of visual characteristics may start from scratch, allowing for a more customized approach. This process may involve creating visual attributes specifically tailored to effectively represent the status groups. Various factors such as the nature of the project statuses, clarity, accessibility, and relevance to the data being represented may be taken into account. Such a detailed and customized analysis may be implemented using an AI system tailored for visual representation generation. This AI may analyze the data (e.g., project status level categorization data), consider best practices in design, and generate visual characteristics that meet the specified criteria. The AI may learn from vast datasets and user interactions, continually improving its ability to create effective visual representations. This approach may ensure a high level of customization and precision in the visualizations produced. For example, referring to FIGS. 4A-4F, interactive aggregate project graphics 402 each may adopt a distinct color/pattern, namely dark grey for the left panel (e.g., for project "off track"), grey with a black dotted pattern for the center panel (e.g., for project "at risk"), and light grey for the right panel (e.g., for project "on track"). It is to be appreciated that the different shades of grey are merely an example of this set of visual characteristics. Instead of shades of grey, different colors such as red, amber/yellow, and green may also be used, for example.

Furthermore, as shown in FIGS. 4A-4F, each interactive aggregate project graphics 402 includes a plurality of interactive project elements 404 with each interactive project element being associated with a project item included in the data structure 200 presented in FIG. 2. More specifically, each interactive project element represents a row (or item 202) in the data structure 200, which includes data relating to a particular project. In some embodiments, each of the plurality of interactive project element 404 may adopt a visual characteristic. Such visual characteristics may be identified and applied by analyzing data from data structure 200 (e.g., project status level categorization data associated with a given project). In some embodiments, the visual characteristics applied to the plurality of interactive project elements 404 may either match/echo or differ from the one of a corresponding interactive aggregate project graphic 402 (e.g., similar or different color applied). For example, in some embodiments, each of the plurality of interactive project elements 404 may have at least a displayed portion with increased transparency enabling visualization of a visual characteristic applied to an associated interactive aggregate project graphic 402. For example, referring to FIGS. 4A-4F each interactive project element includes at least a portion with increased transparency (or reduced opacity) to enable visualization of a color applied to a corresponding panel 404. In other words, interactive project elements may not have a color applied to at least one portion. Interactive project elements 404 with increased transparency may enhance a user's visual experience by providing context and highlighting the relationship between interactive aggregate project graphics 402 and interactive project elements 404, improving aesthetics, enhancing focus, or creating depth.

It is to be appreciated that each of the plurality of interactive aggregate project graphics and/or each of the plurality of interactive project elements may adopt one or more additional visual characteristics that are not configured to express any data or information on project status. For example, in any of FIGS. 4A-4F, each of the plurality of interactive aggregate project graphics/panels 402 adopts a shape, specifically a rectangular shape with rounded corners. However, this shape does not express data. The same holds true for the color, width, line type, and thickness of the borders of panels 402. In any of FIGS. 4A-4F, these visual characteristics are not configured to express data about associated status groups. Nonetheless, these additional visual characteristics may be utilized to convey information if needed, offering further customization and flexibility in the visual representation of the data. Although FIGS. 4A-4F illustrate interactive aggregate project graphics 402 and interactive project elements 402 as 2D graphical elements, any of the disclosed embodiments may be extended to 3D graphical elements. For example, interactive project elements 404 may be rendered as cubes, spheres, or any other 3D shapes.

Some disclosed embodiments involve enabling scrolling through the interactive project element within the interactive aggregate project graphic or scrolling on the common display, in response to a cumulated size of all interactive project elements within an interactive aggregate project graphic being larger than at least one dimension of the interactive aggregate project graphic presented on the common display or the common display. The dimensions of a display, particularly on mobile devices like smartphones or tablets, may be limited. Consequently, if the cumulated size of the interactive project elements exceeds at least one dimension of the associated interactive aggregate project graphics or the common display, the operations may involve enabling scrolling ensuring that all content remains accessible within the confines of the interactive aggregate project graphic or the common display. Enabling scrolling within the aggregate interactive project graphic or the common display may involve augmenting the common display with at least one scroll bar. For example, referring to FIGS. 4A-4F, any of the interactive aggregate project graphics 402 is augmented with a scroll bar 420. These scroll bars facilitate scrolling through a given interactive aggregate project graphic 402 presented on the common display. In particular, each scroll bar 420 may be independent, i.e., scrolling operation on a given interactive aggregate project graphic/panel 402 (e.g., left panel) does not affect data presented in the other interactive aggregate project graphic/panel 402. Additionally, a global scroll bar may be provided on the common display to enable overall scrolling within the confines of display 410.

In some embodiments, within each interactive aggregate project graphic, each of the interactive project elements are displayed in accordance with an applied data display mode from a plurality of data display modes. As used herein a data display mode refers to a specific way in which data (e.g., interactive project elements) is visually presented to users on a screen or interface. This mode may determine how information is organized, formatted, and displayed, making it easier for users to interpret and interact with the data. For example, in some embodiments, the plurality of data display modes includes an alphabetical, a task completion rate, and a timeline data display mode. An alphabetical data display may include a data display mode wherein interactive project elements are sorted according to project names of associated projects. A task completion rate may include a data display mode wherein interactive project elements are sorted according to task completion rates of associated projects. A timeline data display mode may include a data display mode wherein interactive project elements are sorted according to scheduled timeline of associated projects. Some disclosed embodiments may involve, within each interactive aggregate project graphic, enabling selection of a data display mode from the plurality of data display mode, and applying the data display mode to each of the interactive project elements in the interactive aggregate project graphic. Enabling a selection of a data display mode may include different operations. For example, in some embodiments, a GUI element may be provided within each interactive aggregate project graphic, and in response to an interaction with the GUI element, a data display mode may be selected and applied to each interactive project element within the interactive aggregate project graphic. For example, referring to FIGS. 4A-B, within each interactive aggregate project graphic/panel 402, a GUI element 406 (buttons "A-Z", "Done tasks," and "Timeline") is provided to enable a user (e.g., a portfolio manager) to select a data display from a plurality of data display mode (e.g., among an alphabetical, a task completion rate, and a timeline data display mode). It is to be appreciated that for each interactive aggregate project graphic/panel 402, the selection of a data display mode is independent, i.e., different data display modes may be selected for each interactive aggregate project graphic/panel 402. For example, referring to FIG. 4B, a different data display mode is selected for each panel 402. Specifically, in FIG. 4B, the alphabetical data display mode is selected for the left panel, the task completion rate data display mode is selected for the center panel, and the timeline data display mode is selected for the right panel.

In some other embodiments, an AI agent may be configured to select the data display mode for each interactive aggregate project graphic/panel 402. For example, by analyzing the project included in a status group associated with a given interactive aggregate project graphic/panel 402, an AI agent may determine among the plurality of data display modes, which one is the most appropriate for the interactive project elements. Additionally, or alternatively, in some embodiments, one of the plurality of data display modes is applied by default when the plurality of interactive aggregate project graphics is presented on the common display. In other words, a specific mode may be automatically selected and used without requiring any intervention (from the user or an AI agent). This default mode may be pre-set by the system or application based on what is considered the most appropriate or useful way to display the data initially. For example, referring to FIG. 4A, the alphabetical data display mode may be selected by default when presenting panel 402 on the common display 410. Depending on the selection of data display modes (e.g., via user interaction, or by an AI agent), the default data display mode applied to each panel 402 may be changed independently for each panel 402, resulting in a different presentation such as the one illustrated in FIG. 4B.

In some embodiments, each of the plurality of interactive project elements is configured to graphically display a name of the project and at least some project-related data associated with the project. A name of a project may be included in the data structure including the plurality of projects and may be part of project-related data. As used herein, project-related data encompasses any sort of data related to a given project such as project-level categorization data. This data may be included in the access data structure (e.g., columns 204 of project-item 202 in data structure 200). In some embodiments, project-related data may be displayed within the plurality of interactive project elements via alphanumerical fields. For example, referring to FIG. 4B, any of interactive project elements 404 is configured to display a name of an associated project. Furthermore, in some embodiments, applying the data display mode to each of the interactive project elements in each interactive aggregate project graphic includes selecting the at least some of the project-related data associated with the project to be graphically displayed in accordance with the applied data display mode. Selecting project-related data may involve choosing specific pieces of information from the larger project related dataset that are relevant to the project and need to be displayed. This selection process may be guided by the criteria set by the applied data display mode. When data is selected in accordance with an applied data display mode, the chosen data may be tailored to fit the format and requirements of the selected display mode. In some embodiments, some project-related data may be transformed or aggregated to fit a given data display mode. For example, referring to FIG. 4B, in an alphabetical data display mode (left panel), a name of the project may be graphically displayed within the interactive project element, in a task complement rate data display mode (center panel), a task completion rate of the project may be graphically displayed in the interactive project element, and in a timeline data display mode (right panel), a timeline of the project may be displayed in the project interactive element. Additionally, in some embodiments, the at least some of the graphically displayed project-related data associated with the project is graphically displayed via a data visualization widget, an alphanumerical field, or a combination thereof. A data-visualization widget refers to an interactive graphical component used to display data in a visual format, making it easier to understand and analyze. These widgets may take various forms, such as charts, graphs, maps, and dashboards. An alphanumerical field refers to a graphically displayed data field that may contain both letters (alphabetical characters) and numbers (numerical characters). For example, referring to FIG. 4B, in the alphabetical data display mode applied to the left panel, task statuses (e.g., "done," "in progress," or "not started") are shown using a horizontal stacked bar chart, while the number of tasks is graphically displayed through an alphanumerical field (e.g., 25 tasks, 53 tasks, 30 to task, etc.). In the task completion rate data display mode, applied to the center panel, the task completion rate (e.g., number of tasks "Done" versus number of tasks with another status) is presented in an alphanumerical field (e.g., 14% Tasks Done, 15% Tasks Done, 33% Tasks Done, etc.) and visualized with a pie chart (e.g., circular graphic with shaded portion showing the relevant percentage of task completed). In the timeline data display mode, applied to the right panel, the number of days overdue or ahead ("deadline") is displayed via an alphanumerical field (e.g., Deadline in 2 days, Deadline in 6 days, etc.) and represented by a Gantt chart, comparing the planned project schedule with the actual project schedule.

In some embodiments, applying the data display mode to each of the interactive project elements in each interactive aggregate project graphic includes sorting each of the interactive project elements within the interactive aggregate project graphic in accordance with the applied data display mode. Sorting refers to arranging data or elements in a specific order based on certain criteria. Sorting may help in organizing and presenting information in a way that is easier to understand and analyze. Sorting can be performed using various algorithms and techniques, depending on the complexity and size of the data set. In present the context, interactive project elements within an aggregate project graphic may be sorted according to associated project related data. For instance, referring to FIG. 4B, in the alphabetical data display mode applied to the left panel, interactive project elements are sorted alphabetically by project name (e.g., project Name A appears before project Name E). In the task completion rate data display mode, applied to the center panel, interactive project elements are sorted from the lowest to the highest task completion rate (e.g., task Name AJ with 14% Tasks Done appears before task name L with 33% Tasks Done). In the timeline data display mode, applied to the right panel, interactive project elements are sorted by urgency, with the closest deadlines appearing first (e.g., project Name C with Deadline in 2 days appearing before project Name H with Deadline in 6 days).

In some embodiments, applying the data display mode to each of the interactive project elements in each interactive aggregate project graphic includes modifying a visual appearance of each of the interactive project elements in the interactive aggregate project graphic. Modifying a visual appearance may include changing one or more visual characteristics of an interactive project element (e.g., changing color, shape, size, texture, pattern, etc.). Such a modification of the visual appearance may be in accordance with the applied data display mode or may be to visually distinguish interactive project elements with differing data display modes applied. This modification of the visual appearance may be in addition to any data visually displayed within the interactive project elements. For instance, referring to FIG. 4B, the shape of interactive project elements 404 is modified in accordance with the applied data display mode. In the alphabetical data display mode applied to the left panel, interactive project elements have a rectangular shape with rounded corners. In the task completion rate data display mode, applied to the center panel, the interactive project elements adopt an oblong shape and are slightly wider than those in the center panel. Similarly, in the timeline data display mode, applied to the right panel, the project interactive elements are rectangular and wider than those in the center panel. By giving the interactive project elements within each panel distinct visual appearances, users may gain insights into the different data display modes applied.

In some embodiments, each of the plurality of interactive aggregate project graphics includes at least one alphanumerical field configured to present at least one of a number of projects included in the status group associated with the interactive aggregate project graphic, or the project status associated with the interactive aggregate project graphic. For example, referring to FIG. 4C, each interactive aggregate project graphic/panel 402, includes an alphanumerical field 408 configured to display a number of projects included in the status group associated with the interactive aggregate project graphic and the project status associated with the interactive aggregate project graphic. For instance, for the left panel corresponding to project status "off track", and including 10 projects in the associated status group, panel alphanumerical filed 408 displays "10 projects—off track."

Figure 4A:
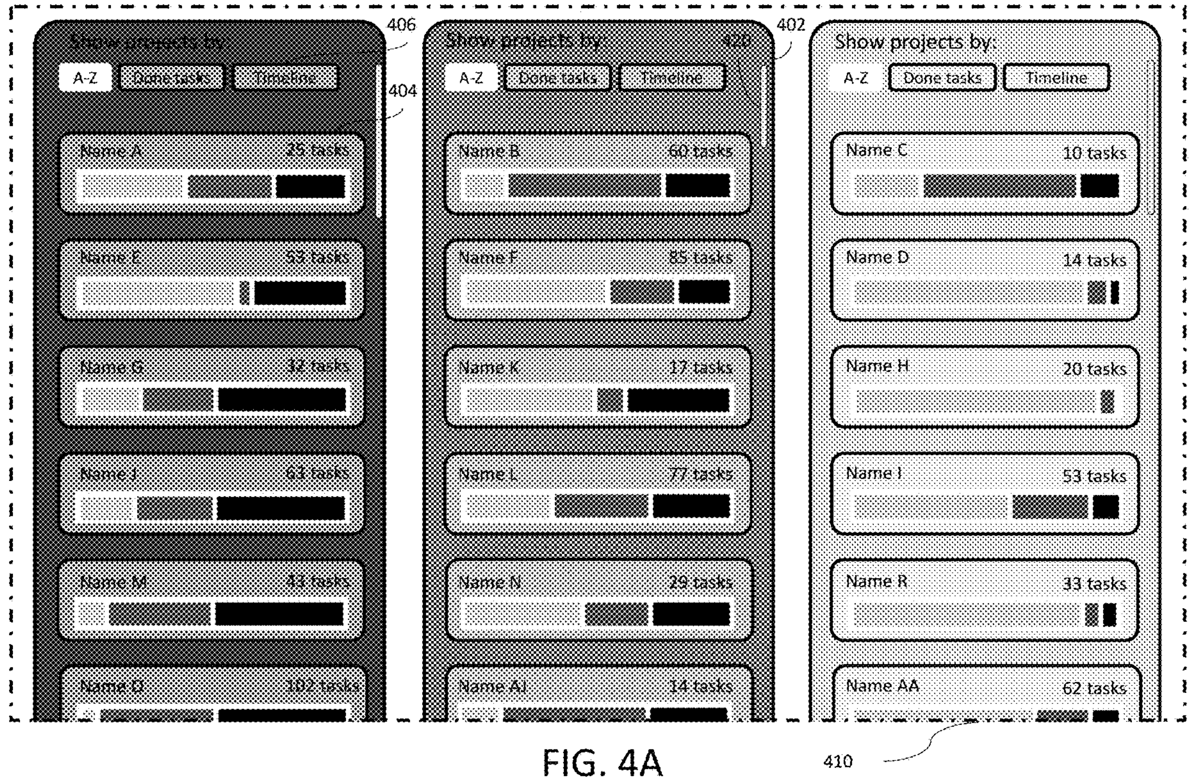
FIGS. 4A-4F are exemplary illustrations of arrangements of categorized displays of discrete graphical elements associated with project-related data, consistent with some of the disclosed embodiments.
Figure 4B:
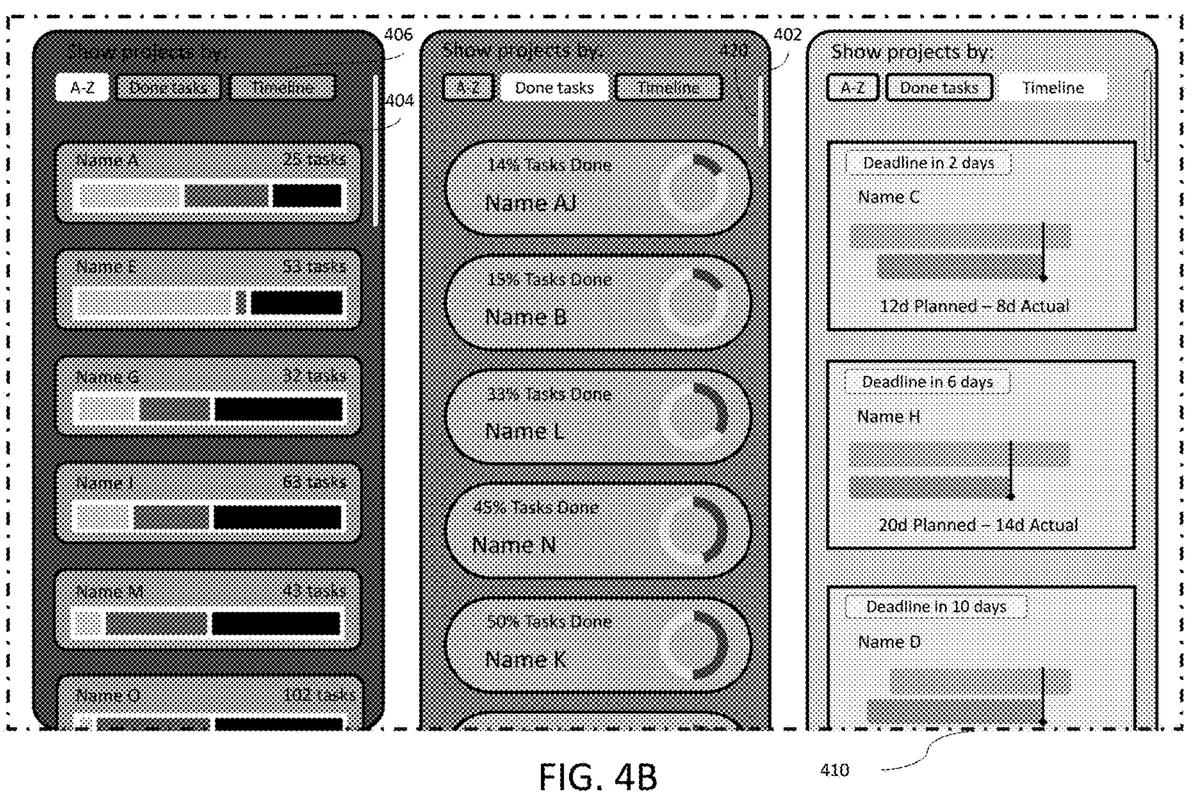
Figure 4C:
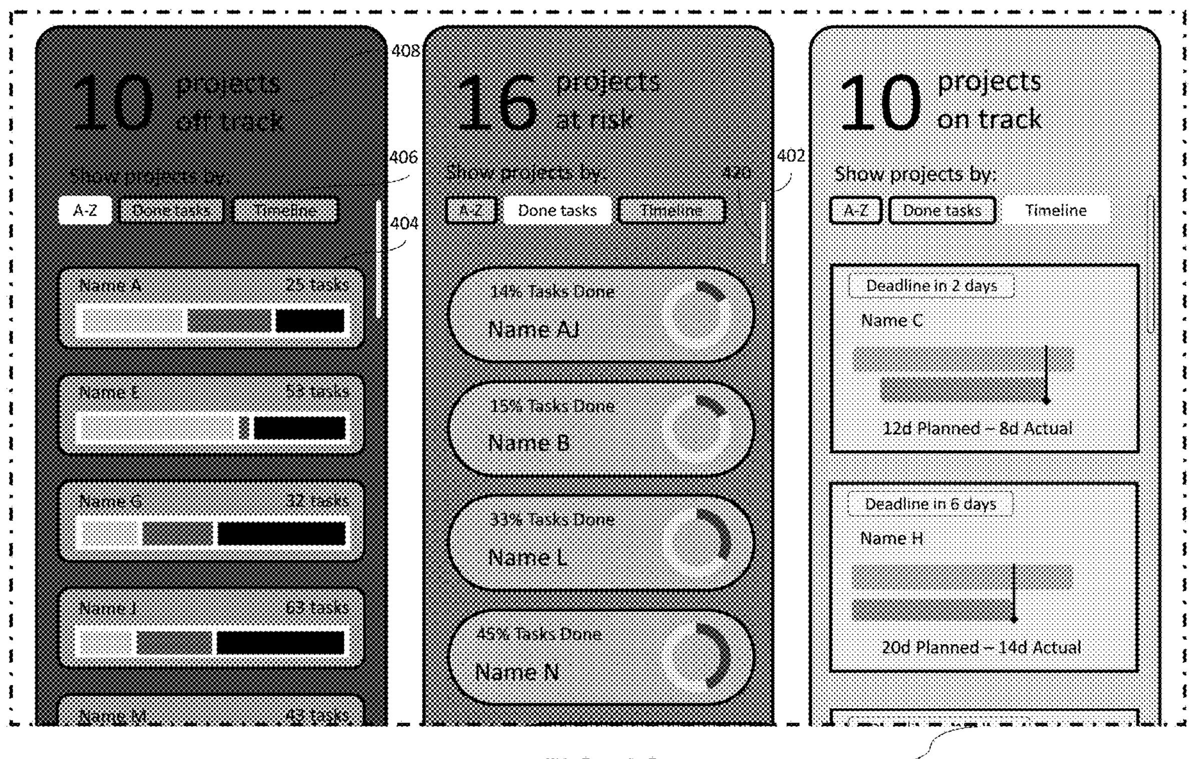
Figure 4D:
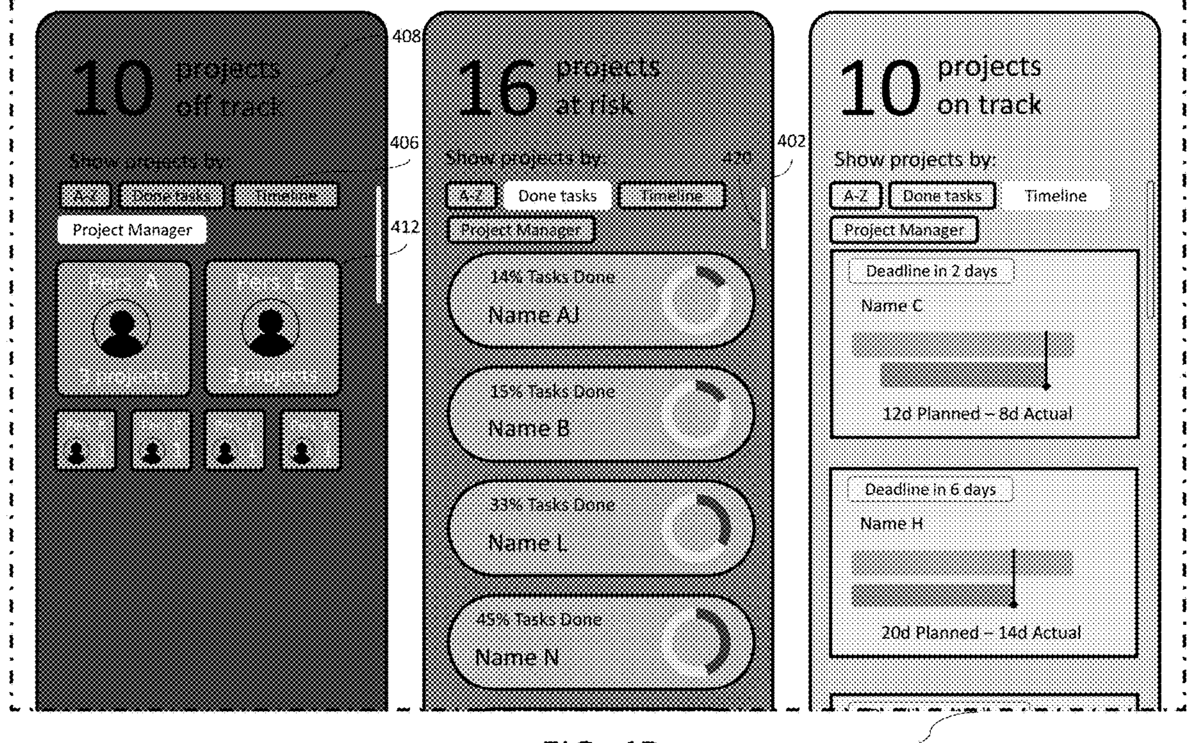
Figure 4E:
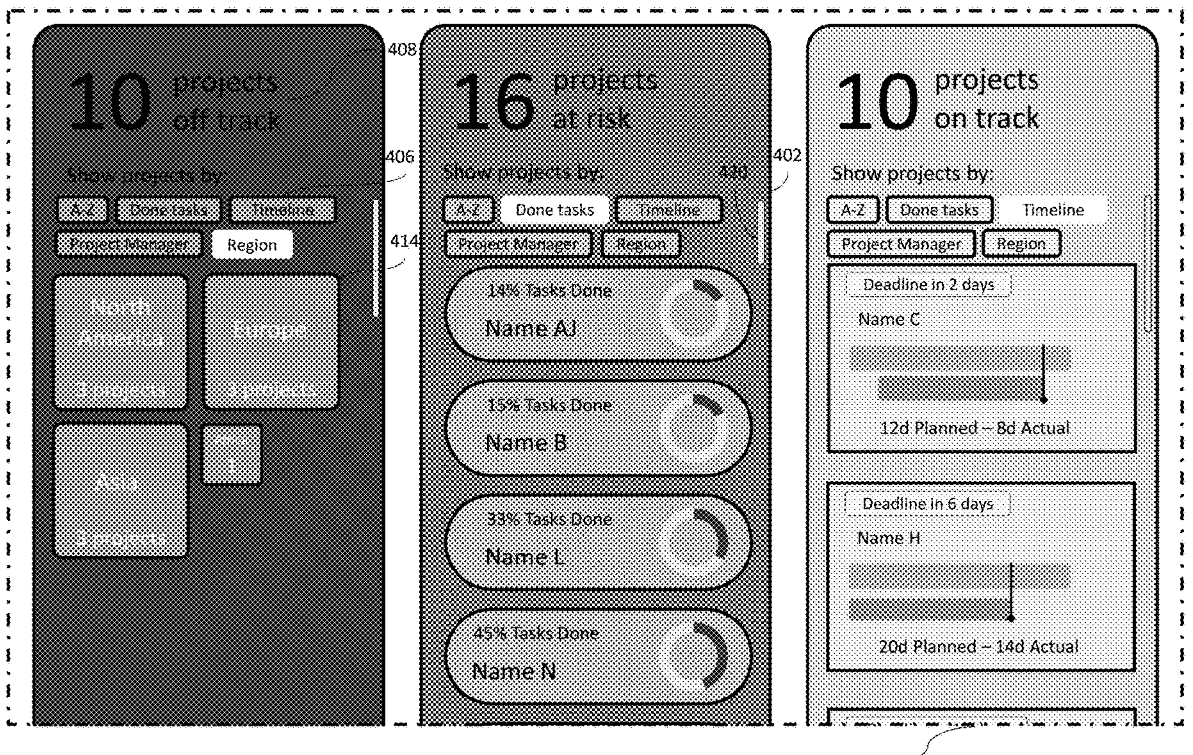
Figure 4F:
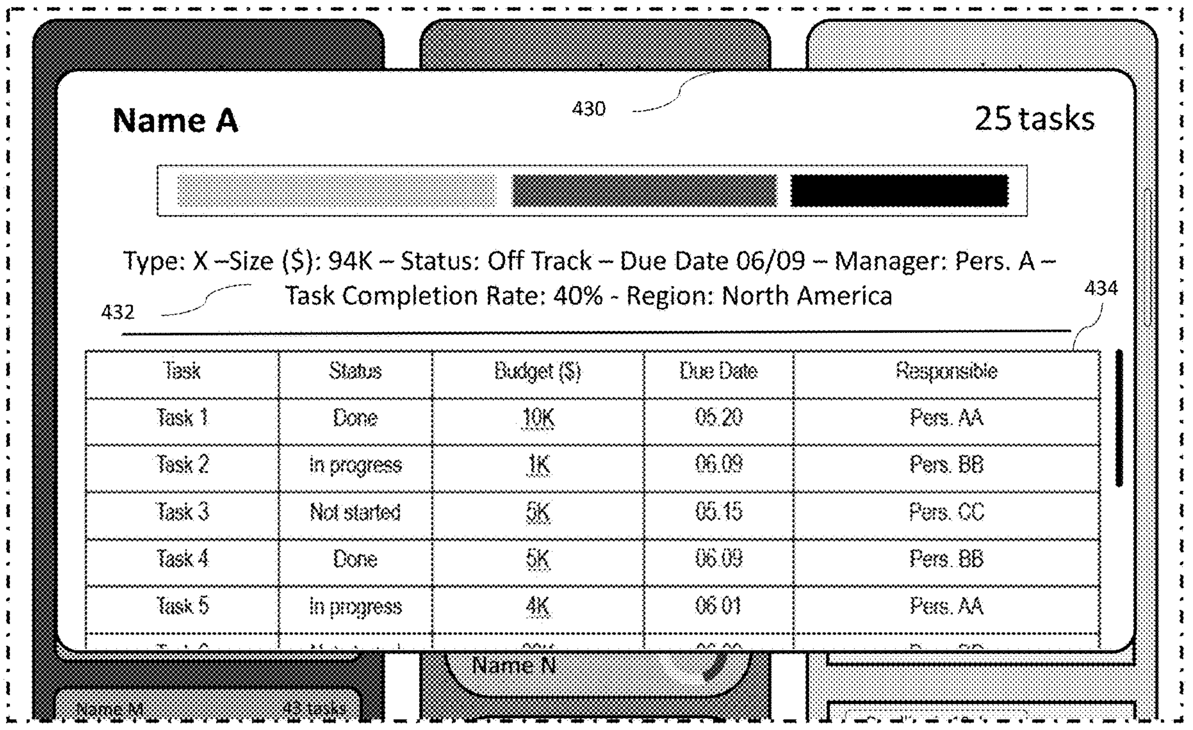

In some embodiments, each project may be associated with a project manager. As used herein, a project manager is a physical person (e.g., an individual) or a non-physical person (e.g., an AI agent) responsible for planning, executing, and overseeing projects to ensure they are completed on time, within budget, and to the required quality standards. A project manager may be associated with a project by including the project manager's name within the project-related data. In some disclosed embodiments involve enabling a selection of a project manager data display mode within each interactive aggregate project graphics. A manager data display mode refers to a data display mode emphasizing the presentation of data related to a project manager. In other word in a project manager data display mode project may be sorted and presented in accordance with associated project managers. Selection of a project manager data display mode may be performed by a user (e.g., via a GUI element), or by an AI agent. In response to the selection of the project manager data display mode within an interactive aggregate project graphic, some disclosed embodiments involve grouping the plurality of projects included in the status group associated with the interactive aggregate project graphic by project managers to define a set of project manager groups. In other words, within a given status group, projects may be further sorted by project manager, leading to a set of project manager groups, representing sub-groups within the status group. Separating the projects by project manager may represent a second method of sorting the plurality of projects (i.e., a second partitioning or a first sub-partitioning). For example, within one project status group (e.g., off track status group), project may be further sorted by project manager (e.g., Pers. A, Pers. B). Additionally, some disclosed embodiments involve generating a plurality of interactive project manager elements associated with the set of project manager groups. An interactive project manager element refers to a visual representation designed to engage users with specific projects overseen by a given project manager through interactive features. These features might include clickable areas, animations, and dynamic content that respond to user actions. A number of generated interactive project manager elements for each interactive aggregate project graphic may correspond to a number of project manager groups associated with the interactive aggregate project graphics. For example, if for a given interactive aggregate project graphic, six project manager groups have been identified, six interactive project manager elements may be created. Exemplary interactive project manager elements 412 are illustrated in FIG. 4D.

Furthermore, some disclosed embodiments involve, switching from a first presentation of the interactive aggregate project graphic on the common display based on an applied data display mode to a second presentation of the interactive aggregate project graphic on the common display based on the project manager data display mode, wherein in the second presentation, the plurality of interactive project manager elements is arranged within the interactive aggregate project graphic. As used herein, the term "arranged within" means that the plurality of interactive project manager elements is placed inside a specified area or boundary of the interactive aggregate project graphic. In the context of a display or graphic, this may imply that the elements are positioned entirely inside the defined panel or boundary. In some other embodiments, the plurality of interactive project manager elements may be allowed to straddle the boundary, i.e., some parts of the task elements might extend beyond the interactive aggregate project graphic/panel's boundaries. In the context of the present disclosure, switching refers to the process of changing from one mode of presentation to another. Specifically, it may involve transitioning the display of the interactive aggregate project graphic and their content from one presentation to another. During the switch, the arrangement and possibly the appearance of the interactive aggregate project graphics may change to fit the new display mode. Switching may involve a smooth transition (i.e., a gradual switch of presentation, potentially with some animations) or an abrupt transition (i.e. instantaneous change of presentation). For example, referring to FIG. 4D, a first presentation of the left interactive aggregate project/panel 402 based on the applied alphabetical data display mode (e.g., as shown in FIGS. 4A-4C) has been switched to a second presentation based on the project manager data display mode. In this second presentation, interactive project elements 404 have been replaced with interactive project manager element 412 arranged within the left panel. The project manager data display mode, as for the plurality of data display modes (e.g., alphabetical, task completion rate, a timeline data display modes), may be independent. In other words, the project manager data display mode may be selected and/or applied to a given panel 402, while the other panel may be presented in accordance with a different data display mode. For example, referring to FIG. 4D, the center and right panel are still presented using a task completion rate data display mode and a timeline data display mode, whereas the left panel is presented using the project manager data display mode.

In some embodiments, the plurality of data display modes and the project manager data display mode are selectable from a single Graphical User Interface (GUI) element presented within a given interactive aggregate project graphic. A GUI element refers to a visual component in a software application that allows users to interact with the system. These elements are part of the graphical user interface and are designed to make the interaction intuitive and efficient. Examples of GUI elements include but are not limited to buttons, text boxes, labels, icons, menus, drop-down lists, tabs, sliders, or checkboxes. A GUI element can offer selectable options through various interactive elements (e.g., for buttons a user may click on a given button to select an option) that allow users to make choices. For example, referring to FIG. 4D, any of the GUI element 406 (collections of different clickable buttons) presented within each panel 402 may include a "project manager" button to enable the selection of the project manager data display mode, in addition to "A-Z", "Done tasks" and "Timeline" buttons enabling selection of an alphabetical, a task completion rate, or a timeline data display mode. GUI elements 406 are located within the boundary of panels 402. In some alternative examples, GUI element 406 may be located outside of panels 402. Alternatively, in some embodiments, the project manager data display mode may be selected by an AI agent. In some embodiments, the project manager data display mode may be used as a default data display mode when presenting the plurality of interactive aggregate project graphics on the common display.

In some embodiments, each of the plurality of interactive project manager elements is configured to display at least one of a name of an associated project manager, a number of projects included in the associated project manager group, or a picture of an associated manager. For example, referring to FIG. 4D, each interactive project manager element 412 is configured to display, a name of an associated project manager (e.g., Pers. A or Pers B), a number of projects included in the associated project manager group (e.g., the number of projects overseen by a given project manager, 3 projects, etc.), and a picture of the associated project manager. It is to be appreciated that interactive project manager elements 412 may only display one of a name of an associated project manager, a number of projects included in the associated project manager group, or a picture of an associated manager. In some embodiments, each of the plurality of interactive project manager elements adopts a size to reflect a number of projects included in the associated project manager group. For example, the size (e.g., for a 2D display at least one dimension such as length or width or an area, for a 3D display, one or more dimensions or a volume) of a given interactive project manager element may be proportional to the number of projects included in the associated project manager group. By linking the size of the interactive project manager element to a number of projects overseen by a given project manager, the user is provided with a visual indication of the number of projects handled by a project manager, which may be indicative of a given workload for the project manager. In some embodiments, the content of data displayed within the interactive project manager elements may depend on the size of the interactive project manager elements. For example, referring to FIG.

4D, interactive project manager elements for project managers handling a single project (e.g., element for Pers. B), only display the number "1" and omit to display the word "project" unlike larger interactive project manager elements (e.g., element for Pers. A). Similarly, the font size and the size of the project manager's picture may be adjusted according to the interactive project manager element's size.

In some embodiments, each project may be associated with a project characteristic. As used herein, a project characteristic may be a project-related data. Such characteristics may be different from a project status and different from the one used in other data display modes (e.g., project name, due date, number of tasks, project manager, task completion rate, etc.). For example, in some embodiments, the project characteristic may include at least one indicator of region, department, budget size, stakeholder, strategic importance, resource type, project size, or vendor involvement. A project characteristic may be associated with a project by including a data value corresponding to the characteristic within the project-related data. In such a scenario, some disclosed embodiments, may involve, within each interactive aggregate project graphics, enabling a selection of a project characteristic data display mode. A characteristic data display mode refers to a data display mode emphasizing the presentation of data related to a project characteristic. Selection of a project characteristic data display mode may be performed by a user (e.g., via a GUI element), or by an AI agent. In response to the selection of the project characteristic data display mode within an interactive aggregate project graphics, some disclosed embodiments may involve grouping the plurality of projects included in the status group associated with the interactive aggregate project graphic by project characteristic to define a set of project characteristic groups. In other words, within a given status group, projects may be further sorted by project characteristic, leading to a set of project characteristic groups, representing sub-groups within the status group. Separating the project by project characteristic may represent a third method of sorting the plurality of projects (i.e., a third partitioning or a second sub-partitioning). Additionally, some disclosed embodiments may involve generating a plurality of interactive project characteristic elements associated with the set of project characteristic groups. An interactive project characteristic element refers to a visual representation designed to engage users with specific project characteristics through interactive features. These features might include clickable areas, animations, and dynamic content that respond to user actions. A number of generated interactive project characteristic elements for each interactive aggregate project graphic may correspond to a number of project characteristic groups associated with the interactive aggregate project graphics. For example, if for a given interactive aggregate project graphic, four project characteristic groups have been identified, four interactive project characteristic elements may be created.

Furthermore, some disclosed embodiments may involve, switching from a first presentation of the interactive aggregate project graphic on the common display based on an applied data display mode to a third presentation of the interactive aggregate project graphic on the common display based on the project characteristic data display mode. Similarly, some disclosed embodiments may involve switching from the second presentation of the interactive aggregate project graphic on the common display based on the applied project manager data display mode to a third presentation of the interactive aggregate project graphic on the common display based on the project characteristic data display mode. In the third presentation, the plurality of interactive project characteristic elements may be arranged within the interactive aggregate project graphic. For example, referring to FIG. 4E, a first presentation of the left interactive aggregate project/panel 402 based on the applied alphabetical data display mode (e.g., as shown in FIGS. 4A-4C) or a second presentation of the left interactive aggregate project/panel 402 based on the applied project manager data display mode (e.g., as shown in FIG. 4D) has been switched to a third presentation based on the project characteristic data display mode. In this third presentation, interactive project elements 404 or interactive project manager elements 412 have been replaced with interactive project characteristic element 414 (specifically interactive region element) arranged within the left panel. The project characteristic data display mode, as for the plurality of data display modes (e.g., alphabetical, task completion rate, a timeline data display modes), and the project manager data display mode, may be independent. In other words, the project characteristic data display mode may be selected and/or applied to a given panel 402, while the other panel may be presented in accordance with a data display mode or the project manager data display mode. For example, referring to FIG. 4E, the center and right panels are still presented using a task completion rate data display mode and a timeline data display mode. In some embodiments, the plurality of data display modes, the project manager data display mode, and the project characteristic data display mode may be selectable from a single Graphical User Interface (GUI) element presented within a given interactive aggregate project graphic. For example, referring to FIG. 4E, any of the GUI element 406 presented within each panel 402 include a "Region" button (i.e., a "project characteristic" button) to enable selection of the project manager data display mode. Alternatively, in some embodiments, the project characteristic data display mode may be selected by an AI agent. In some embodiments, the project characteristic data display mode may be used as a default data display mode when presenting the plurality of interactive aggregate project graphics on the common display.

In some embodiments, each of the plurality of interactive project characteristic elements may be configured to display at least one of a name of an associated project characteristic or a number of projects included in the associated project characteristic group. For example, referring to FIG. 4E, each interactive project characteristic element 414 is configured to display a name of an associated project characteristic (here specifically a region) and a number of projects included in the associated project characteristic group (i.e., number of projects on a given region). Additionally, or alternatively, in some embodiments, each of the plurality of interactive project characteristic elements may adopt a size to reflect a number of projects included in the associated project characteristic group. For example, the size of a given interactive project characteristic element may be proportional to a number of projects included in the associated project characteristic group. By linking the size of the interactive project characteristic element to a number of projects in a given project characteristic group, the user is provided with a visual indication of the number of projects sharing the same characteristic (e.g., same region). In some embodiments, the content of data displayed within the interactive project characteristic elements may depend on the size of the interactive project characteristic elements. For example, referring to FIG. 4E, interactive project characteristic elements for the region including a single project (e.g., element for Africa), only display the number "1" and omit to display the word "project" unlike larger interactive project characteristic elements (e.g., element for North America). Similarly, the font size may be adjusted according to the interactive project characteristic element's size.

Some disclosed embodiments involve, in response to a user interaction with one of the plurality of interactive project elements, causing a pop-up window to appear on the common display, wherein the pop-up window is configured to display at least some project-related data associated with the project corresponding to the one interactive project element. A user interaction refers to an action performed by a user enabling the user to interact with a software or GUI in a visual and intuitive way. Examples of user interactions include but are not limited to, clicking/tapping, hovering, dragging and dropping, scrolling, swiping, pinching/zooming, typing, selecting, voice commands, or gestures. Accordingly, a user may interact with one of the plurality of interactive project elements by performing any of the above listed user interaction in relation with the interactive project element. A pop-up window refers to window that appears on top or in vicinity of a main window of a GUI or display. A pop-up window may be used to display additional information, prompt a user for input, or provide notifications without navigating away from the current main window. For example, referring to FIG. 4F, in response to a user interaction with the interactive project element (e.g., clicking on the interactive project element) corresponding to project "Name A" (i.e., interactive project element display "Name A") included in the left panel, pop-up window 430 may be presented on the display. As illustrated pop-up window 430 is configured to display at least some project-related data associated with the interactive project element corresponding to project "Name A". Additionally or alternatively, when each of the plurality of interactive project elements is configured to graphically display the at least some project-related data associated with the project, the pop-up window is further configured to display additional project-related data associated with the project corresponding to the one interactive element. For example, referring to FIG. 4C, the interactive project element corresponding to project "Name A," when an alphabetical data display mode is applied, is configured to display, the project name ("Name A"), the number of tasks within the project ("25 tasks") and task status within the project using a battery widget. Consistent with the disclosed embodiments, and referring to FIG. 4F, this information is also displayed in pop-up window 430. However, additional project-related data 432 such as project type, project size, project status, due date, project manager, task completion rate, and region, is displayed within pop-up window 430. Pop-up window 430 also features an interactive scrollable table 434 listing all tasks within the project, with detailed information for each task. The provision of a pop-up window, when a user interacts with a project interactive element, enables layered navigation. A user, such as a portfolio manager, starts with a high-level view of the entire portfolio of projects and progressively drills down into specific projects and/or individual tasks within just a few interactions (e.g., just a few clicks). This multi-layered approach may ensure that users can navigate complex project data efficiently and comprehensively. Using pop-up windows for layered navigation in a GUI may offer several benefits. It may enhance user focus by allowing detailed information to be viewed without losing the overall context, thereby reducing cognitive load. This approach may improve efficiency by minimizing the number of clicks needed to access data, making navigation quicker and more intuitive. Contextual relevance may ensure that users receive pertinent information directly related to their current task, maintaining a seamless workflow. Additionally, using pop-up window may align with user-friendly design principles, providing flexibility and ease of use, which is particularly beneficial for managing complex data sets. By providing a structured pathway from broad overviews to detailed task information, the system may enhance user experience and facilitate effective project management.

Some disclosed embodiments may involve improving dataset state determination using Artificial Intelligence (AI). In the rapidly evolving field of AI, the ability to accurately determine the state of datasets may be valuable for enhancing data quality and data presentations. Embodiments of the present disclosure introduce innovative methods, systems, and software that leverage AI to improve dataset state determination. AI may manifest itself through the deployment of an AI agent, i.e., software that uses artificial intelligence techniques, such as natural language processing, machine learning, and decision-making algorithms, to interpret queries, process information, and provide relevant and context-aware assistance. In particular, an AI agent may be trained to analyze and interpret data more effectively, identifying inconsistencies, anomalies, and patterns that traditional approaches might overlook. By integrating AI-driven solutions, organizations may achieve higher accuracy in data processing, leading to more informed decision-making and optimized performance across various applications.

Figure 5:
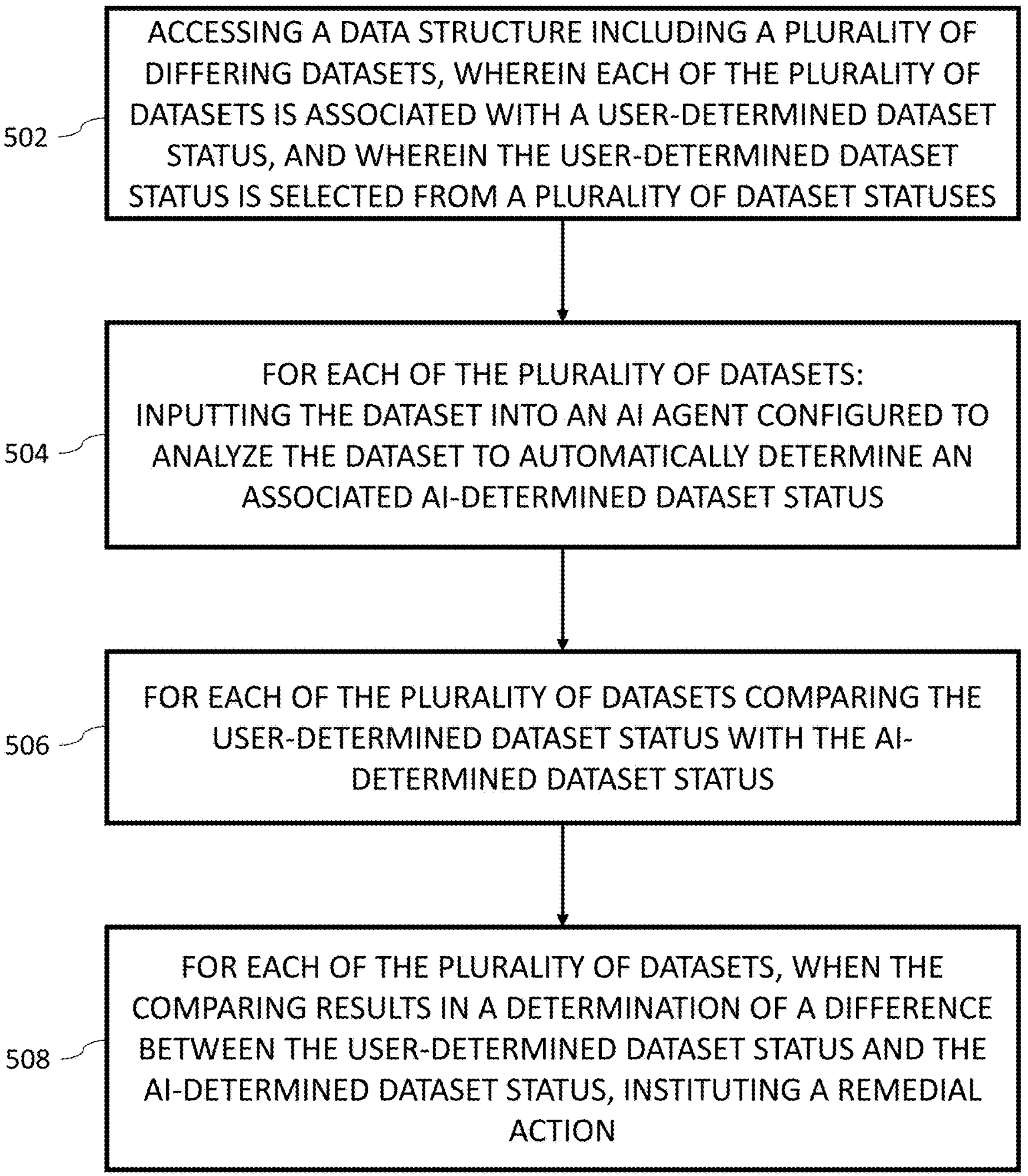
FIG. 5 is a flowchart of an exemplary process for performing operations for improving dataset state determinations using AI, consistent with some disclosed embodiments.

FIG. 5 is a flowchart of an exemplary process 500 for improving dataset state determinations using AI, consistent with some of the disclosed embodiments. Process 500 is discussed herein for explanatory purposes and is not intended to be limiting. In some embodiments, steps of process 500 may be changed, modified, substituted, or rearranged, consistent with the present disclosure. Process 500 may be implemented using one or more components of a computing device 800 (discussed in FIG. 8) or user device 920 of computing architecture 900 (discussed in FIG. 9). Some disclosed embodiments may include at least one processor that may be configured to execute stored instructions to perform operations for improving dataset state determinations using AI. As shown in FIG. 5, process 500 may include steps 502, 504, 506, and 508, discussed in further detail below. It is to be appreciated that the disclosed embodiments may apply to different contexts involving dataset state determination, such as project management, sales pipeline data, CRM solutions, or financial reporting.

Some disclosed embodiments involve accessing a data structure including a plurality of differing datasets, wherein each of the plurality of datasets is associated with a user-determined dataset status, and wherein the user-determined dataset status is selected from a plurality of dataset statuses. Accessing a data structure (as defined earlier) from the point of view of a software component or a processing unit relates to performing operations to retrieve, modify, or manage data contained within that structure. For example, a processing unit by accessing a data structure may extract data from the structure. This may involve reading specific elements, searching for particular values, or querying the data based on certain criteria. In another example, accessing a data structure may involve updating or changing the data within the structure such as inserting new elements, updating existing values, or deleting elements. Additionally, accessing a data structure may include performing tasks that ensure the data structure is maintained and operates efficiently. This may involve tasks like sorting, reorganizing, or balancing the data structure to optimize performance. In some embodiments, the data structure may be accessible from an external data source. For example, the data structure may be external to computing device 800 (discussed in FIG. 8) or user device 920 of computing architecture 900. Similarly, the data structure may be external to SaaS platform 100 illustrated in FIG. 1. In some embodiments, the data structure may include a plurality of different data structures including data on different groups of datasets and accessing the data structure may include aggregating the plurality of data structures into a cohesive data structure. These plurality of data structures may be stored on different servers, eventually distributed across the globe. Aggregating a plurality of data structures may involve retrieving data from various sources, which may comprise databases, spreadsheets, and other systems; converting data into a consistent format; summarizing or consolidating data to provide a higher-level view; ensuring the accuracy and consistency of the aggregated data; and/or storing the aggregated data in a cohesive structure, such as a centralized database or data warehouse, where it may be easily accessed and analyzed. Furthermore, in some embodiments, accessing the data structure including a plurality of datasets may include refreshing data on the plurality of datasets. Refreshing data may involve operations such as real-time synchronization, dynamic fetching, data polling, event-driven updates, data replication, incremental updates, conflict resolution, monitoring, and alters or caching data. Method 500 includes a step 502 accessing a data structure as illustrated in FIG. 5.

In some embodiments, the plurality of differing datasets included in the data structure may differ in nature. In other words, the different datasets may represent different types of objects and may vary in their characteristics, structure, and the type of information they contain. These differences can arise from various factors, including the nature of the data, the format, the source, and the intended use. For example, within the context of a SaaS platform, such as SaaS platform 100 shown in FIG. 1, the plurality of datasets may include SaaS platform elements (or different types of objects) such as tables 102, text documents 104, dashboards/widgets 106, applications 108, workflows 110, or any other relevant SaaS platform elements or sub-elements.

The data structure may include a plurality of differing datasets, each dataset being associated with a user-determined dataset status. A dataset status refers to the current state or condition of a dataset at a specific point in time. A status may provide an overview of various aspects such as availability (i.e., whether the dataset is accessible or not), completeness (i.e., whether all the required data points are present), quality (i.e., the accuracy and reliability of the data, and/or a qualitative label on what the dataset represents), update frequency, or usage (i.e., how the dataset is being used or if it is currently in use. Dataset status may be categorized into different labels to quickly convey the dataset's current state and any potential issues. Exemplary labels may include for example "Complete/Incomplete" to indicate the level of completeness of the dataset, "Up-to-date/Outdated" to indicate whether the dataset needs to be updated, or a qualitative label related to the content of the dataset, and which may vary depending on the context. In some embodiments, a dataset status associated with a dataset may not be included in the data structure. In that case, the dataset status may need to be determined or is stored elsewhere. Consistent with the disclosed embodiments a user-determined status may be selected from a plurality of dataset statuses. The plurality of dataset statuses may include multiple predefined statuses available for selection. A user may select a status for dataset through various interactive GUI elements. For example, a user may click on a drop-down menu associated with the dataset and choose the desired status from a list of options.

A dataset may be associated with a dataset status in different ways. For example, in some embodiments, a dataset status may be determined and manually assigned by a user, resulting in a user-determined dataset status A dataset status may be associated with a dataset including a data value corresponding to the dataset status within the dataset. By analyzing data included in the dataset a user may determine a dataset status for the dataset. For instance, a user may determine whether a dataset is complete/incomplete or up-to-date/outdated, and/or may determine a qualitative label related to the content of the dataset. In some embodiments, a dataset status may be determined and assigned to a dataset by a user with the help of one or more automations or rules implemented in a data management tool. Specifically, different predetermined rules may be set to participate in an automation to help the user in the determination of the dataset status. For instance, a rule might automatically flag a dataset as outdated. The tool may suggest a dataset status based on these rules, which the user may then accept or adjust as needed. Consistent with the disclosed embodiments, the user-determined dataset status may be selected from a plurality of dataset statuses.

In some embodiments, a dataset may include a plurality of dataset characteristics, and each of these dataset characteristics may be associated with a user-determined dataset characteristic status. A dataset characteristic refers to one or more data entries within a dataset. User-determined dataset characteristic statuses may represent statuses at a lower level compared to the user-determined dataset status. For example, a dataset may include twelve different data entries representing four data characteristics, each including three data entries. Each of the four data characteristics may be associated with user-determined data characteristic status (low-level status) and the overall dataset may be associated with dataset status (high-level status). Furthermore, in some embodiments, the user-determined dataset status may be determined by the user based on the plurality of user-determined dataset characteristic statuses.

In some embodiments, the plurality of datasets corresponds to a plurality of projects, each project being associated with project-related data, and the project-related data includes at least one of a plurality of tasks, a task completion rate, a timeline, or an associated project manager. Tasks refer to individual units of work or activities that need to be completed as part of a project. Task completion rate refers to a metric that measures the percentage of tasks that have been completed with a project. A timeline refers to a sequence of events or tasks over a specified period. An exemplary data structure including data on a plurality of projects is illustrated in FIG. 2. In this scenario, dataset status may correspond to project status (i.e., a status providing an overview of how the project is progressing relative to its planned schedule), and project status labels may include for example "on track", i.e., the project is proceeding as planned, "at risk", i.e., the project is facing potential issues that could jeopardize its completion, and "off track", i.e., the project is experiencing significant problems or delays that are preventing it from meeting its planned milestones. For example, referring to FIG. 2 representing in the context of a project management solution a data structure 200 corresponding to a plurality of project 202, each project item 202 includes a project status. Project status labels are examples of qualitative labels related to the content of datasets. Project status may be determined by a user such as a project manager or a portfolio manager, and/or be selected from a plurality of project statuses. Similarly, dataset characteristic status may correspond to a task status (i.e., a status providing an overview of how the task is progressing relative to its planned schedule), as tasks represent one or more data entries within a project. Furthermore, consistent with the disclosed embodiments, the user-determined project status may be determined by the user based on the plurality of user-determined task statuses.

Some disclosed embodiments involve, for each of the plurality of datasets, inputting the dataset into an AI agent configured to analyze the dataset to automatically determine an associated AI-determined dataset status. An AI agent (i.e., a software component using AI techniques such as machine learning or neural networks) may analyze a dataset by executing different operations. For instance, the AI agent may clean and prepare the dataset for analysis by removing or correcting errors, handling missing values, filtering out irrelevant information, normalizing or scaling data, and encoding categorical variables. The AI agent may also perform exploratory data analysis (EDA) to understand the data and identify patterns, trends, and anomalies. The AI agent may then select an appropriate model based on the problem, such as determining the dataset's status, and optimize the model's parameters. Once the model is ready, the AI agent may integrate it into a production environment for real-time predictions or decision-making. Additionally, the AI agent may continuously monitor the model's performance and update it as necessary to maintain accuracy and relevance. After having analyzed the dataset, the AI agent may determine an associated dataset status, resulting in an AI-determined dataset status. In some embodiments, a dataset may include a plurality of dataset characteristics, and each of these dataset characteristics may be associated with an AI-determined dataset characteristic status. AI-determined dataset characteristic statuses may represent statuses at a lower level compared to the AI-determined dataset status. Furthermore, in some embodiments, the AI-determined dataset status may be determined by the AI agent based on the plurality of AI-determined dataset characteristic statuses. Method 500 includes a step 504 inputting, for each of the plurality of datasets, the dataset into an AI agent configured to analyze the dataset to automatically determine an associated AI-determined dataset status as illustrated in FIG. 5.

In some embodiments, the AI-determined dataset status is selected from the plurality of dataset statuses. The plurality of dataset statuses may include multiple predefined statuses available for selection. The plurality of dataset statuses may be stored in a memory accessible to the AI agent and the AI agent may select one of the available predefined statuses. The selection may be based on the analysis of the dataset and/or on the training data set of the AI agent. Additionally, or alternatively, the AI-determined dataset status may be custom-made by the AI agent. In other words, the AI-determined status may be selected from the same plurality of dataset statuses used for the user-determined dataset status or may be custom-made by the AI agent. For example, within the context of project management wherein datasets correspond to projects, an AI agent after having analyzed project-related data may determine a project status. Such a project status may be selected from a plurality of project statuses used as a basis by a user (e.g., "off track", "at risk", or "on track") or may be customized (e.g., "require immediate action" or "to be prioritized").

In some embodiments, inputting, for each of the plurality of datasets, the dataset into the AI agent configured to analyze the dataset to automatically determine an associated AI-determined dataset status includes inputting the plurality of datasets into the AI agent configured to analyze the plurality of datasets to automatically determine, for each of the plurality of datasets, an associated AI-determined dataset status based on the plurality of datasets. In other words, by analyzing the plurality of datasets, an AI agent may leverage relationships (whether explicit or implicit) between the plurality of differing datasets to determine a dataset status for a specific dataset. This approach may enable the AI agent to refine its analysis and improve the accuracy of the AI-determined dataset status. Accordingly, AI-determined dataset statuses may be determined/predicted across multiple or all datasets included in the data structure. Within the context of project management wherein datasets correspond to projects, an AI agent may analyze the plurality of projects, find some trends or relationships, and determine a project status based on the identified trends or relationships. For example, an AI agent may determine that projects handled by a specific project manager are consistently behind schedule and therefore flag one or more given projects handled by the project manager as "at risk". In some cases, an AI agent may leverage data included in a whole data structure/project portfolio or across multiple data structures/project portfolios to determine/predict project statuses.

In contrast to the user-determined dataset status, the AI-determined status may be provided in real-time, reflecting the most current state of the dataset. This real-time capability may ensure that the AI's assessment is based on the latest available data, offering a more up-to-date and dynamic evaluation. For example, in a project management context, while a project manager might update the project status periodically based on their observations and reports, the AI may continuously monitor various data sources such as task completions or timeline changes. As a result, the AI-determined project status may quickly adapt to any new developments, providing an immediate and accurate reflection of the project's current state. This real-time assessment may be valuable in fast-paced environments where conditions can change rapidly. It allows stakeholders to make timely decisions based on the most recent information, enhancing responsiveness and agility. Additionally, the AI's ability to process and analyze large volumes of data in real time may uncover trends and issues that might not be immediately apparent to human observers. Accordingly, an AI determine a dataset status more rapidly than a user.

Some disclosed embodiments involve, for each of the plurality of datasets, comparing the user-determined dataset status with the AI-determined dataset status. Comparing two determined dataset statuses may involve identifying differences/discrepancies, correspondences/similarities, and/or overall changes between the dataset statuses. In some embodiments, wherein a dataset includes a plurality of dataset characteristics, and each of these dataset characteristics is associated with a user-determined dataset characteristic status and an AI-determined dataset characteristic status, comparing statuses may involve comparing each of the lower-level user-determined dataset characteristic status with the corresponding lower-level AI-determined dataset characteristic status. The output of the plurality of comparisons may be aggregated to generate an overall score of correspondence or discrepancy. Additionally, comparing statuses may also involve comparing the higher-level user-determined dataset status with the higher-level AI-determined dataset status. Method 500 includes a step 506 of comparing, for each of the plurality of datasets, the user-determined dataset status with the AI-determined dataset status as illustrated in FIG. 5.

Some disclosed embodiments involve, for each of the plurality of datasets, when the comparing results in a determination of a difference between the user-determined dataset status and the AI-determined dataset status, instituting a remedial action. Instituting an action, in response to a determined difference between the user-determined dataset status and the AI-determined dataset status, may involve executing a series of instructions (e.g., instruction fetch, instruction decode, memory access, write back, etc.) to achieve a specific outcome. A remedial action refers to a measure taken to correct or improve a situation that has gone wrong or is not functioning as intended. In the context of the present disclosure, the remedial action aims to address and resolve the determined difference between the user-determined dataset status and the AI-determined dataset status. Method 500 includes a step 508 of instituting a remedial, for each of the plurality of datasets, when the comparing results in a determination of a difference between the user-determined dataset status and the AI-determined dataset status as illustrated in FIG. 5.

Various remedial actions may be instituted in response to a determined difference, for a given dataset, between the user-determined dataset status and the AI-determined dataset status. For example, in some embodiments, the remedial action includes outputting an indicator signaling a discrepancy. As used herein, an indicator refers to any form of signal that provides information about the identified difference/discrepancy between the user-determined dataset status and the AI-determined dataset status. Examples of indicators include but are not limited to notifications, emails, reports, alerts, alarms, or messages. Additionally, some disclosed embodiments may involve, for each of the plurality of data sets, when the comparing results in a determination of a correspondence between the user-determined dataset status and the AI-determined dataset status, outputting an indicator signaling a correspondence. The indicator signaling a correspondence may differ from the indicator signaling a discrepancy. Determination of correspondence involves comparing the user-determined dataset status with the AI-determined dataset status to see if they align. This alignment may be an exact match (identical in every aspect), a match within a tolerance (if the user-determined status is "Off track" and the AI-determined status is "At risk to Off track"), a match of most dataset characteristic statuses, or a match of the most important dataset characteristic status. When a correspondence is found, an indicator signals this alignment, which may differ from the indicator signaling a discrepancy. While the type of indicator (e.g., alarm, alert, email, text) might be the same, the content and presentation will differ.

Figure 6A:
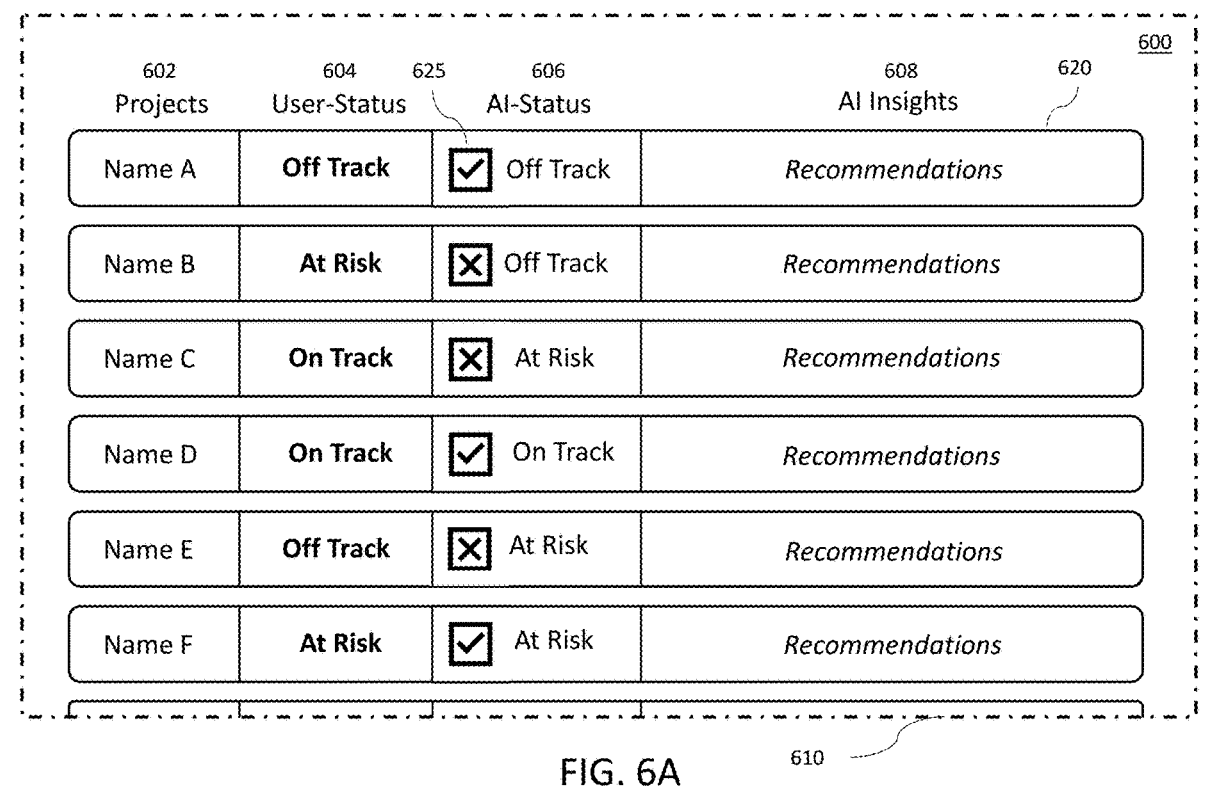
Figure 6B:
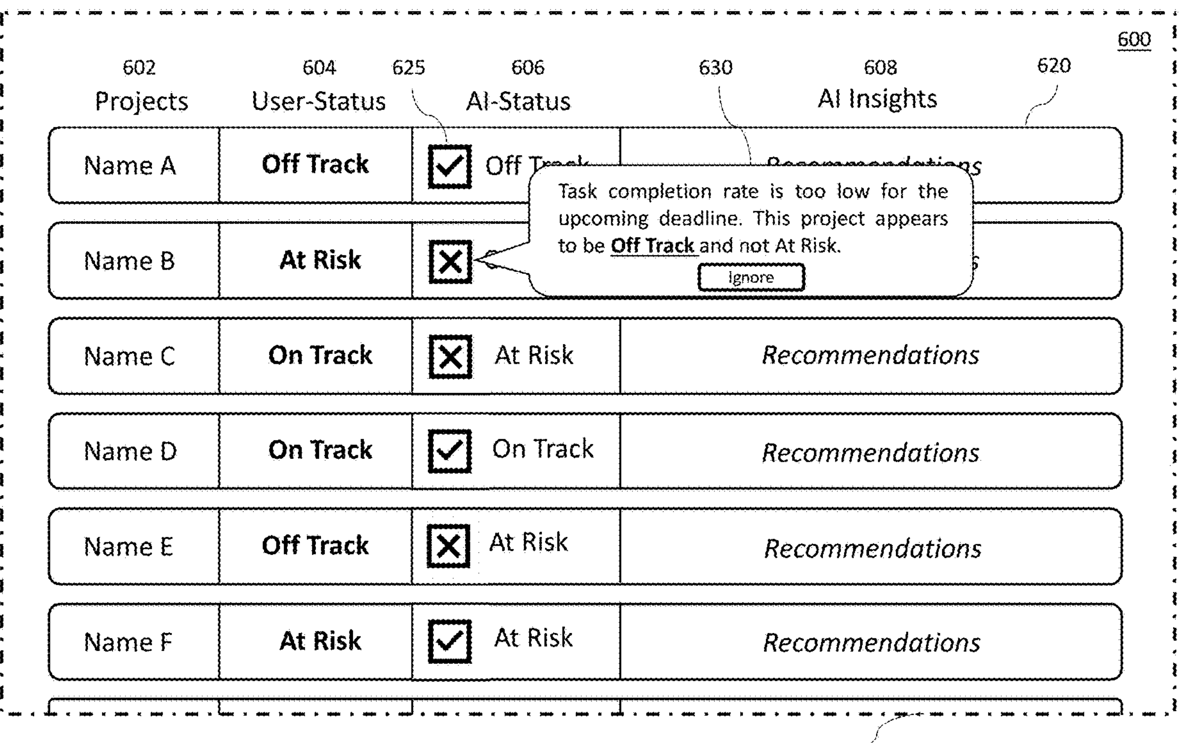
Figure 7A:
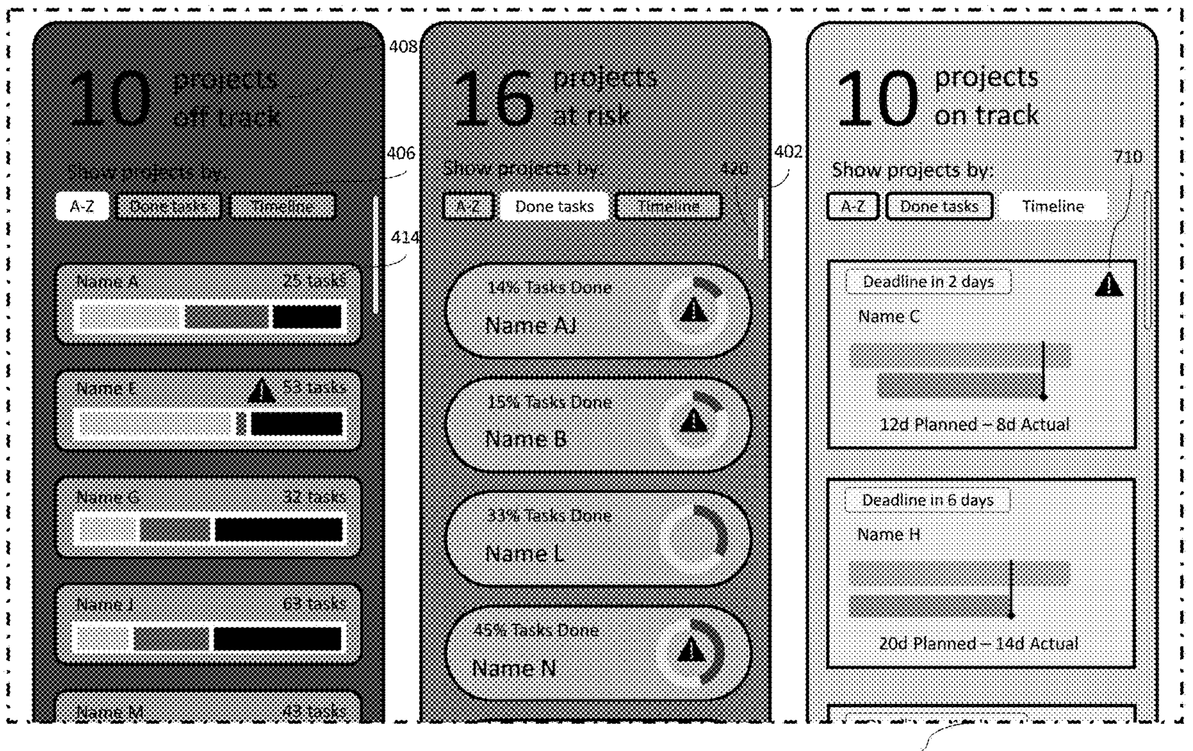
FIGS. 7A and 7B are exemplary illustrations of arrangements of categorized displays of discrete graphical elements associated with project-related data featuring indicators of improved project state determinations using AI, consistent with some of the disclosed embodiments.

In some embodiments, outputting the indicator signaling the identified discrepancy includes presenting a visual indicator signaling the discrepancy on a display. Similarly, outputting the indicator signaling the identified correspondence may include presenting a visual indicator signaling the correspondence on the display. A visual indicator refers to a graphical element used in a user interface to convey information to users through visual means. These indicators may be designed to be easily recognizable and quickly understood, helping users to interpret data or system states at a glance. The visual indicator signaling the correspondence may visually differ from the visual indicator signaling the discrepancy. As used herein, the term "display" refers to any physical device capable of providing a visual presentation of data. Examples of physical devices acting as displays include computer screens, smartphone screens, tablet screens, smartwatch screens, laptop screens, video walls, projectors, head-mounted displays, or virtual/extended reality headsets. Additionally, some disclosed embodiments involve presenting on a display the plurality of datasets with the associated user-determined dataset statuses and/or the associated AI-determined dataset statuses. FIG. 6A is an exemplary illustration of a display, in the context of a data structure 200 including data on a plurality of projects, presenting the plurality of projects (i.e., datasets) along with the associated user-determined project statuses and the AI-determined statuses, consistent with some of the disclosed embodiments. In this figure, the dimensions of the display are represented by the dot-dash line 610. As shown, a plurality of project GUI elements 620 are presented, including the project name (column 602), the user-determined project statuses (column 604), and the AI-determined project statuses. Additionally, each of the plurality of project GUI elements 620 includes a visual indicator 625 signaling either an identified correspondence (checked checkbox) or an identified discrepancy (crossed checkbox) between the user-determined project status and the AI-determined project status. It is to be appreciated display 600 is a mere example. In some embodiments, the display including the plurality of datasets along with the associated user-determined dataset statuses, the associated AI-determined dataset statuses, the outputted visual indicators signaling a discrepancy, and/or the outputted visual indicators signaling a correspondence may not be a separate dedicated display. For example, FIG. 7A is an illustration of a categorized display of discrete graphical elements associated with project-related data, akin to the one shown in FIG. 4C, further featuring visual indicators 710 (warning pictograms) signaling a discrepancy between the user-determined project status and the AI-determined status. In this display identified correspondence between the user-determined project status and the AI-determined status is not signaled via a visual indicator. It is also to be appreciated that a user provided with the aforementioned display and/or outputted indicator (e.g., visual indicator) signaling a discrepancy or correspondence may differ from the user who determined the dataset status. For instance, in the context of project management, a project manager might determine the project status, while the indicator and/or display may be provided to a portfolio manager overseeing all projects within the data structure or project portfolio.

In some embodiments, the remedial action includes automatically choosing between the user-determined dataset status and the AI-determined dataset status based on a predefined rule. A rule refers to a predefined guideline or condition that dictates how certain actions or decisions should be made within a system. Rules may be stored in a structured format within a system to ensure they can be easily accessed, managed, and applied. For instance, a predefined rule might prioritize the user-determined dataset status (i.e. selecting the user-determined dataset status), thereby fostering trust in the user's judgment. In such scenarios, the AI-determined dataset status may still be presented to the user, who may then decide whether to update their judgment based on this additional information. This approach is particularly suitable for users who may have trust issues with AI assessments and prefer to use the AI-determined dataset status as a supplementary tool for their own evaluation or the evaluation of other users. For example, referring to FIG. 6A, user-determined dataset statuses are selected by default (bold font indicates selection) and presented in user status column 604, while the AI-determined dataset statuses are presented in a separate AI status column 606. The display presented in FIG. 7A may also follow a similar rule, i.e., project status shown and used for the categorized display of FIG. 7A may correspond to user-determined dataset status.

Conversely, another predefined rule might prioritize the AI-determined dataset status (i.e., selecting the AI-determined status), emphasizing automation and the AI's assessment capabilities. In this case, the user-determined dataset status may still be provided to the user, allowing them to decide whether to adjust the AI's judgment based on their own judgment or the judgment of others. This method may support users who are more inclined to rely on automated processes but still value having their input or the input of other users considered.

Additionally, these predefined rules may be tailored to different contexts and user preferences. For example, in a high-stakes environment where a lot of parameters and/or a large amount of data is present and where accuracy is critical, the system might default to the AI-determined status but require user confirmation before finalizing any decisions. Alternatively, in a more collaborative setting, the system might present both statuses equally, encouraging a balanced review process where both AI and user inputs are integrated to reach the best possible outcome. By implementing such flexible rules, varying levels of trust and reliance on AI may be supported, ensuring that users feel supported and confident in the decision-making process. The predefined rules may be implemented via settings selected by a user.

Validation or modification of the user-determined dataset status may be performed in various ways. For example, some disclosed embodiments involve enabling, on the display, a modification of the associated user-determined dataset status. Enabling modifications on the display may involve providing various GUI elements that allow users to interact with and update the status of datasets. For instance, editable fields can be used where users click on a status field next to a dataset to select from options or directly type the new dataset status. Action buttons such as "Approve" or "Reject" can be placed next to each dataset, allowing users to change the status with a single click. Additionally, checkboxes and toggles enable users to select multiple datasets and apply bulk actions, while drag-and-drop interfaces allow for intuitive status updates by moving items between columns. Context menus, accessible via right-click, offer a range of status options that update the dataset's status and reflect the change on the display. Referring to FIG. 6A, a user may modify the user-determined status by clink on the status and selecting an updating status.

In some embodiments, when the user-determined dataset status is preferred over the AI-determined dataset status, the user-determined status and its corresponding dataset may be utilized to further train the AI agent, thereby enhancing its accuracy. This process may involve incorporating the user-provided dataset status and decisions into the AI's training dataset, allowing the AI to learn from the user's expertise and judgment. By doing so, the AI agent may better understand the criteria and nuances that the user considers important, leading to more accurate and reliable future assessments. This iterative training approach may not only improve the AI's performance but also build trust between the user and the AI system, as the AI becomes more aligned with the user's expectations and decision-making processes.

In some other embodiments, the remedial action may include at least one of creating a difference log, creating a task, or scheduling a meeting. Creating a difference log may involve documenting any discrepancies or changes identified during the analysis. The log may serve as a detailed record that may be reviewed by the user to understand what differences were found, their potential causes, and any actions taken to address them. This log may be useful for tracking changes over time and ensuring accountability. Creating a task may involve assigning specific actions to individuals (e.g., users at the origin of the user-determined dataset status) to address the identified difference with the AI-determined status. This approach may help in organizing and managing the workflow required to provide user feedback on the AI-determined dataset status. Scheduling a meeting may involve organizing a meeting with relevant stakeholders (e.g., a user at the origin of the user-determined dataset status, a user reviewing the plurality of user-determined and AI-determined dataset statuses, etc.) to discuss the identified differences and plan the necessary actions.

In some embodiments, the AI agent is further configured to provide textual justifications for the determination of the associated dataset status. Moreover, some disclosed embodiments involve in response to a user interaction with the visual indicator, outputting a justification indicator. User interaction with the visual indicator refers to any action taken by a user that involves engaging with the visual indicator on the display. Examples of user interactions include but are not limited to, clicking/tapping, hovering, dragging and dropping, scrolling, swiping, pinching/zooming, typing, selecting, voice commands, or gestures. The justification indicator may be configured to provide a textual justification for the discrepancy. In some embodiments, the justification indicator may be a visual indicator. The AI agent, in addition to providing AI-determined dataset statuses, may also be configured to offer textual justifications for these statuses. Textual justification refers to a written explanation or reasoning provided to support a particular decision or status. In the context of an AI agent, the AI agent may generate a text-based explanation detailing why a certain status was assigned to a dataset. This feature may enhance transparency and help users understand the reasoning behind the AI's decisions. By providing textual justifications, the AI agent may explain the factors and data points that influenced its determination. For example, if the AI determines that a project is at risk, it might include a justification such as, "The project is flagged as at risk due to a short upcoming deadline." This capability may be valuable in scenarios where users need to trust and verify the AI's assessments. It allows users to see the logic and data behind the AI's conclusions, making it easier to accept or challenge the AI's status determinations. Additionally, these justifications may serve as educational tools, helping users learn more about the criteria and processes used by the AI. In some embodiments, the textual justification provided by the AI agent may be framed in the context of a comparison with the user-determined dataset status. This approach may not only explain the AI's reasoning but also highlight the differences or similarities between the AI's assessment and the user's judgment. For example, if the AI determines that a project is off track while the user has marked it as at risk, the textual justification might include a statement such as, "The AI has flagged the project as off track due to the too-low task completion rate for the upcoming deadline." Furthermore, it is to be appreciated that textual justifications may be tailored to different levels of detail based on the user's needs.

In some embodiments, outputting the justification indicator includes presenting on the display a pop-up window configured to display the textual justification for the discrepancy and to display a GUI element for ignoring the AI-determined dataset status. A GUI element for ignoring the AI-determined dataset status refers to a visual component that allows users to dismiss or bypass the AI determined dataset status. Examples of such GUI element may include an ignore button, a dismiss icon ("X" icon), or a hide checkbox. For example, referring to FIG. 6B, in response to a user interaction (e.g., clicking, tapping, hovering, pinching, etc.) with the visual indicator 625 (crossed checkbox) signaling a discrepancy between the user-determined project status and the AI-determined project status included in the project GUI element corresponding to project "Name B", display 600 may be augmented with a pop-up window 630. Pop-up window 630 may be configured to display the textual justification for the discrepancy outputted by the AI agent, framed here in the context of a comparison with the user-determined dataset status. Moreover, pop-up window 630 may also be configured to display a GUI element for ignoring the AI-determined dataset status ("Ignore" button). Additionally, some disclosed embodiments involve, in response to a user interaction with the GUI element causing the pop-up window and the visual indicator to disappear from the display. As used herein, disappear means to cease to be visible or to be removed from view. For example, referring to FIG. 6B, in response to a user interaction with the "Ignore" button (e.g., clinking on the button), pop-up window 630, and visual indicator 625 may be caused to disappear from display 600.

In some embodiments, the AI agent is further configured to provide insights for each of the plurality of datasets. As used herein, insights refer to the deep understanding and actionable information derived from analyzing datasets. These insights may help users to make informed decisions and implement actions. For example, insights may include trends (e.g., movements in data over time), patterns (e.g., recurring sequences or relationships in the data), anomalies (e.g., outliers or unusual data points that deviate from the norm, which may indicate errors, fraud, or significant events), correlations (e.g., relationships between different variables), predictions (e.g., future outcomes based on historical data), and/or recommendations (e.g., suggested actions based on the analysis of data). In some embodiments, the AI agent may be configured to provide insights for each of the plurality of datasets based on the analysis of each dataset. Alternatively, in some other embodiments, the AI agent may be configured to provide insight for each of the plurality of datasets based on the analysis of multiple or all datasets included in the data structure, thereby leveraging relationships across different datasets.

By providing these insights, the AI agent may help users understand the underlying dynamics of their datasets, enabling them to make data-driven decisions. This capability may be particularly valuable in complex environments where manual analysis would be time-consuming and prone to errors. In a project management context, the AI agent might analyze project-related data to provide insights to improve the unveiling of the project and/or change the AI-determined project status. These insights may then inform strategic decisions, such as reallocating resources. For example, an AI agent may identify that all projects in Europe may be consistently behind schedule and therefore provide, as an insight, a recommendation indicating that additional resources should be allocated to projects occurring in Europe.

Figure 7B:
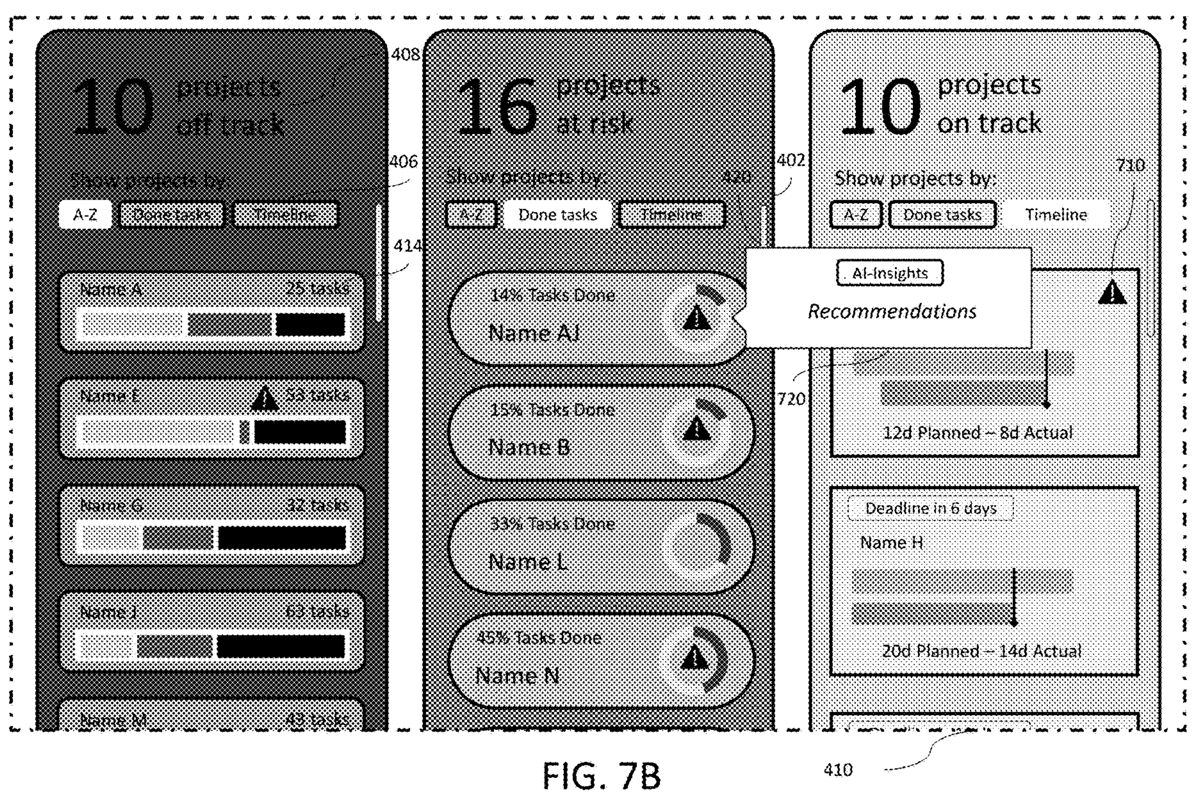

Furthermore, some disclosed embodiments may involve presenting on a display the insights provided by the AI agent. For example, referring to FIGS. 6A-6B, insights provided by the AI agent taking the form of "recommendations" are provided in column 608. "Recommendations" serve here as placeholder and be replaced with any form of text-based insights, such as explanations, justifications, or other relevant information, depending on the context and user needs. Additionally, in some embodiments, insights may be presented on the display in response to a user interaction with a GUI element. For example, referring to FIG. 7B, which illustrates a categorized display of discrete graphical elements associated with project-related data, akin to the one shown in FIG. 7A, AI-provided insights may be displayed in a pop-window 720 appearing after user interaction with the visual indicator 710 signaling a discrepancy. Similarly, in FIG. 7B, "Recommendations" serve here as placeholder and be replaced with any form of text-based insights.

While the disclosed and illustrated processes describe different aspects of enabling enhanced data representation and improving dataset status determination operations, in some embodiments, the steps within the disclosed processes may be combined with each other or integrated into a more comprehensive process. This global process may be implemented using one or more components of a computing device 800 (as discussed in FIG. 8) or a user device 920 within the computing architecture 900 (as discussed in FIG. 9). The disclosed embodiments may involve at least one processor configured to execute stored instructions for performing the global process. By combining the steps from various processes or designing a more extensive process, the disclosed embodiments provide a seamless integration of various enhanced computer functionalities into a unified system. The computing resources and processors disclosed herein may play a key role in executing the instructions that drive such a unified or global process.

Figure 8:
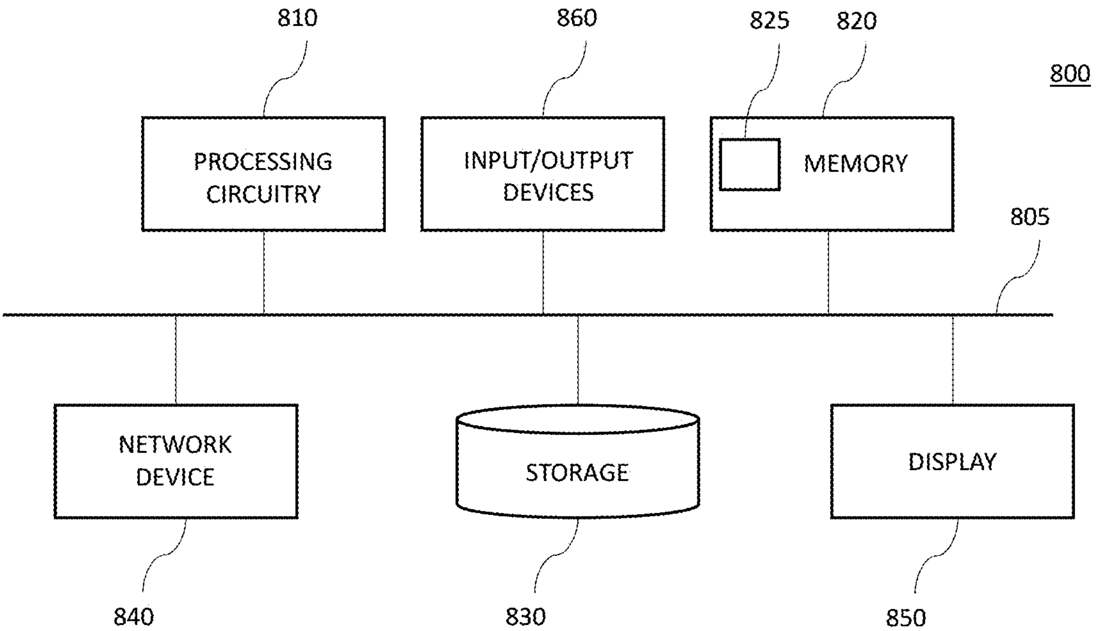
FIG. 8 is a block diagram of an exemplary computing device or system which may be employed in connection with some embodiments of the present disclosure.

FIG. 8 is a block diagram of an exemplary computing device 800 consistent with some embodiments. In some embodiments, computing device 800 may be similar in type and function to user device 920, discussed with respect to FIG. 9. As shown in FIG. 12, computing device 800 may include processing circuitry 810, such as, for example, a central processing unit (CPU). In some embodiments, the processing circuitry 810 may include, or may be a component of, a larger processing unit implemented with one or more processors. The one or more processors may be implemented with any combination of any of the hardware components described earlier or any other suitable entities that may perform calculations or other manipulations of information. The processing circuitry such as processing circuitry 810 may be coupled via a bus 805 to a memory 820.

The memory 820 may further include a memory portion 820 that may contain instructions that when executed by the processing circuitry 810, may perform the methods described in more detail herein. Further details on memory are provided in above sections. The processing circuitry 810 may be further connected to a network device 840, such as a network interface card, for providing connectivity between the computing device 800 and a network, such as a network 900, discussed in more detail with respect to FIG. 9 below. The processing circuitry 810 may be further coupled with a storage device 830. The storage device 830 may be used for the purpose of storing single data type column-oriented data structures, data elements associated with the data structures, or any other data structures. While illustrated in FIG. 8 as a single device, it is to be understood that storage device 830 may include multiple devices either collocated or distributed.

The processing circuitry 810 and/or the memory 820 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, computing device 800 may include one or more input and output devices 860. Input and output devices 860 may include one or more input interfaces, such as a keyboard device, an electronic mouse, an electronic stylus, a touch-sensitive screen, a camera (e.g., for capturing an input gesture), a microphone (e.g., for capturing audio input), and/or any other type of input interface. Input and output devices 860 may include one or more output interfaces, such as an electronic screen, a speaker, a haptic output device, and/or any other type of output interface. Computing device may also include a display 19, such as a touchscreen display or other display types discussed herein.

Figure 9:
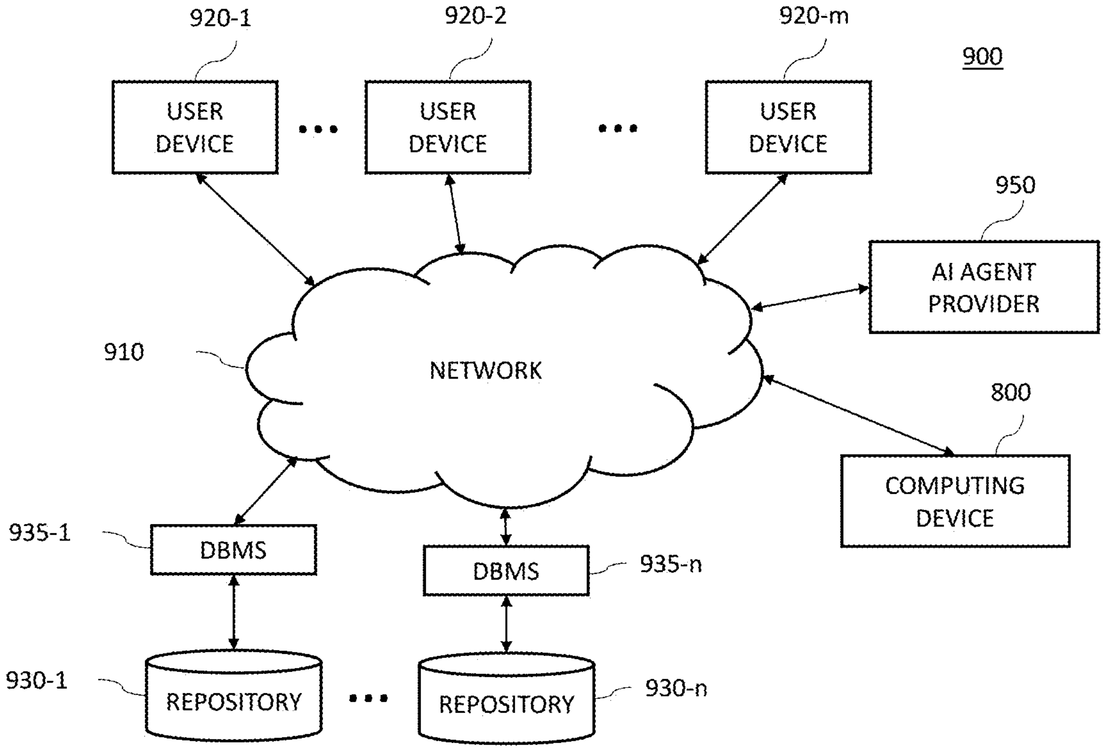
FIG. 9 is a block diagram of an exemplary computing architecture for collaborative work systems, consistent with some embodiments of the present disclosure.

FIG. 9 is a block diagram of a computing architecture 900 that may be used in connection with various disclosed embodiments, such as SaaS platform 100 shown in FIG. 1. The computing device 800, as described in connection with FIG. 8, may be coupled to network 900. The network 900 may enable communication between different elements that may be communicatively coupled with the computing device 800, as further described below. The network 900 may include the Internet, the world-wide-web (WWW), a local area network (LAN), a wide area network (WAN), a metro area network (MAN), and other networks capable of enabling communication between the elements of the computing architecture 900. In some disclosed embodiments, the computing device 800 may be a server deployed in a cloud computing environment.

One or more user devices 920-1 through user device **920-*m*, where 'm' in an integer equal to or greater than 1, referred to individually as user device 920 and collectively as user devices 920, may be communicatively coupled with the computing device 800 via the network 900. A user device 920 may be for example, a smart phone, a mobile phone, a laptop, a tablet computer, a wearable computing device, a personal computer (PC), a smart television and the like. A user device 920 may be configured to send to and receive from the computing device 800 data and/or metadata associated with a variety of elements associated with single data type column-oriented data structures, such as columns, rows, cells, schemas, and the like. Furthermore, external third-party application providers such as an AI agent provider 950 may be communicatively coupled with the computing device 800 via the network 900**.

One or more data repositories 930-1 through data repository **930-*n*, where 'n' in an integer equal to or greater than 1, referred to individually as data repository 930 and collectively as data repository 930, may be communicatively coupled with the computing device 800 via the network 900, or embedded within the computing device 800. Each data repository 930 may be communicatively connected to the network 900 through one or more database management services (DBMS) 935-1 through DBMS 935-*n*. The data repository 930 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 800**.

The embodiments disclosed herein are exemplary and any other means for performing and facilitating display navigation operations may be consistent with this disclosure.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Differing embodiments of this disclosure may involve systems, methods, and/or computer readable media containing instructions. A system refers to at least two interconnected or interrelated components or parts that work together to achieve a common objective, function, or subfunction. A method refers to at least two steps, actions, or techniques to be followed to complete a task or a sub-task, to reach an objective, or to arrive at a next step. Computer-readable media containing instructions refers to any storage mechanism that contains program code instructions, for example to be executed by a computer processor. Examples of computer-readable media are further described elsewhere in this disclosure. Instructions may be written in any type of computer programming language, such as an interpretive language (e.g., scripting languages such as HTML and JavaScript), a procedural or functional language (e.g., C or Pascal that may be compiled for converting to executable code), an object-oriented programming language (e.g., Java or Python), a logical programming language (e.g., Prolog or Answer Set Programming), and/or any other programming language. Instructions executed by at least one processor may include implementing one or more program code instructions in hardware, in software (including in one or more signal processing and/or application specific integrated circuits), in firmware, or in any combination thereof, as described earlier. Causing a processor to perform operations may involve causing the processor to calculate, execute, or otherwise implement one or more arithmetic, mathematic, logic, reasoning, or inference steps.

Examples of inventive concepts are contained in the following clauses which are an integral part of this disclosure.

Clause 1. A non-transitory computer-readable medium containing instructions that, when executed by at least one processor, cause the at least one processor to perform operations for providing a categorized display of discrete graphical elements associated with project-related data, the operations comprising:

accessing a data structure including data on a plurality of differing projects, wherein each project has one of a plurality of project statuses;

receiving a request for a status-level summarization of the plurality of projects;

in response to the request for the status-level summarization, scanning the data structure;

based on the scanning of the data structure, aggregating project status level categorization data associated with the plurality of projects, thereby defining a set of status groups;

generating a plurality of interactive aggregate project graphics, each interactive aggregate project graphic including a plurality of interactive project elements, and each of the plurality of interactive aggregate project graphics being associated with a differing one of the status groups in the set; and displaying each of the interactive aggregate project graphics on a common display.

Clause 2. The non-transitory computer-readable medium of clause 1, wherein within each interactive aggregate project graphic, each of the interactive project elements are displayed in accordance with an applied data display mode from a plurality of data display modes.

Clause 3. The non-transitory computer-readable medium of any of clauses 1 and 2, wherein each of the plurality of interactive project elements is configured to graphically display a name of the project and at least some project-related data associated with the project.

Clause 4. The non-transitory computer-readable medium of any of clauses 1 to 3, wherein applying the data display mode to each of the interactive project elements in each interactive aggregate project graphic includes selecting the at least some of the project-related data associated with the project to be graphically displayed in accordance with the applied data display mode.

Clause 5. The non-transitory computer-readable medium of any of clauses 1 to 4, wherein the at least some of the graphically displayed project-related data associated with the project is graphically displayed via a data visualization widget, an alphanumerical field, or a combination thereof.

Clause 6. The non-transitory computer-readable medium of any of clauses 1 to 5, wherein applying the data display mode to each of the interactive project elements in each interactive aggregate project graphic includes sorting each of the interactive project elements within the interactive aggregate project graphic in accordance with the applied data display mode.

Clause 7. The non-transitory computer-readable medium of any of clauses 1 to 6, wherein applying the data display mode to each of the interactive project elements in each interactive aggregate project graphic includes modifying a visual appearance of each of the interactive project elements in the interactive aggregate project graphic.

Clause 8. The non-transitory computer-readable medium of any of clauses 1 to 7, wherein one of the plurality of data display modes is applied by default when the plurality of interactive aggregate project graphics is presented on the common display.

Clause 9. The non-transitory computer-readable medium of any of clauses 1 to 8, wherein the plurality of data display mode includes an alphabetical, a task completion rate, and a timeline data display mode.

Clause 10. The non-transitory computer-readable medium of any of clauses 1 to 9, wherein the operations further comprise based on the set of status groups, identifying a set of visual characteristics for graphically expressing the plurality of project statuses, and applying the set of visual characteristics to the plurality of interactive aggregate project graphics.

Clause 11. The non-transitory computer-readable medium of any of clauses 1 to 10, wherein each of the plurality of interactive aggregate project graphics includes at least one alphanumerical field configured to present at least one of a number of projects included in the status group associated with the interactive aggregate project graphic, or the project status associated with the interactive aggregate project graphic.

Clause 12. The non-transitory computer-readable medium of any of clauses 1 to 11, wherein the operations further comprise in response to a user interaction with one of the plurality of interactive project elements causing a pop-up window to appear on the common display, wherein the pop-up window is configured to display at least some project-related data associated with the project corresponding to the one interactive project element.

Clause 13. The non-transitory computer-readable medium of any of clauses 1 to 12, wherein each of the plurality of interactive project elements is configured to graphically display the at least some project-related data associated with the project and wherein the pop-up window is further configured to display additional project-related data associated with the project corresponding to the one interactive element.

Clause 14. The non-transitory computer-readable medium of any of clauses 1 to 13, wherein each project is associated with a project manager, and wherein the operations further comprise:

within each interactive aggregate project graphics, enabling a selection of a project manager data display mode;

in response to the selection of the project manager data display mode within an interactive aggregate project graphics:

grouping the plurality of projects included in the status group associated with the interactive aggregate project graphic by project manager to define a set of project manager groups;

generating a plurality of interactive project manager elements associated with the set of project manager groups; and switching from a first presentation of the interactive aggregate project graphic on the common display based on an applied data display mode to a second presentation of the interactive aggregate project graphic on the common display based on the project manager data display mode, wherein in the second presentation the plurality of interactive project manager elements is arranged within the interactive aggregate project graphic.

Clause 15. The non-transitory computer-readable medium of any of clauses 1 to 14, wherein the plurality of data display modes and the project manager data display mode are selectable from a single Graphical User Interface (GUI) element presented within the interactive aggregate project graphic.

Clause 16. The non-transitory computer-readable medium of any of clauses 1 to 15, wherein each of the plurality of interactive project manager elements is configured to display at least one of a name of an associated project manager, a number of projects included in the associated project manager group, or a picture of an associated manager.

Clause 17. The non-transitory computer-readable medium of any of clauses 1 to 16, wherein each of the plurality of interactive project manager elements adopts a size to reflect a number of projects included in the associated project manager group.

Clause 18. The non-transitory computer-readable medium of any of clauses 1 to 17, wherein the operations further comprise, in response to a cumulated size of all interactive project elements within an interactive aggregate project graphic being larger than at least one dimension of the interactive aggregate project graphic presented on the common display, enabling scrolling through the interactive project element within the interactive aggregate project graphic.

Clause 19. A method for providing a categorized display of discrete graphical elements associated with project-related data, the method comprising:

accessing a data structure including data on a plurality of differing projects, wherein each project has one of a plurality of project statuses;

receiving a request for a status-level summarization of the plurality of projects;

in response to the request for the status-level summarization, scanning the data structure;

based on the scanning of the data structure aggregating project status level categorization data associated with the plurality of projects, thereby defining a set of status groups;

generating a plurality of interactive aggregate project graphics, each interactive aggregate project graphic including a plurality of interactive project elements, and each of the plurality of interactive aggregate project graphics being associated with a differing one of the status groups in the set; and displaying each of the interactive aggregate project graphics as interactive aggregate project graphics on a common display.

Clause 20. A system for providing a categorized display of discrete graphical elements associated with project-related data, the system comprising:

at least one processor configured to:

access a data structure including data on a plurality of differing projects, wherein each project has one of a plurality of project statuses;

receive a request for a status-level summarization of the plurality of projects;

in response to the request for the status-level summarization, scan the data structure;

based on the scanning of the data structure aggregate project status level categorization data associated with the plurality of projects, thereby defining a set of status groups;

generate a plurality of interactive aggregate project graphics, each interactive aggregate project graphic including a plurality of interactive project elements, and each of the plurality of interactive aggregate project graphics being associated with a differing one of the status groups in the set; and display each of the interactive aggregate project graphics as interactive aggregate project graphics on a common display.

Clause 21. A non-transitory computer-readable medium containing instructions that, when executed by at least one processor, cause the at least one processor to perform operations for improving dataset state determinations using AI, the operations comprising:

accessing a data structure including a plurality of differing datasets, wherein each of the plurality of datasets is associated with a user-determined dataset status, and wherein the user-determined dataset status is selected from a plurality of dataset statuses;

for each of the plurality of datasets:

inputting the dataset into an AI agent configured to analyze the dataset to automatically determine an associated AI-determined dataset status;

comparing the user-determined dataset status with the AI-determined dataset status; and when the comparing results in a determination of a difference between the user-determined dataset status and the AI-determined dataset status, instituting a remedial action.

Clause 22. The non-transitory computer-readable medium of any of clauses 1 to 21, wherein the AI-determined dataset status is selected from the plurality of dataset statuses.

Clause 23. The non-transitory computer-readable medium of any of clauses 1 to 22, wherein the remedial action includes at least one of outputting an indicator signaling a discrepancy or automatically choosing between the user-determined dataset status and the AI-determined dataset status based on a predefined rule.

Clause 24. The non-transitory computer-readable medium of any of clauses 1 to 23, wherein outputting the indicator signaling the identified discrepancy includes presenting a visual indicator signaling the discrepancy on a display.

Clause 25. The non-transitory computer-readable medium of any of clauses 1 to 24, wherein the AI agent is further configured to provide textual justifications for the determination of the associated dataset status and wherein the operations further comprise in response to a user interaction with the visual indicator, outputting a justification indicator, wherein the justification indicator is configured to provide a textual justification for the discrepancy.

Clause 26. The non-transitory computer-readable medium of any of clauses 1 to 25, wherein outputting the justification indicator includes presenting on the display a pop-up window configured to display the textual justification for the discrepancy and to display a GUI element for ignoring the AI-determined dataset status.

Clause 27. The non-transitory computer-readable medium of any of clauses 1 to 26, wherein the operations further comprise in response to a user interaction with the GUI element causing the pop-up window and the visual indicator to disappear from the display.

Clause 28. The non-transitory computer-readable medium of any of clauses 1 to 27, wherein the plurality of datasets corresponds to a plurality of projects, each project being associated with project-related data, and the project-related data includes at least one of a plurality of tasks, a task completion rate, a timeline, or an associated project manager.

Clause 29. The non-transitory computer-readable medium of any of clauses 1 to 28, wherein the operations further comprise presenting on a display the plurality of datasets with the associated user-determined dataset statuses.

Clause 30. The non-transitory computer-readable medium of any of clauses 1 to 29, wherein the operations further comprise presenting on the display the plurality of datasets with the associated AI-determined dataset statuses.

Clause 31. The non-transitory computer-readable medium of any of clauses 1 to 30, wherein the operations further comprise enabling, on the display, a modification of the associated user-determined dataset status.

Clause 32. The non-transitory computer-readable medium of any of clauses 1 to 31, wherein the operations further comprise when the comparing results in a determination of a correspondence between the user-determined dataset status and the AI-determined dataset status, outputting an indicator signaling a correspondence.

Clause 33. The non-transitory computer-readable medium of any of clauses 1 to 32, wherein inputting, for each of the plurality of datasets, the dataset into the AI agent configured to analyze the dataset to automatically determine an associated AI-determined dataset status includes inputting the plurality of datasets into the AI agent configured to analyze the plurality of datasets to automatically determine, for each of the plurality of datasets, an associated AI-determined dataset status based on the plurality of datasets.

Clause 34. The non-transitory computer-readable medium of any of clauses 1 to 34, wherein the AI agent is further configured to provide insights for each of the plurality of datasets.

Clause 35. A method for improving dataset state determinations using AI, the method comprising:

accessing a data structure including a plurality of differing datasets, wherein each of the plurality of datasets is associated with a user-determined dataset status, and wherein the user-determined dataset status is selected from a plurality of dataset statuses;

for each of the plurality of datasets:

inputting the dataset into an AI agent configured to analyze the dataset to automatically determine an associated AI-determined dataset status;

comparing the user-determined dataset status with the AI-determined dataset status; and when the comparing results in a determination of a difference between the user-determined dataset status and the AI-determined dataset status, instituting a remedial action.

Clause 36. The method of any of clauses 1 to 35, wherein the remedial action includes at least one of outputting an indicator signaling a discrepancy or automatically choosing between the user-determined dataset status and the AI-determined dataset status based on a predefined rule.

Clause 37. The method of any of clauses 1 to 36, wherein outputting the indicator signaling the identified discrepancy includes presenting a visual indicator signaling the discrepancy on a display.

Clause 38. A system for improving dataset state determinations using AI, the system comprising:

at least one processor configured to:

access a data structure including a plurality of differing datasets, wherein each of the plurality of datasets is associated with a user-determined dataset status, and wherein the user-determined dataset status is selected from a plurality of dataset statuses;

for each of the plurality of datasets:

input the dataset into an AI agent configured to analyze the dataset to automatically determine an associated AI-determined dataset status;

compare the user-determined dataset status with the AI-determined dataset status; and when the comparing results in a determination of a difference between the user-determined dataset status and the AI-determined dataset status, institute a remedial action.

Clause 39. The system of any of clauses 1 to 38, wherein the remedial action includes at least one of outputting an indicator signaling a discrepancy or automatically choosing between the user-determined dataset status and the AI-determined dataset status based on a predefined rule.

Clause 40. The system of any of clauses 1 to 39, wherein outputting the indicator signaling the identified discrepancy includes presenting a visual indicator signaling the discrepancy on a display.

Disclosed embodiments may include any one of the following bullet-pointed features alone or in combination with one or more other bullet-pointed features, whether implemented as a system and/or method, by one or more hardware components disclosed herein, as well as by at least one processor or circuitry, and/or stored as executable instructions on non-transitory computer readable media or computer readable media.

accessing a data structure including data on a plurality of differing projects, wherein each project has one of a plurality of project statuses.

receiving a request for a status-level summarization of the plurality of projects.

in response to the request for the status-level summarization, scanning the data structure.

based on the scanning of the data structure, aggregating project status level categorization data associated with the plurality of projects, thereby defining a set of status groups.

generating a plurality of interactive aggregate project graphics, each interactive aggregate project graphic including a plurality of interactive project elements, and each of the plurality of interactive aggregate project graphics being associated with a differing one of the status groups in the set.

displaying each of the interactive aggregate project graphics on a common display.

within each interactive aggregate project graphic, each of the interactive project elements are displayed in accordance with an applied data display mode from a plurality of data display modes.

each of the plurality of interactive project elements is configured to graphically display a name of the project and at least some project-related data associated with the project.

applying the data display mode to each of the interactive project elements in each interactive aggregate project graphic includes selecting the at least some of the project-related data associated with the project to be graphically displayed in accordance with the applied data display mode.

the at least some of the graphically displayed project-related data associated with the project is graphically displayed via a data visualization widget, an alphanumerical field, or a combination thereof.

applying the data display mode to each of the interactive project elements in each interactive aggregate project graphic includes sorting each of the interactive project elements within the interactive aggregate project graphic in accordance with the applied data display mode.

applying the data display mode to each of the interactive project elements in each interactive aggregate project graphic includes modifying a visual appearance of each of the interactive project elements in the interactive aggregate project graphic.

one of the plurality of data display modes is applied by default when the plurality of interactive aggregate project graphics is presented on the common display.

the plurality of data display mode includes an alphabetical, a task completion rate, and a timeline data display mode.

based on the set of status groups, identifying a set of visual characteristics for graphically expressing the plurality of project statuses, and applying the set of visual characteristics to the plurality of interactive aggregate project graphics.

each of the plurality of interactive aggregate project graphics includes at least one alphanumerical field configured to present at least one of a number of projects included in the status group associated with the interactive aggregate project graphic, or the project status associated with the interactive aggregate project graphic.

in response to a user interaction with one of the plurality of interactive project elements causing a pop-up window to appear on the common display, wherein the pop-up window is configured to display at least some project-related data associated with the project corresponding to the one interactive project element.

each of the plurality of interactive project elements is configured to graphically display the at least some project-related data associated with the project and wherein the pop-up window is further configured to display additional project-related data associated with the project corresponding to the one interactive element.

wherein each project is associated with a project manager within each interactive aggregate project graphics, enabling a selection of a project manager data display mode.

in response to the selection of the project manager data display mode within an interactive aggregate project graphics: grouping the plurality of projects included in the status group associated with the interactive aggregate project graphic by project manager to define a set of project manager groups.

in response to the selection of the project manager data display mode within an interactive aggregate project graphics: generating a plurality of interactive project manager elements associated with the set of project manager groups.

in response to the selection of the project manager data display mode within an interactive aggregate project graphics: switching from a first presentation of the interactive aggregate project graphic on the common display based on an applied data display mode to a second presentation of the interactive aggregate project graphic on the common display based on the project manager data display mode, wherein in the second presentation the plurality of interactive project manager elements is arranged within the interactive aggregate project graphic.

the plurality of data display modes and the project manager data display mode are selectable from a single Graphical User Interface (GUI) element presented within the interactive aggregate project graphic.

each of the plurality of interactive project manager elements is configured to display at least one of a name of an associated project manager, a number of projects included in the associated project manager group, or a picture of an associated manager.

each of the plurality of interactive project manager elements adopts a size to reflect a number of projects included in the associated project manager group.

in response to a cumulated size of all interactive project elements within an interactive aggregate project graphic being larger than at least one dimension of the interactive aggregate project graphic presented on the common display, enabling scrolling through the interactive project element within the interactive aggregate project graphic.

accessing a data structure including a plurality of differing datasets, wherein each of the plurality of datasets is associated with a user-determined dataset status, and wherein the user-determined dataset status is selected from a plurality of dataset statuses.

for each of the plurality of datasets: inputting the dataset into an AI agent configured to analyze the dataset to automatically determine an associated AI-determined dataset status.

for each of the plurality of datasets: comparing the user-determined dataset status with the AI-determined dataset status.

for each of the plurality of datasets: when the comparing results in a determination of a difference between the user-determined dataset status and the AI-determined dataset status, instituting a remedial action.

the AI-determined dataset status is selected from the plurality of dataset statuses.

the remedial action includes at least one of outputting an indicator signaling a discrepancy or automatically choosing between the user-determined dataset status and the AI-determined dataset status based on a predefined rule.

outputting the indicator signaling the identified discrepancy includes presenting a visual indicator signaling the discrepancy on a display.

the AI agent is further configured to provide textual justifications for the determination of the associated dataset status.

in response to a user interaction with the visual indicator, outputting a justification indicator, wherein the justification indicator is configured to provide a textual justification for the discrepancy.

outputting the justification indicator includes presenting on the display a pop-up window configured to display the textual justification for the discrepancy and to display a GUI element for ignoring the AI-determined dataset status.

in response to a user interaction with the GUI element causing the pop-up window and the visual indicator to disappear from the display.

the plurality of datasets corresponds to a plurality of projects, each project being associated with project-related data, and the project-related data includes at least one of a plurality of tasks, a task completion rate, a timeline, or an associated project manager.

presenting on a display the plurality of datasets with the associated user-determined dataset statuses.

presenting on the display the plurality of datasets with the associated AI-determined dataset statuses.

enabling, on the display, a modification of the associated user-determined dataset status.

when the comparing results in a determination of a correspondence between the user-determined dataset status and the AI-determined dataset status, outputting an indicator signaling a correspondence.

inputting, for each of the plurality of datasets, the dataset into the AI agent configured to analyze the dataset to automatically determine an associated AI-determined dataset status includes inputting the plurality of datasets into the AI agent configured to analyze the plurality of datasets to automatically determine, for each of the plurality of datasets, an associated AI-determined dataset status based on the plurality of datasets.

the AI agent is further configured to provide insights for each of the plurality of datasets.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations, and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure may be implemented as a chip or a circuit. As software or algorithm, selected steps of the disclosure may be implemented as a plurality of software instructions being executed by a computer using any suitable operating system. In any case, selected steps of the method and system of the disclosure may be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally include a "network" or a "computer network".

To provide for interaction with a user, the systems and techniques described here may be implemented on a computer having a display device (a LED (light-emitting diode), or OLED (organic LED), or LCD (liquid crystal display) monitor/screen) for displaying information to the user and a touch-sensitive layer such as a touchscreen, or keyboard and a pointing device (e.g., a mouse or a trackball), by which the user can provide input to the computer. Other kinds of devices may be used to provide for interaction with a user as well; for example, feedback provided to the user may be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It should be appreciated that the above-described methods and apparatus may be varied in many ways, including omitting or adding steps, changing the order of steps, and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein may include various combinations and/or sub-combinations of the functions, components, and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It should be appreciated that the above-described embodiments can be implemented by hardware, or software (program codes), or a combination of hardware and software. If implemented by software, it can be stored in the above-described computer-readable media. The software, when executed by the processor may perform the disclosed methods. The computing units and other functional units described in the present disclosure may be implemented by hardware, or software, or a combination of hardware and software. One of ordinary skill in the art will also understand that multiple ones of the above-described modules/units may be combined as one module or unit, and each of the above-described modules/units may be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that may vary from implementation to implementation. Certain adaptations and modifications of the described embodiments can be made. Other embodiments may be apparent to those skilled in the art from consideration of the specification and practice of the invention disclosed herein. It is intended that the specification and examples be considered as examples only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules may be created using a variety of programming techniques. One or more of such software sections or modules may be integrated into a computer system, non-transitory computer readable media, or existing software.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries, and explanations of terminology in each instance apply to all instances, even when not repeated, unless the transitive definition, explanation, or summary would result in inoperability of an embodiment.

Moreover, while illustrative embodiments have been described herein, the scope includes any and all embodiments having equivalent elements, modifications, omissions, combinations (e.g., of aspects across various embodiments), adaptations, or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods may be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A non-transitory computer-readable medium containing instructions that, when executed by at least one processor, cause the at least one processor to perform operations for providing a categorized display of discrete graphical elements associated with project-related data, the operations comprising:

accessing a data structure including data on a plurality of differing projects, wherein each project has one of a plurality of project statuses;

receiving a request for a status-level summarization of the plurality of projects;

in response to the request for the status-level summarization, automatically scanning the data structure;

based on the scanning of the data structure, aggregating project status level categorization data associated with the plurality of projects, thereby defining a set of status groups;

generating a plurality of interactive aggregate project graphics, each interactive aggregate project graphic including a plurality of interactive project elements each of the plurality of interactive project element being associated with one of the plurality of differing projects, and each of the plurality of interactive aggregate project graphics being associated with a differing one of the status groups in the set; and displaying each of the interactive aggregate project graphics on a common display, wherein, within each interactive aggregate project graphic, each of the interactive project elements is displayed in accordance with an applied data display mode from a plurality of data display modes, the applied data display mode being selected by a user via interaction with a Graphical User Interface (GUI) element provided within each interactive aggregate project graphic.

2. The non-transitory computer-readable medium of claim 1, wherein each of the plurality of interactive project elements is configured to graphically display a name of the project and at least some project-related data associated with the project.

3. The non-transitory computer-readable medium of claim 2, wherein applying the data display mode to each of the interactive project elements in each interactive aggregate project graphic includes selecting the at least some of the project-related data associated with the project to be graphically displayed in accordance with the applied data display mode.

4. The non-transitory computer-readable medium of claim 2, wherein the at least some of the graphically displayed project-related data associated with the project is graphically displayed via a data visualization widget, an alphanumerical field, or a combination thereof.

5. The non-transitory computer-readable medium of claim 1, wherein applying the data display mode to each of the interactive project elements in each interactive aggregate project graphic includes sorting each of the interactive project elements within the interactive aggregate project graphic in accordance with the applied data display mode.

6. The non-transitory computer-readable medium of claim 1, wherein applying the data display mode to each of the interactive project elements in each interactive aggregate project graphic includes modifying a visual appearance of each of the interactive project elements in the interactive aggregate project graphic.

7. The non-transitory computer-readable medium of claim 1, wherein one of the plurality of data display modes is applied by default when the plurality of interactive aggregate project graphics is presented on the common display.

8. The non-transitory computer-readable medium of claim 1, wherein the plurality of data display modes includes an alphabetical, a task completion rate, and a timeline data display mode.

9. The non-transitory computer-readable medium of claim 1, wherein the operations further comprise based on the set of status groups, identifying a set of visual characteristics for graphically expressing the plurality of project statuses, and applying the set of visual characteristics to the plurality of interactive aggregate project graphics.

10. The non-transitory computer-readable medium of claim 1, wherein each of the plurality of interactive aggregate project graphics includes at least one alphanumerical field configured to present at least one of a number of projects included in the status group associated with the interactive aggregate project graphic, or the project status associated with the interactive aggregate project graphic.

11. The non-transitory computer-readable medium of claim 1, wherein the operations further comprise in response to a user interaction with one of the plurality of interactive project elements causing a pop-up window to appear on the common display, wherein the pop-up window is configured to display at least some project-related data associated with the project corresponding to the one interactive project element.

12. The non-transitory computer-readable medium of claim 11, wherein each of the plurality of interactive project elements is configured to graphically display the at least some project-related data associated with the project and wherein the pop-up window is further configured to display additional project-related data associated with the project corresponding to the one interactive element.

13. The non-transitory computer-readable medium of claim 1, wherein each project is associated with a project manager, and wherein the operations further comprise:

within each interactive aggregate project graphics, enabling a selection of a project manager data display mode;

in response to the selection of the project manager data display mode within an interactive aggregate project graphics:

grouping the plurality of projects included in the status group associated with the interactive aggregate project graphic by project manager to define a set of project manager groups;

generating a plurality of interactive project manager elements associated with the set of project manager groups; and switching from a first presentation of the interactive aggregate project graphic on the common display based on an applied data display mode to a second presentation of the interactive aggregate project graphic on the common display based on the project manager data display mode, wherein in the second presentation the plurality of interactive project manager elements is arranged within the interactive aggregate project graphic.

14. The non-transitory computer-readable medium of claim 13, wherein the plurality of data display modes and the project manager data display mode are selectable from the GUI provided within each the interactive aggregate project graphic.

15. The non-transitory computer-readable medium of claim 14, wherein each of the plurality of interactive project manager elements is configured to display at least one of a name of an associated project manager, a number of projects included in the associated project manager group, or a picture of an associated manager.

16. The non-transitory computer-readable medium of claim 14, wherein each of the plurality of interactive project manager elements adopts a size to reflect a number of projects included in the associated project manager group.

17. The non-transitory computer-readable medium of claim 1, wherein the operations further comprise, in response to a cumulated size of all interactive project elements within an interactive aggregate project graphic being larger than at least one dimension of the interactive aggregate project graphic presented on the common display, enabling scrolling through the interactive project element within the interactive aggregate project graphic.

18. The non-transitory computer-readable medium of claim 1, wherein the GUI element provided within each interactive aggregate project graphics includes buttons enabling selection by the user of the data display mode to be applied.

19. A method for providing a categorized display of discrete graphical elements associated with project-related data, the method comprising:

accessing a data structure including data on a plurality of differing projects, wherein each project has one of a plurality of project statuses;

receiving a request for a status-level summarization of the plurality of projects; in response to the request for the status-level summarization, automatically scanning the data structure;

based on the scanning of the data structure aggregating project status level categorization data associated with the plurality of projects, thereby defining a set of status groups;

generating a plurality of interactive aggregate project graphics, each interactive aggregate project graphic including a plurality of interactive project elements each of the plurality of interactive project element being associated with one of the plurality of differing projects, and each of the plurality of interactive aggregate project graphics being associated with a differing one of the status groups in the set; and displaying each of the interactive aggregate project graphics as interactive aggregate project graphics on a common display, wherein, within each interactive aggregate project graphic, each of the interactive project elements is displayed in accordance with an applied data display mode from a plurality of data display modes, the applied data display mode being selected by a user via interaction with a Graphical User Interface (GUI) element provided within each interactive aggregate project graphic.

20. A system for providing a categorized display of discrete graphical elements associated with project-related data, the system comprising:

at least one processor configured to:

access a data structure including data on a plurality of differing projects, wherein each project has one of a plurality of project statuses;

receive a request for a status-level summarization of the plurality of projects;

in response to the request for the status-level summarization, automatically scan the data structure;

based on the scanning of the data structure aggregate project status level categorization data associated with the plurality of projects, thereby defining a set of status groups;

generate a plurality of interactive aggregate project graphics, each interactive aggregate project graphic including a plurality of interactive project elements each of the plurality of interactive project element being associated with one of the plurality of differing projects, and each of the plurality of interactive aggregate project graphics being associated with a differing one of the status groups in the set; and display each of the interactive aggregate project graphics as interactive aggregate project graphics on a common display, wherein, within each interactive aggregate project graphic, each of the interactive project elements is displayed in accordance with an applied data display mode from a plurality of data display modes, the applied data display mode being selected by a user via interaction with a Graphical User Interface (GUI) element provided within each interactive aggregate project graphic.

* * * * *